US009386265B2

(12) United States Patent
Possos et al.

(10) Patent No.: US 9,386,265 B2
(45) Date of Patent: Jul. 5, 2016

(54) CONTENT ADAPTIVE TELECINE AND INTERLACE REVERSER

(71) Applicants: Sebastian Possos, Redmond, WA (US); Atul Puri, Redmond, WA (US)

(72) Inventors: Sebastian Possos, Redmond, WA (US); Atul Puri, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/501,736

(22) Filed: Sep. 30, 2014

(65) Prior Publication Data

US 2016/0094803 A1    Mar. 31, 2016

(51) Int. Cl.
*H04N 7/01*    (2006.01)

(52) U.S. Cl.
CPC ............ *H04N 7/012* (2013.01); *H04N 7/0115* (2013.01)

(58) Field of Classification Search
CPC ....... H04N 7/012; H04N 7/0112; H04N 7/01; H04N 7/0125
USPC .......... 348/441, 448, 446, 451, 452, 458, 459
IPC ............................................... H04N 7/01, 11/20
See application file for complete search history.

(56) References Cited

U.S. PATENT DOCUMENTS

| | | | | |
|---|---|---|---|---|
| 5,115,311 A | * | 5/1992 | Jaqua | H04N 7/0112 348/458 |
| 5,872,600 A | * | 2/1999 | Suzuki | H04N 7/0112 348/441 |
| 8,374,240 B1 | | 2/2013 | Namboodiri et al. | |
| 2008/0031318 A1 | | 2/2008 | Ha et al. | |
| 2009/0161766 A1 | | 6/2009 | Bronstein et al. | |
| 2010/0225805 A1 | | 9/2010 | Conklin | |
| 2010/0254453 A1 | | 10/2010 | Dane et al. | |

OTHER PUBLICATIONS

Apple, "Final Cut Pro 7 User Manual: Telecine, Pull-Down, and Reverse Telecine", 8 Pages, available at: <https://documentation.apple.com/en/finalcutpro/usermanual/index.html#chapter=E%26section=2%26tasks=true>, retrieved on Dec. 16, 2014.

Oscaler, "Greedy (High Motion) Method", 2 Pages, available at: <http://deinterlace.sourceforge.net/Help/GreedyH.htm>, retrieved on Dec. 16, 2014.

Github Inc., "Deinterlace: change field handling through methods", Aug. 22, 2011, 14 Pages, available at: <https://github.com/krad-radio/gstreamer-plugins-good-krad/blob/master/gst/deinterlace/tvtime/greedyh.c>, retrieved on Dec. 16, 2014.

Barry, Tom, "Readme_GreedyHMA", Version 0.4.0.0, 2001, 6 Pages, available at: <http://web.archive.org/web/20111217080801/http://neuron2.net/trbarry/Readme_GreedyHMA.txt>, retrieved on Dec. 16, 2014.

(Continued)

*Primary Examiner* — Sherrie Hsia

(74) *Attorney, Agent, or Firm* — Green, Howard & Mughal LLP

(57) ABSTRACT

Techniques related to processing a mixed content video stream to generate progressive video for encoding and/or display are discussed. Such techniques may include determining conversion techniques for various portions of the mixed content video stream and converting the portions based on the determined techniques. The conversion of true interlaced video include content adaptive interlace reversal and the conversion of pseudo-interlaced telecine converted video may include adaptive telecine pattern reversal.

36 Claims, 38 Drawing Sheets

(56) References Cited

OTHER PUBLICATIONS

International Search Report and Written Opinion of the International Searching Authority for International Application No. PCT/US2015/045610, mailed on Nov. 25, 2015.

Non-Final Office Action for U.S. Appl. No. 15/072,773 mailed May 19, 2016, 5 pages.

\* cited by examiner

CONTENT ADAPTIVE TELECINE AND INTERLACE REVERSER

BACKGROUND

A video encoder compresses a video signal so that either more information can be sent over a given available bandwidth for transmission or a much smaller compressed file results for storage. Alternatively, an improved video encoder may choose to provide either even higher compression or even better quality for the same given available bandwidth or file size. The transmitted compressed video signal or stored compressed file may be input to a video receiver/decoder for decoding and playback for display. For example, the High Efficiency Video Coding (HEVC)/H.265 video coding standard is a state-of-the-art standard that provides for high video compression/quality while requiring much lower bandwidth or generating much smaller compressed file sizes for the same quality as compared to earlier standards. HEVC is thus a significant candidate for replacing earlier standards. However HEVC only focuses on the compression and decompression of progressive scan video. For instance, in progressive scan video, all of each frame is captured and displayed at an instant of time in contrast to interlaced video in which each frame is composed of a pair of fields that are captured or displayed from two subsequent intervals of time. Thus, the interlaced scan video where each frame is composed of two fields as captured by a camera or when intended for display, nearly doubles the perceived amount of motion that can be captured or the temporal rate of motion (allows smooth motion rendition) that can be displayed, as is discussed further herein.

Ideally, even better rendition of motion can be obtained by capturing the progressive format video at twice the frame rate, outperforming the motion rendition capability of the interlaced format, however, this also results in excessive increase in bandwidth. Thus, the interlaced format may provide a more balanced motion rendition capability/bandwidth increase tradeoff. However in case of slower motion of objects in a video scene, interlaced video format can also provide increased visual degradation, especially on objects with sharp edges including the case of text. Due to such visual degradation, there has been a movement away from the interlaced format to the progressive format. Further, due to perception of potentially lower visual distortions, the display technology has also evolved towards display of progressive video format as the de-facto format for display. Thus, recent coding standards such as HEVC only focus on coding of progressive format video (although HEVC includes bits for signaling interlaced format video, it does not support additional tools for interlaced format compression) expecting video of progressive format input to the HEVC encoder and the output video of the HEVC decoder to be progressive format for presentment via a progressive format display.

Typical conversions to a suitable format for compression may be difficult and may provide a variety of undesirable conversion artifacts. As such, existing techniques do not provide high quality conversion of source video to a format suitable for compression using state-of-the art video codecs. Such problems may become critical as the desire to deliver high quality consumer grade video via digital standard definition, high definition, and ultra-high definition becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
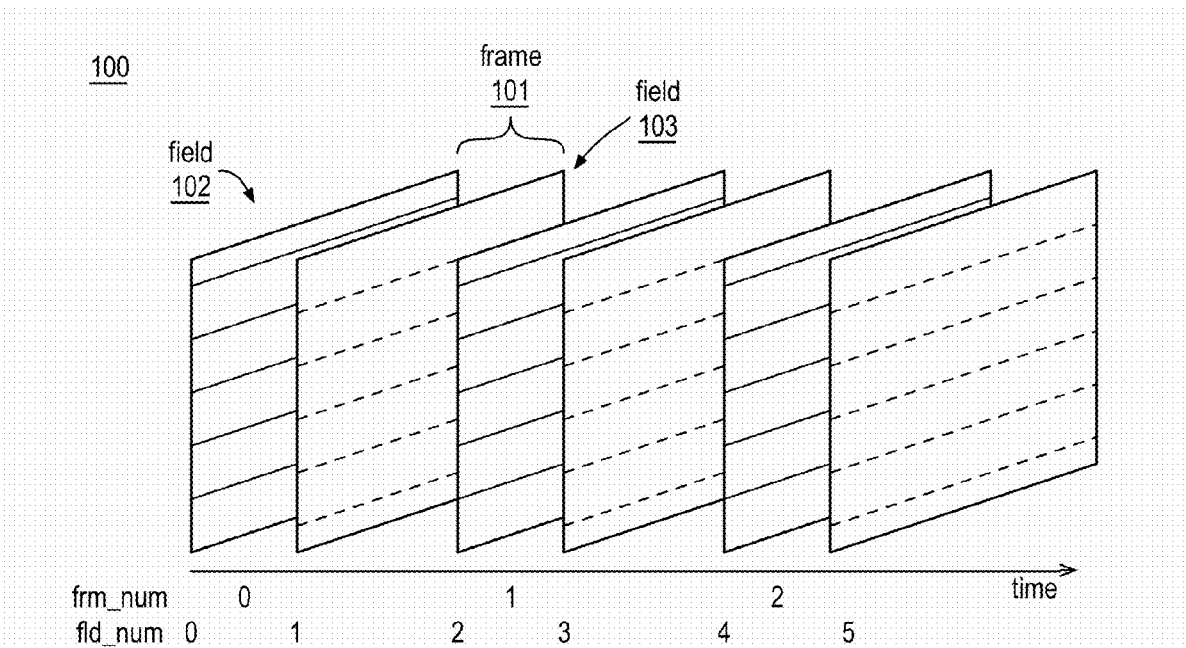
FIG. 1 is a diagram illustrating example frames and fields of interlaced video.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to preprocessing of content to a suitable format for efficient compression and eventual display are discussed.

As discussed, current codecs and displays may be best utilized with progressive video. However, some video content may be provided in a mix of formats including progressive, true interlaced, and pseudo-interlaced telecine converted. For example, true interlaced video may be generated via a camera that provides interlaced content while pseudo-interlaced telecine converted may be generated via telecine conversion as discussed herein. The techniques discussed herein may automatically analyze video such as a mixed content video stream to determine the format of portions or segments of the video. Depending on the determined format, a portion or segment may be converted to progressive video. As discussed, such a format may be suitable for compression and/or display using current techniques. For example, detected progressive video may be passed through without further processing, detected interlaced video (e.g., true interlaced video) may be deinterlaced via a content adaptive technique, and pseudo-interlaced telecine converted video may be telecine reversed if the telecine pattern is determined or deinterlaced if no pattern is detected.

In some embodiments discussed herein, a frame format for a frame of a mixed content video stream including one or more video formats may be determined. As discussed herein, the frame format may be progressive or interlaced and may be determined using a single stage curve fitting method or a two stage method using a curve fitting first stage and a second stage including a machine learning technique for frames for which a format could not be determined via the first stage. Furthermore, a frame group format for a frame group of the mixed content video stream including the frame may be determined. The frame group format may be one of all progressive, all interlaced, a telecine pattern, or an unknown pattern, for example. Based at least in part on the frame group format, a conversion technique may be determined for the frame group and the frame group may be converted to a final progressive format based on the determined conversion technique. For example, if the frame group format is all progressive, the frames may be passed through without further processing. Furthermore, if the frame group format is all interlaced, the frames may be deinterlaced to generate progressive frames. In some examples, the deinterlacing may include content adaptive deinterlacing such as motion adaptive deinterlacing as is discussed further herein. Also, if the frame group format is telecined and the telecine pattern is detected, the frames may be detelecined (e.g., telecine reversed) based on the detected pattern to provide progressive frames. Example techniques for detecting example telecine patterns are discussed further herein. Further still, if the frame group format is unknown, the frames may be deinterlaced to generate progressive frames. In some examples, the deinterlacing may include content adaptive deinterlacing such as motion adaptive deinterlacing as described with respect to deinterlacing of true interlaced frames.

In other embodiments discussed herein, a mixed content video stream having a plurality of video formats including at least a true interlaced format and a pseudo-interlaced telecine converted format may be received. A first conversion technique for a first segment of the mixed content video stream having a true interlaced format and a second conversion technique for a second segment of the mixed content video stream having a telecined format may be determined such that the first and second conversion techniques are different. For example, the first conversion technique may include a content adaptive deinterlacing technique and the second conversion technique may include an adaptive telecine reversal technique as discussed herein. The mixed content video stream may be converted to a progressive video stream based at least in part on the first conversion technique and the second conversion technique as discussed herein.

In such embodiments, progressive video may be provided that is of high quality and relatively free of visual artifacts. Such progressive video may be suitable for display to a user (e.g., via a display for which progressive video is advantageous such as computer monitors and HDTVs) or compression for content distribution (e.g., via a codec for which progressive video is advantageous such as HEVC, H.264, VP9, MPEG-2, or the like).

As discussed, embodiments discussed herein may convert true interlaced video to progressive video via content adaptive deinterlacing or other techniques. Furthermore, embodiments discussed herein may convert pseudo-interlaced telecine converted video to progressive video via adaptive telecine reversal or other techniques.

Interlaced video format was designed for the television industry and, currently, interlaced video is mainly used in television. Interlaced video format makes tradeoffs between spatial and temporal resolution that are most suitable under tight bandwidth constraints. For example, instead of capturing or displaying an entire frame at one time, interlaced video captures or displays half of the scan lines (e.g., every other scan line) of a frame, referred to as a field, at a current time instance and follows up by capturing or displaying the missing other half of the scan lines of a frame, forming the other field, at the next time instance. For example, a top-field and a bottom-field together constitute a frame of interlaced video. The top field may include even lines (starting from 0) and the bottom field may include odd lines in the frame. For North American TV, interlaced video can be thought of as having a frame rate of 30 fps (29.97 fps to be precise) and a field rate of 60 fps (59.94 to be precise).

FIG. 1 is a diagram illustrating example frames and fields of interlaced video 100, arranged in accordance with at least some implementations of the present disclosure. As shown in FIG. 1, a frame 101 of video 100 may include fields 102, 103. For example, field 102 may be a top field of frame 101 and field 103 may be a bottom field of frame 101 such that scan lines of field 102 alternate with scan lines of field 103 to form frame 101. As shown, frame 101 may be associated with a frame number 0 (e.g., frm_num 0), field 102 may be associated with a field number 0 (e.g., fld_num), field 103 may be associated with a field number 1. FIG. 1 also illustrates frame number 1, including field number 2 (e.g., a top field of frame number 1) and field number 3 (e.g., a bottom field of frame number 1), and frame number 2, including field number 4 (e.g., a top field of frame number 2) and field number 5 (e.g., a bottom field of frame number 2). Therefore, the field rate of video 100 may be twice the frame rate of video 100 (e.g., video 100 may have a frame rate of 30 frames per second and a field rate of 60 fields per second).

Figure 2:
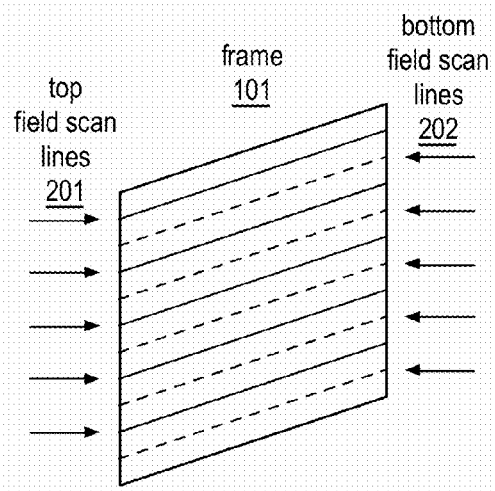
FIG. 2 is a diagram illustrating example scan lines of an example frame of interlaced video.

FIG. 2 is a diagram illustrating example scan lines of example frame 101 of interlaced video, arranged in accordance with at least some implementations of the present disclosure. As shown in FIG. 2, frame 101 may include top field scan lines 201 and bottom field scan lines 202. For example, field 102 may include top field scan lines 201 and field 103 may include bottom field scan lines 202. As shown, top field scan lines 201 and bottom field scan lines 202 may alternate to define frame 101. Also as shown, in an example, each of top field scan lines 201 may be above each of bottom field scan lines 202.

With interlaced format, a video scene with fast motion appears smoother in playback as compared to 30 frames per second progressive video as the field rate of 60 fields per second appears to give the perception of smoother temporal motion while the vertical/spatial reduction in resolution by a factor of 2, is difficult for a user to notice. Likewise, with interlaced format, a video scene with no (or very small) motion, despite fields being temporally separated, appears to preserve full spatial resolution of details in a scene, very similar to the appearance of the scene in progressive video format.

However, for intermediate varying degrees of motion, the tradeoff of spatial and temporal detail may cause undesirable presentation of critical content such as content including text, detailed texture, and edges of critical orientations. For example, progressive video of full spatial resolution at full temporal rate of 60 frames per second would offer high quality both spatially and temporally. However, this option is also more expensive in bandwidth than 30 frames per second video. Alternatively, with a video format of progressive 30 frames per second, the bandwidth may be reduced but at the expense of lower video quality including, for example, jerkiness of motion for fast moving content. Interlaced 30 frames per second (e.g., 60 fields per second) video therefore provides a compromise between bandwidth constraints and the smoothness of motion, albeit with visual distortions on some critical content.

Unlike standard TV or High Definition TV, that can either use interlaced or (increasingly) progressive format video, only progressive format video is suitable for personal computers (PCs) as monitor/displays for PCs are exclusively progressive with high refresh rates. Therefore, video produced for TV as interlaced may need to be converted to progressive format for display on PCs or similar devices. Also, many higher quality displays (including TV displays) are actually progressive (e.g., they may be provided interlaced video but may display such interlaced video as progressive to a user), such that typically the final target format for display is increasingly progressive. Furthermore, this is an issue of not only display but of format for compression (e.g., coding) as well. For example, while earlier video coding standards such as MPEG-2 or H.264/AVC are designed to efficiently encode both progressive and interlaced format video, the latest H.265/MPEG HEVC and other recent standards that offers the highest compression efficiency are designed to efficiently encode progressive video (although some codecs may support both formats).

Furthermore, in North America, interlaced format content for standard definition corresponds to 480 lines and high definition corresponds to 1080 lines (e.g., 480i and 1080i, respectively). However, progressive format content is available in a wider range of formats including, for example, standard definition: 480 lines (e.g., 480p), basic high definition: 720 lines (e.g., 720p), full high definition: 1080 lines (e.g., 1080p), and ultra-high definition: 3840 lines (e.g., 3840p (4K)).

For example, if the display format is progressive (which, as discussed, is becoming increasingly standard), there may be two paths for encoding of video source of interlaced format. First, the interlaced format video may be converted to progressive format prior to encoding so that the encoding is performed in progressive format, followed by decoding which results in progressive format video, followed by direct display of this progressive format video. Second, the interlaced format video may be directly encoded as interlaced video, followed by decoding which results in interlaced format video, followed by interlace to progressive format conversion that renders progressive video required for display. In either case, the process of interlace to progressive conversion is needed (e.g., prior to encoding in former case and after decoding in latter case). The process of interlace to progressive conversion is referred to as interlace reversal or deinterlacing.

Interlace reversal/deinterlacing may be performed using a variety of techniques. For example, high quality deinterlacing was traditionally performed in expensive hardware, but may now be performed in moderately priced software or using open source software solutions. Furthermore, as expected, solutions for deinterlacing vary widely in quality (e.g., artifacts), complexity, and processing speed, which is related to the complexity of the deinterlacing algorithm, video resolution, and whether hardware or software solutions are implemented.

As discussed, in some examples, true interlaced video may be converted to progressive video via content adaptive deinterlacing or other techniques. Furthermore, embodiments discussed herein may convert pseudo-interlaced telecine converted video to progressive video via adaptive telecine reversal or other techniques.

Telecine, in some examples referred to as a pull down such as a 3:2 pull down or the like, is a process for the conversion of film frames to a video format suitable for display (e.g., interlaced) on Television, for example. In some examples, films may be recorded for display at 24 frames per second while Television such as, for example, National Television System Committee (NTSC) video, operates at 29.97 frames per second (or 59.94 fields per second). The NTSC television may operate at a higher frame rate than film due to the difference in typical TV viewing conditions having higher amounts of ambient light whereas film is typically viewed in darker movie theater surroundings.

A main reason for performing telecine techniques for presenting film video on TV may be that in more lighted viewing conditions, to perceive smooth motion in video scenes, a higher frame rate for playback is needed. Thus to smoothly playback film content on TV, the telecine or 3:2 pull down process that artificially increases the field rate (and thus the frame rate) of film is employed. Such techniques may include inserting redundant fields in the video stream or the like.

As discussed, each interlaced frame of video may include two fields of video. In some examples, a telecine or 3:2 pull down process may include the insertion of a third extra video field after every second frame to convert the frame rate from 24 frames per second to 30 (e.g., technically, 29.97) frames per second. In some examples, the inserted field is one of the existing video fields. In other examples, the inserted field may be a synthesized field generated as an average of actual neighboring fields or the like. Such examples may provide the advantage of resulting video with fewer visible artifacts at the cost of yielding a higher frame rate needed for rendering smooth motion.

Figure 3A:
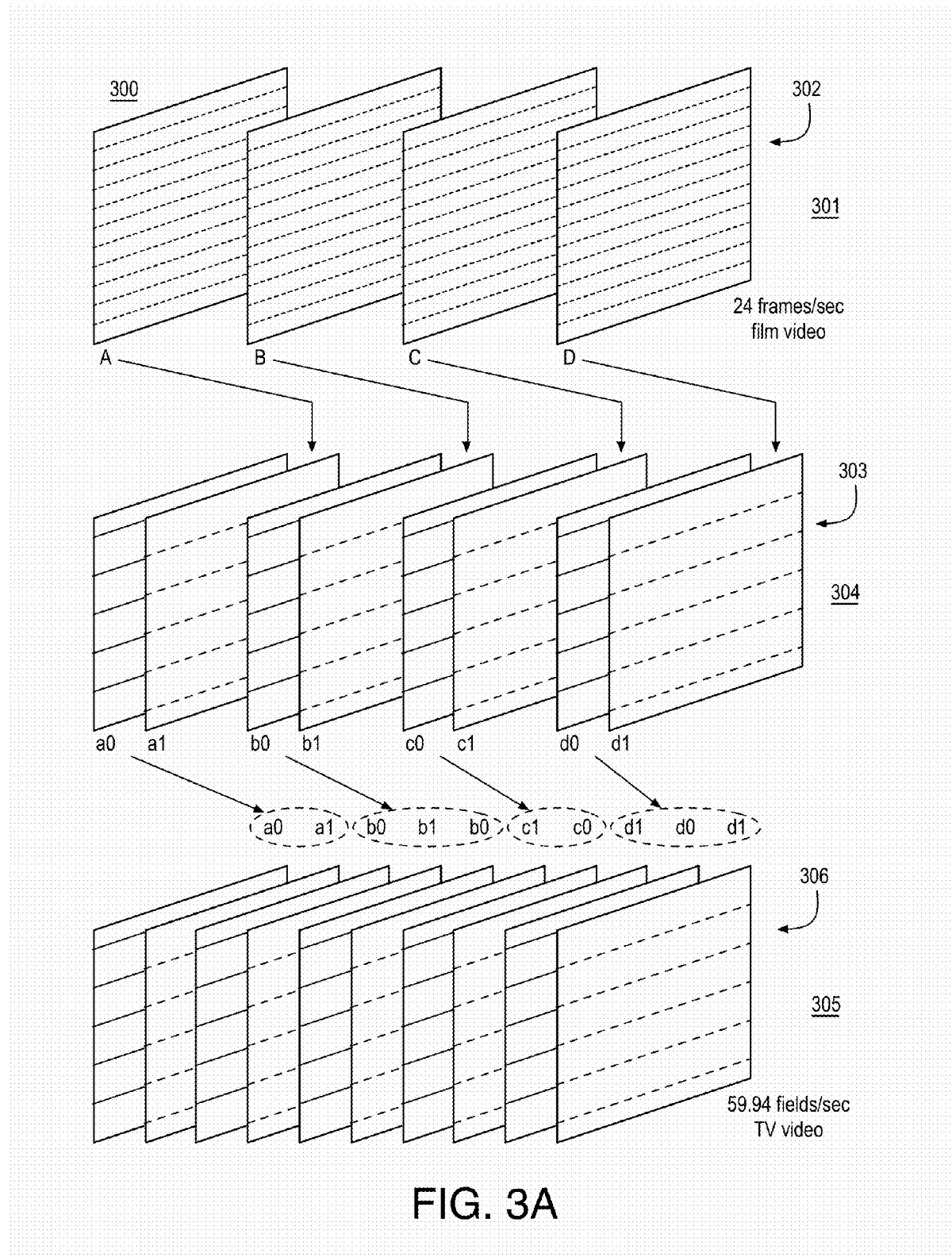
FIG. 3A is a diagram illustrating an example 3:2 pull down telecine process.

FIG. 3A is a diagram illustrating an example 3:2 pull down telecine reversal process 300, arranged in accordance with at least some implementations of the present disclosure. As shown in FIG. 3A, process 300 may include receiving original progressive video 301 having frames 302 (e.g., frames A, B, C, and D). In the illustrated example, progressive video 301 has a frame rate of 24 frames per second, however progressive video 301 may have any suitable frame rate. As shown, process 300 may include splitting each of frames 302 into two fields to generate fields 303 of interlaced video 304. For example, frame A may be split into a top field a0 and a bottom field a1, frame B may be split into a top field b0 and a bottom field b1, frame C may be split into a top field c0 and a bottom field c1, frame D may be split into a top field d0 and a bottom field d1, and so on. For example, each of frames 302 though progressive may be thought of as including two fields as in the case of interlaced frames. For example, even numbered lines of the frame may represent one field (e.g., the top field) and odd numbered lines of the frame may represent the second field (e.g., the bottom field). As shown the frame rate of interlaced video 304 may be the same as the frame rate of progressive video 301, but the field rate of interlaced video 304 may be twice the frame rate of progressive video 301.

As shown, process 300 may include generating 5 interlaced frames per 4 progressive frames by inserting copies (or averages or the like) of certain fields to generate telecine converted interlaced video 305 including fields 306. For example, such processing may increase the frame rate from 24 frames per second to 30 frames per second (e.g., technically 29.97 frames per second). For example, 2 new fields may be copied from interlaced video 304 and inserted into telecine converted interlaced video 305 (e.g., thereby stretching the pattern from 8 fields (4 frames) to 10 fields (5 frames)).

For example, in order to convert interlaced video 304 to telecine converted interlaced video 305, fields a0, a1 may be copied, fields b0, b1 may be copied, a new (e.g., copied) field b0 may be inserted after copied field b1, fields c1, c0 may be swapped, a new (e.g., copied) field d1 may be inserted after field c0, and fields d0, d1 may be copied, as shown. In the illustrated example, copies of fields b0 and d1 were inserted into telecine converted interlaced video 305. Furthermore, fields c1 and c0 were swapped. Such swapping may be necessary to maintain the alternating order of fields between top fields and bottom fields (e.g., x0, x1, y0, y1, and so on).

For example, as shown, corresponding to frame B, three fields instead of two are generated by inserting an additional field, a copy of b0 after the field pair b0 and b1. Likewise, corresponding to frame D three fields instead of two are generated by inserting an additional field, a copy of field d1 before field pair d0 and d1. Such a process may be repeated for each set of 4 frames to generate, for each set of 4 frames, a set of 5 frames, thus increasing the frame rate from 24 frames per second to 30 frames per second (e.g., of which 1 frame may be dropped every 1001 frames to generate needed frame rate of (30/1001)×1000=29.97 frames per second (or 59.94 fields per second) for north American TV system).

Figure 3B:
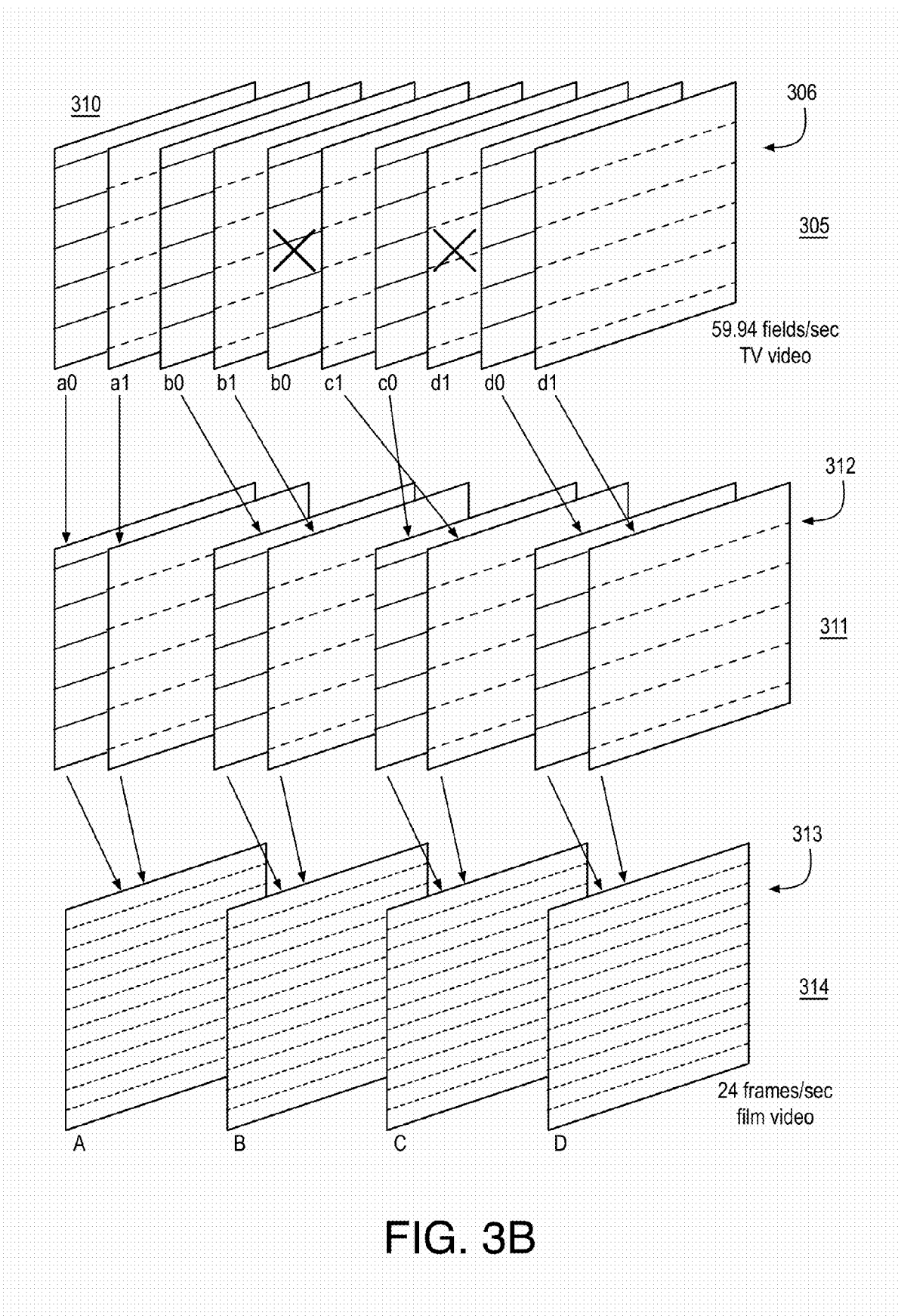
FIG. 3B is a diagram illustrating an example process of reversal of a 3:2 pull down telecine process.

FIG. 3B is a diagram illustrating an example process 310 of reversal of a 3:2 pull down telecine process, arranged in accordance with at least some implementations of the present disclosure. Process 310 may include detecting a 5 frame pattern of telecine converted interlaced video 305, removing the inserted extra fields (e.g., undoing the telecine process) and re-generating 4 frames per 5 telecined frames, reducing the overall frame rate back to 24 frames per second from telecined 30 (e.g., specifically 29.97) frames per second. For example, as shown in FIG. 3B, process 310 may include receiving telecine converted interlaced video 305 (e.g., fields a0, a1, b0, b1, c1, c0, d1, d0, and d1)) and/or detecting a 5 frame pattern of telecine converted interlaced video 305. In the illustrated example, telecine converted interlaced video 305 has a frame rate of 59.94 fields per second, however telecine converted interlaced video 305 may have any suitable frame rate.

As shown, process 310 may include dropping or removing inserted fields (e.g., represented by X-outs in FIG. 3B). For example, 2 fields represented by X-outs such as fields b0 and d1 may be dropped from telecine converted interlaced video 305. Furthermore, previously swapped fields (e.g., fields c1, c0) may be swapped. Such field dropping and swapping may be performed on every set of 5 telecined frames for example to generate interlaced video 311 including fields 312. As shown, interlaced video 311 may alternate top and bottom fields as discussed herein. Furthermore, as shown, process 310 may include combining fields 312 to form frames 313 of progressive video 314. For example, associated fields a0, a1 may be combined to form frame A, associated fields b0, b1 may be combined to form frame B, associated fields c0, c1 may be combined to form frame C, associated fields d0, d1 may be combined to form frame D, and so on.

For example, process 310 of telecine reversal includes receiving telecine converted interlaced video 305 (e.g., telecined video fields), providing video fields after detection and deletion of two redundant fields per 5 frame cycle and swapping fields as needed (e.g., interlaced video 311), and combining fields pairs to form frames (e.g., frames 313 of progressive video 314). Process 310, when applied on telecined film content generated via 3:2 pull down, may be fully reversible, generating 4 frames from every set of 5 telecined frames, resulting in overall film frame rate of 24 frames per second from telecined 30 (e.g., specifically 29.97) frames per second video.

As discussed, in some examples, a telecine process or technique may include a 3:2 pull down technique with frame insertion. Other patterns or techniques may be used. Such different patterns may be used for a variety of reasons such as simplicity of extraction, perceived improvement in smoothness of motion, or improved conversion of cartoon content, or the like.

Figure 4A:
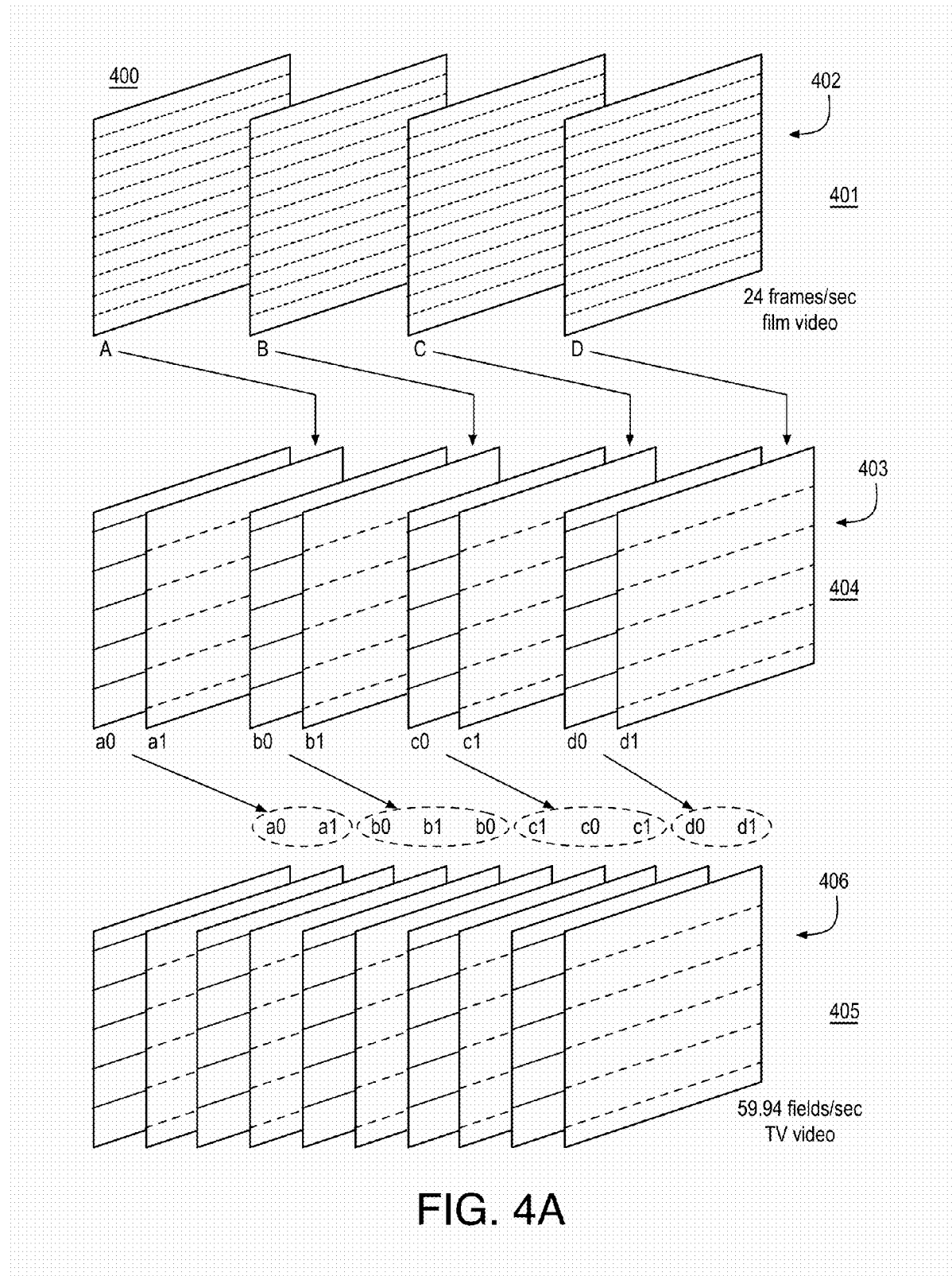
FIG. 4A is a diagram illustrating an example 2:3:3:2 pull down telecine process.

FIG. 4A is a diagram illustrating an example 2:3:3:2 pull down telecine process 400, arranged in accordance with at least some implementations of the present disclosure. As shown in FIG. 4A, process 400 may include receiving original progressive video 401 having frames 402 (e.g., frames A, B, C, and D). In the illustrated example, progressive video 401 has a frame rate of 24 frames per second, however progressive video 401 may have any suitable frame rate. As shown, process 400 may include splitting each of frames 402 into two fields to generate fields 403 of interlaced video 404. For example, frame A may be split into a top field a0 and a bottom field a1, frame B may be split into a top field b0 and a bottom field b1, frame C may be split into a top field c0 and a bottom field c1, frame D may be split into a top field d0 and a bottom field d1, and so on. For example, each of frames 402 though progressive may be thought of as including two fields as in the case of interlaced frames. For example, even numbered lines of the frame may represent one field (e.g., the top field) and odd numbered lines of the frame may represent the second field (e.g., the bottom field). As shown the frame rate of interlaced video 404 may be the same as the frame rate of progressive video 401, but the field rate of interlaced video 404 may be twice the frame rate of progressive video 401.

As shown, process 400 may include generating 5 interlaced frames per 4 progressive frames by inserting copies (or averages or the like) of certain fields to generate telecine converted interlaced video 405 including fields 406. For example, such processing may increase the frame rate from 24 frames per second to 30 frames per second (e.g., technically 29.97 frames per second). For example, 2 new fields may be copied from interlaced video 404 and inserted into telecine converted interlaced video 405 (e.g., thereby stretching the pattern from 8 fields (4 frames) to 10 fields (5 frames)).

For example, in order to convert interlaced video 404 to telecine converted interlaced video 405, fields a0, a1 may be copied, fields b0, b1 may be copied, a new (e.g., copied) field b0 may be inserted after copied field b1, a new (e.g., copied) field c1 may be inserted after inserted field b0, fields c0, c1 may be copied, and fields d0, d1 may be copied, as shown. In the illustrated example, copies of fields b0 and c1 were inserted into telecine converted interlaced video 405. The location of such inserted fields may maintain the alternating order of fields between top fields and bottom fields (e.g., x0, x1, y0, y1, and so on).

For example, process 400 may begin with film content at 24 frames per second with frames A, B, C, and D. Such a set of 4 frames may be telecined to a set of 5 frames using the 2:3:3:2 pull down pattern as shown. As discussed, to generate the 2:3:3:2 pull down pattern, a first field pair a0, a1 may be copied as is, followed by the generation/insertion of 3 fields b0, b1, b0 from field pair b0, b1 (e.g., as in case of 3:2 pull down), followed by generation/insertion of 3 fields c1, c0, c1 from field pair c01, c1, followed by copying the final pair of fields d0, d1 as is, to generate telecine converted interlaced video 405. For example, telecine converted interlaced video 405 may be an output video stream.

Figure 4B:
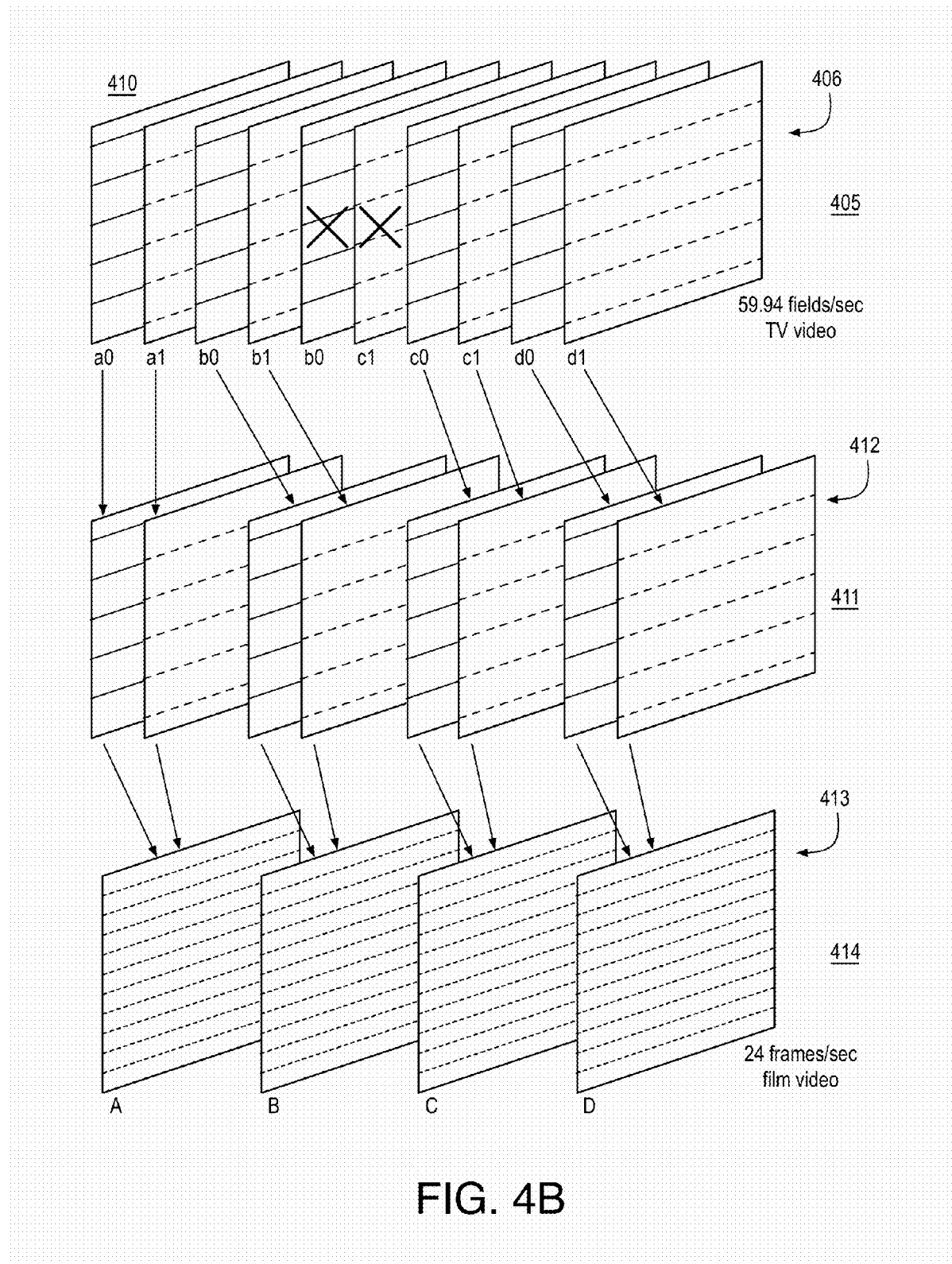
FIG. 4B is a diagram illustrating an example process of reversal of a 2:3:3:2 pull down telecine process.

FIG. 4B is a diagram illustrating an example process 410 of reversal of a 2:3:3:2 pull down telecine process, arranged in accordance with at least some implementations of the present disclosure. Process 410 may include detecting a 5 frame pattern of telecine converted interlaced video 405, removing the inserted extra fields (e.g., undoing the telecine process) and re-generating 4 frames per 5 telecined frames, reducing the overall frame rate back to 24 frames per second from telecined 30 (e.g., specifically 29.97) frames per second. For example, as shown in FIG. 4B, process 410 may include receiving telecine converted interlaced video 405 (e.g., fields a0, a1, b0, b1, b0, c1, c0, c1, d0, and d1) and/or detecting a 5 frame pattern of telecine converted interlaced video 405. In the illustrated example, telecine converted interlaced video 405 has a frame rate of 59.94 fields per second, however telecine converted interlaced video 405 may have any suitable frame rate.

As shown, process 410 may include dropping or removing inserted fields (e.g., represented by X-outs in FIG. 4B). For example, 2 fields represented by X-outs such as fields b0 and c1 may be dropped from telecine converted interlaced video 405. Such field dropping may be performed on every set of 5 telecined frames for example to generate interlaced video 411 including fields 412. As shown, interlaced video 411 may alternate top and bottom fields as discussed herein. Furthermore, as shown, process 410 may include combining fields 412 to form frames 413 of progressive video 414. For example, associated fields a0, a1 may be combined to form frame A, associated fields b0, b1 may be combined to form frame B, associated fields c0, c1 may be combined to form frame C, associated fields d0, d1 may be combined to form frame D, and so on.

For example, process 410 of telecine reversal includes receiving telecine converted interlaced video 405 (e.g., telecined video fields), providing video fields after detection and deletion of two redundant fields per 5 frame cycle (e.g., interlaced video 411), and combining fields pairs to form frames (e.g., frames 413 of progressive video 414). Process 410, when applied on telecined film content generated via 2:3:3:2 pull down, may be fully reversible, generating 4 frames from every set of 5 telecined frames, resulting in overall film frame rate of 24 frames per second from telecined 30 (e.g., specifically 29.97) frames per second video.

As discussed, the 2:3:3:2 pattern may provide the advantage of simplicity of reversal. However, such a 2:3:3:2 pattern may produce more judder in rendering motion than other patterns such as the 3:2 pattern discussed herein.

Figure 27A:
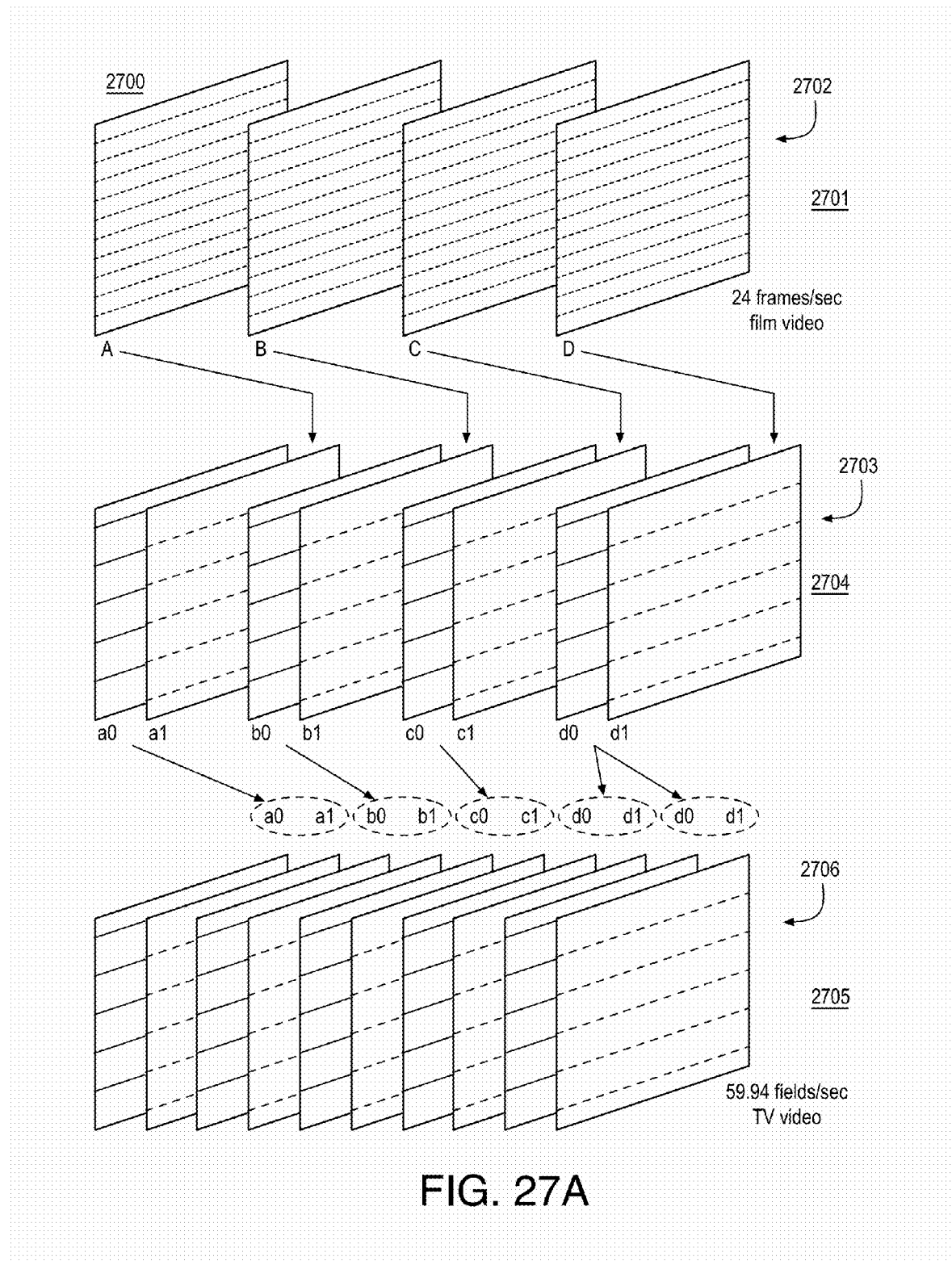
FIG. 27A is a diagram illustrating an example 4:1 pull down telecine process.

FIG. 27A is a diagram illustrating an example 4:1 pull down telecine process 2700, arranged in accordance with at least some implementations of the present disclosure. As shown in FIG. 27A, process 2700 may include receiving original progressive video 2701 having frames 2702 (e.g., frames A, B, C, and D). In the illustrated example, progressive video 2701 has a frame rate of 24 frames per second, however progressive video 2701 may have any suitable frame rate. As shown, process 2700 may include splitting each of frames 2702 into two fields to generate fields 2703 of interlaced video 2704. For example, frame A may be split into a top field a0 and a bottom field a1, frame B may be split into a top field b0 and a bottom field b1, frame C may be split into a top field c0 and a bottom field c1, frame D may be split into a top field d0 and a bottom field d1, and so on. For example, each of frames 2702 though progressive may be thought of as including two fields as in the case of interlaced frames. For example, even numbered lines of the frame may represent one field (e.g., the top field) and odd numbered lines of the frame may represent the second field (e.g., the bottom field). As shown the frame rate of interlaced video 2704 may be the same as the frame rate of progressive video 2701, but the field rate of interlaced video 2704 may be twice the frame rate of progressive video 2701.

As shown, process 2700 may include generating 5 interlaced frames per 4 progressive frames by inserting copies (or averages or the like) of certain fields to generate telecine converted interlaced video 2705 including fields 2706. For example, such processing may increase the frame rate from 24 frames per second to 30 frames per second (e.g., technically 29.97 frames per second). For example, 2 new fields may be copied from interlaced video 2704 and inserted into telecine converted interlaced video 2705 (e.g., thereby stretching the pattern from 8 fields (4 frames) to 10 fields (5 frames)).

For example, in order to convert interlaced video 2704 to telecine converted interlaced video 2705, fields a0, a1 may be copied, fields b0, b1 may be copied, fields c0, c1 may be copied, fields d0, d1, and new (e.g., copied and inserted) fields d0 and d1 may be inserted after copied fields d0, d1 as shown. In the illustrated example, copies of fields d0 and d1 were inserted into telecine converted interlaced video 2705. The location of such inserted fields may maintain the alternating order of fields between top fields and bottom fields (e.g., x0, x1, y0, y1, and so on).

For example, process 2700 may begin with film content at 24 frames per second with frames A, B, C, and D. Such a set of 4 frames may be telecined to a set of 5 frames using a 4:1 pull down pattern as shown. In some examples, the pull down pattern of FIG. 27A may be considered pull down pattern 4:1a as discussed herein. As discussed, to generate the 4:1a pull down pattern, two fields (e.g., d0, d1) corresponding to a frame (e.g., frame D) are repeated once every group of 4 frames (8 fields) to create a group of corresponding 5 frames (10 fields) that may be output as 60 fields per second video (30 frames per second). For example, a 4:1a pull down pattern telecine method may include converting 24 progressive frames per second video to 30 interlaced frames per second by repeating the last frame of each group of 4 input frames, resulting in outputting a corresponding group of 5 frames. For example, telecine converted interlaced video 2705 may be an output video stream.

Figure 27B:
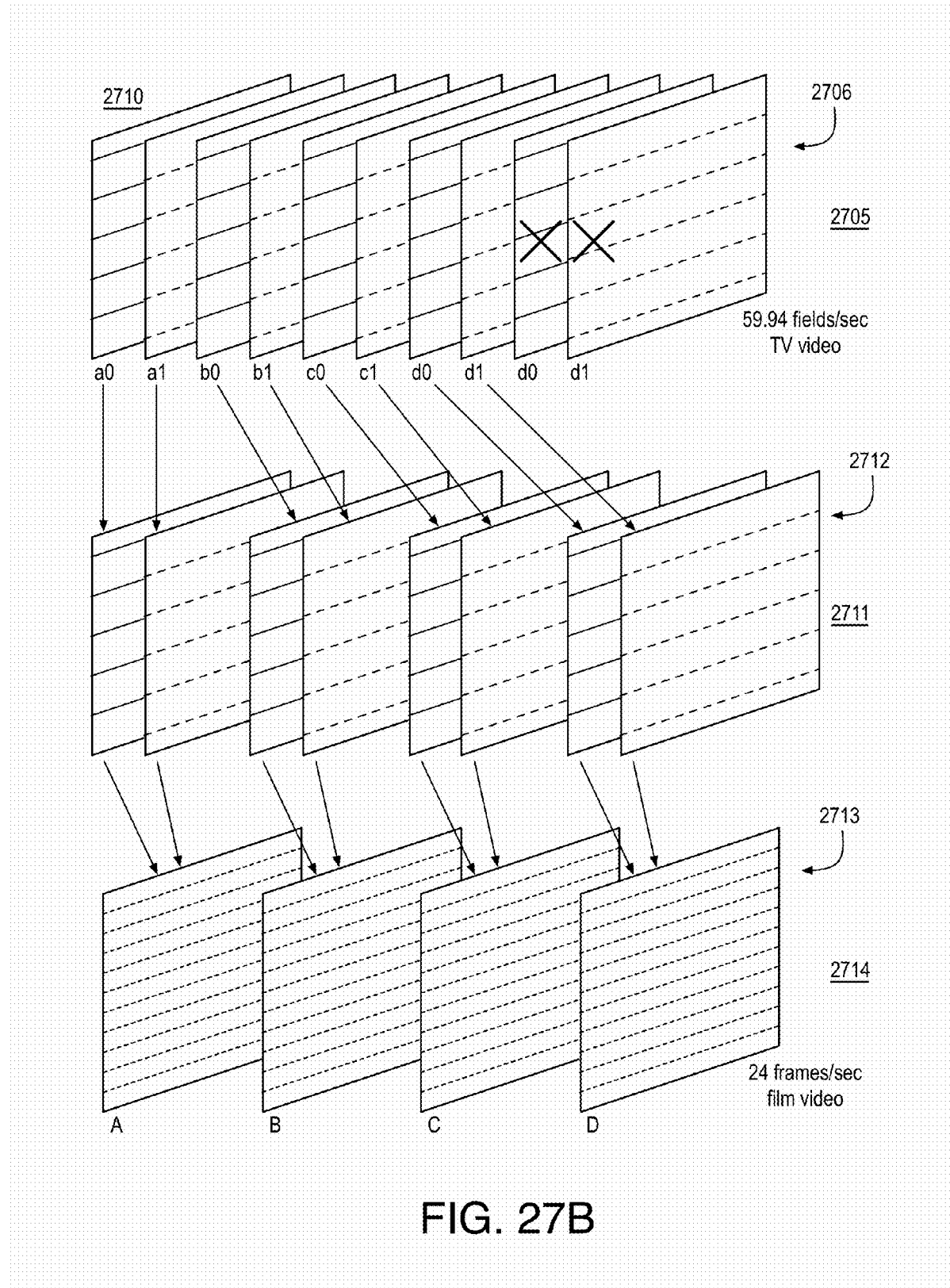
FIG. 27B is a diagram illustrating an example process of reversal of a 4:1 pull down telecine process.

FIG. 27B is a diagram illustrating an example process 2710 of reversal of a 4:1 pull down telecine process, arranged in accordance with at least some implementations of the present disclosure. For example, process 2710 may operate on 4:1a pull down patterned video as discussed with respect to FIG. 27A. Process 2710 may include detecting a 5 frame pattern of telecine converted interlaced video 2705, removing the inserted extra fields (e.g., undoing the telecine process) and re-generating 4 frames per 5 telecined frames, reducing the overall frame rate back to 24 frames per second from telecined 30 (e.g., specifically 29.97) frames per second. For example, as shown in FIG. 27B, process 2710 may include receiving telecine converted interlaced video 2705 (e.g., fields a0, a1, b0, b1, c0, c1, d0, d1, d0, and d1) and/or detecting a 5 frame pattern of telecine converted interlaced video 2705. In the illustrated example, telecine converted interlaced video 2705 has a frame rate of 59.94 fields per second, however telecine converted interlaced video 2705 may have any suitable frame rate.

As shown, process 2710 may include dropping or removing inserted fields (e.g., represented by X-outs in FIG. 27B). For example, 2 fields represented by X-outs such as fields d0 and d1 may be dropped from telecine converted interlaced video 2705. Such field dropping may be performed on every set of 5 telecined frames for example to generate interlaced video 2711 including fields 2712. As shown, interlaced video 2711 may alternate top and bottom fields as discussed herein. Furthermore, as shown, process 2710 may include combining fields 2712 to form frames 2713 of progressive video 2714. For example, associated fields a0, a1 may be combined to form frame A, associated fields b0, b1 may be combined to form frame B, associated fields c0, c1 may be combined to form frame C, associated fields d0, d1 may be combined to form frame D, and so on.

For example, process 2710 of telecine reversal includes receiving telecine converted interlaced video 2705 (e.g., telecined video fields), providing video fields after detection and deletion of two redundant fields per 5 frame cycle (e.g., interlaced video 2711), and combining fields pairs to form frames (e.g., frames 2713 of progressive video 2714). For example, the process for reversal of the 4:1a telecine pattern may include detecting the pattern and removing the redundant pair of fields (e.g., d0, d1) every 5 frames. Process 2710, when applied on telecined film content generated via 4:1 pull down such as 4:1a pull down, may be fully reversible, generating 4 frames from every set of 5 telecined frames, resulting in overall film frame rate of 24 frames per second from telecined 30 (e.g., specifically 29.97) frames per second video.

Figure 28A:
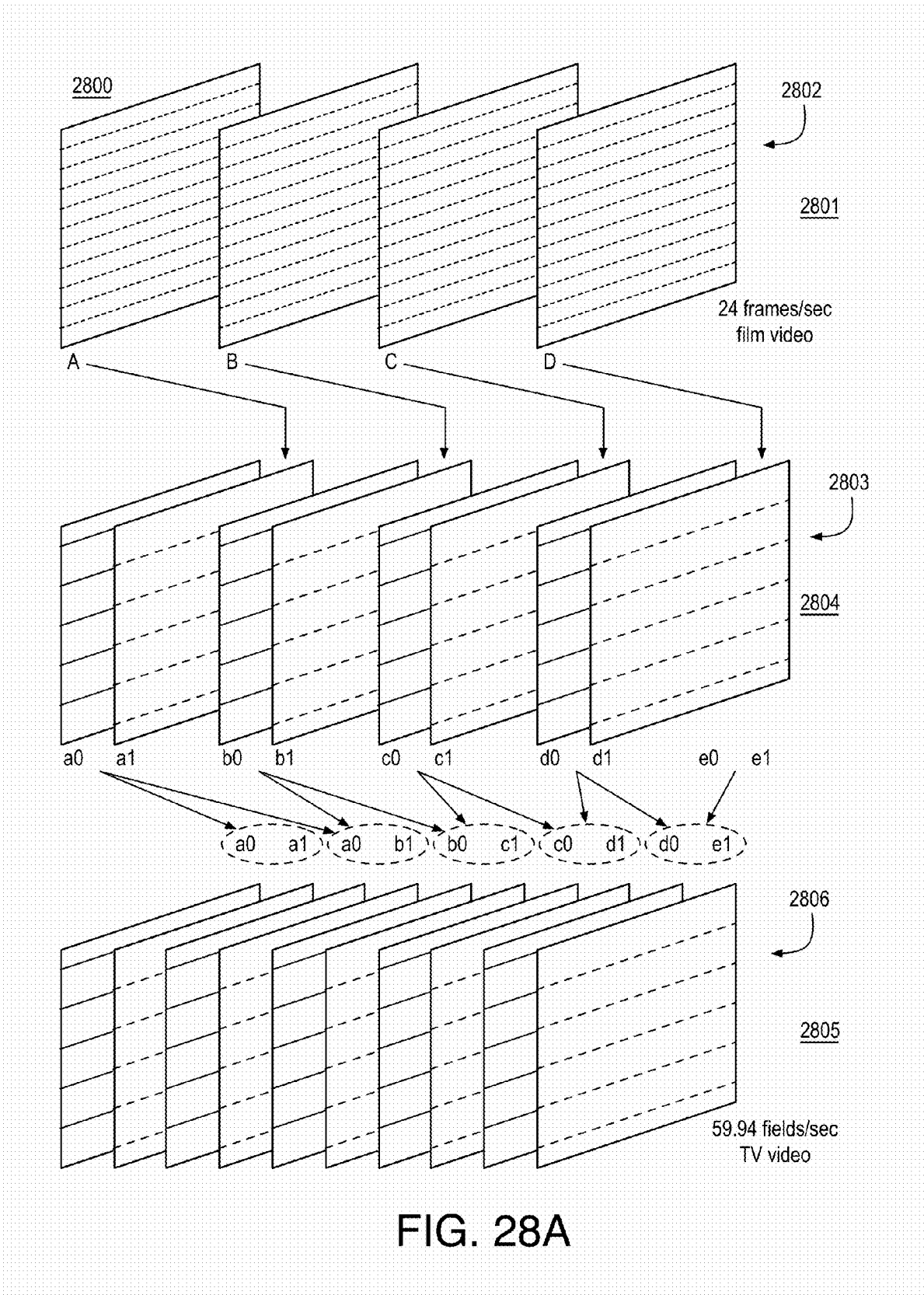
FIG. 28A is a diagram illustrating an example 4:1 pull down telecine process.

FIG. 28A is a diagram illustrating an example 4:1 pull down telecine process 2800, arranged in accordance with at least some implementations of the present disclosure. As shown in FIG. 28A, process 2800 may include receiving original progressive video 2801 having frames 2702 (e.g., frames A, B, C, and D). In the illustrated example, progressive video 2801 has a frame rate of 24 frames per second, however progressive video 2801 may have any suitable frame rate. As shown, process 2800 may include splitting each of frames 2802 into two fields to generate fields 2803 of interlaced video 2804. For example, frame A may be split into a top field a0 and a bottom field a1, frame B may be split into a top field b0 and a bottom field b1, frame C may be split into a top field c0 and a bottom field c1, frame D may be split into a top field d0 and a bottom field d1, and so on. For example, each of frames 2802 though progressive may be thought of as including two fields as in the case of interlaced frames. For example, even numbered lines of the frame may represent one field (e.g., the top field) and odd numbered lines of the frame may represent the second field (e.g., the bottom field). As shown the frame rate of interlaced video 2804 may be the same as the frame rate of progressive video 2801, but the field rate of interlaced video 2804 may be twice the frame rate of progressive video 2801.

As shown, process 2800 may include generating 5 interlaced frames per 4 progressive frames by inserting copies (or averages or the like) of certain fields to generate telecine converted interlaced video 2805 including fields 2806. For example, such processing may increase the frame rate from 24 frames per second to 30 frames per second (e.g., technically 29.97 frames per second). For example, 2 new fields may be copied from interlaced video 2804 and inserted into telecine converted interlaced video 2805 (e.g., thereby stretching the pattern from 8 fields (4 frames) to 10 fields (5 frames)).

For example, in order to convert interlaced video 2804 to telecine converted interlaced video 2805, fields a0, a1 may be copied, a new (e.g., copied and inserted) field a0 may be inserted after the copied field a1, fields b1 and b0 may be swapped, fields c1 and c0 may be swapped, fields d0 and d1 may be swapped, and new (e.g., copied and inserted) field e1 may be inserted after field d0 as shown. In the illustrated example, copies of fields a0 and e1 were inserted into telecine converted interlaced video 2805. The location of such inserted fields (ad swaps of other fields) may maintain the alternating order of fields between top fields and bottom fields (e.g., x0, x1, y0, y1, and so on).

For example, process 2800 may begin with film content at 24 frames per second with frames A, B, C, and D. Such a set of 4 frames may be telecined to a set of 5 frames using a 4:1 pull down pattern as shown. In some examples, the pull down pattern of FIG. 28A may be considered pull down pattern 4:1b as discussed herein. As discussed, to generate the 4:1b pull down pattern, two fields (e.g., a0, e1) are repeated once every group of 4 frames (8 fields) to create a group of corresponding 5 frames (10 fields) that may be output as 60 fields per second video (30 frames per second). For example, the telecine method of pattern 4:1b may include converting 24 progressive frames per second video to 30 interlaced frames per second by first outputting a pair of fields for each frame as is and outputting a sequence of 4 (pseudo) interlaced frames generated from consecutive pairs of frames. For example, telecine converted interlaced video 2805 may be an output video stream.

Figure 28B:
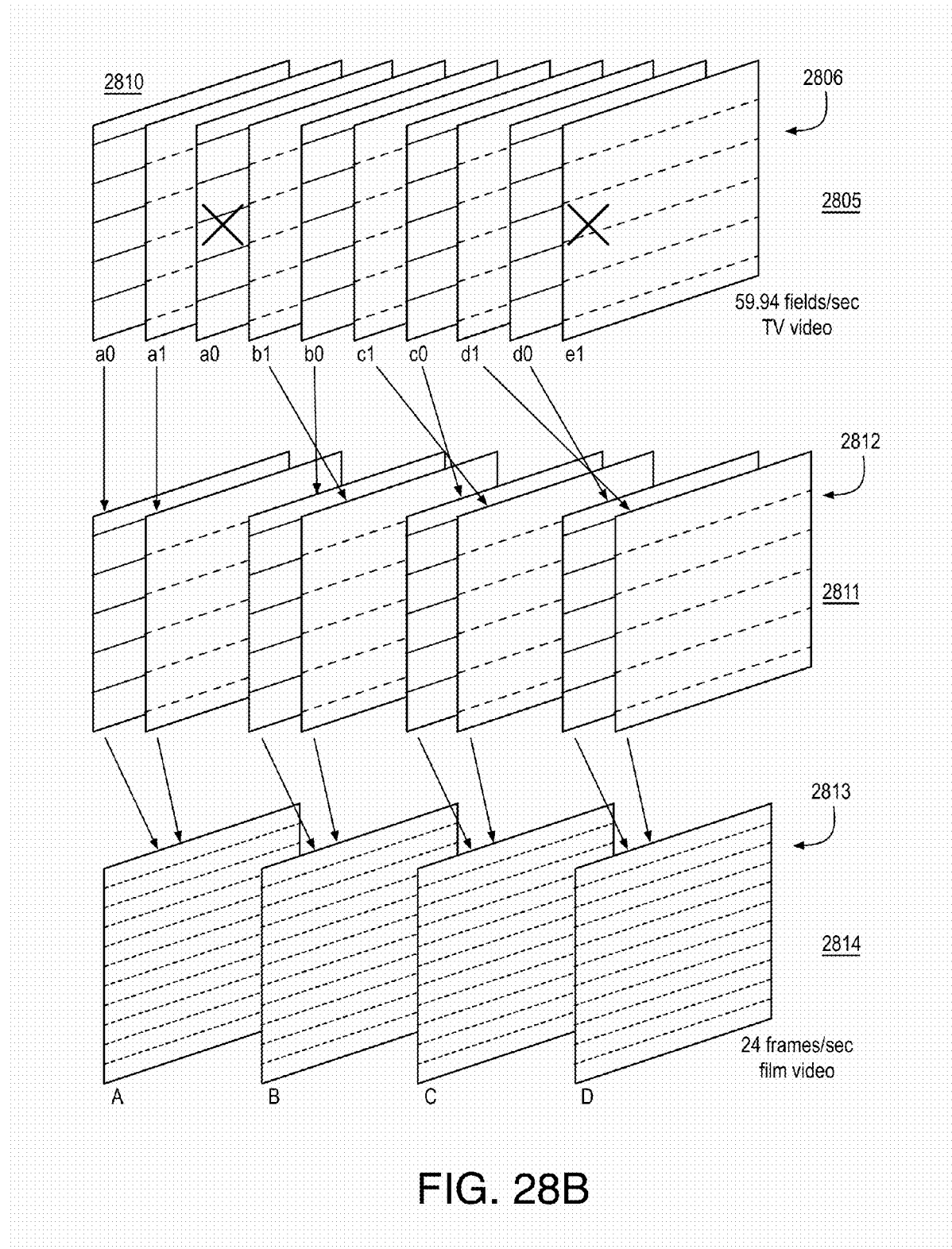
FIG. 28B is a diagram illustrating an example process of reversal of a 4:1 pull down telecine process.

FIG. 28B is a diagram illustrating an example process 2810 of reversal of a 4:1 pull down telecine process, arranged in accordance with at least some implementations of the present disclosure. For example, process 2810 may operate on 4:1b pull down patterned video as discussed with respect to FIG. 28A. Process 2810 may include detecting a 5 frame pattern of telecine converted interlaced video 2805, removing the inserted extra fields (e.g., undoing the telecine process) and re-generating 4 frames per 5 telecined frames, reducing the overall frame rate back to 24 frames per second from telecined 30 (e.g., specifically 29.97) frames per second. For example, as shown in FIG. 28B, process 2810 may include receiving telecine converted interlaced video 2805 (e.g., fields a0, a1, a0, b1, b0, c1, c0, d1, d0, and e1) and/or detecting a 5 frame pattern of telecine converted interlaced video 2805. In the illustrated example, telecine converted interlaced video 2805 has a frame rate of 59.94 fields per second, however telecine converted interlaced video 2805 may have any suitable frame rate.

As shown, process 2810 may include dropping or removing inserted fields (e.g., represented by X-outs in FIG. 28B). For example, 2 fields represented by X-outs such as fields a0 and e1 may be dropped from telecine converted interlaced video 2805. Such field dropping may be performed on every set of 5 telecined frames for example to generate interlaced video 2811 including fields 2812. Furthermore, process 2810 may include swapping fields to form interlaced video 2811. For example, fields b1 and b0 may be swapped, fields c1 and c0 may be swapped, and fields d1 and d0 may be swapped. As shown, interlaced video 2811 may alternate top and bottom fields as discussed herein. Furthermore, as shown, process 2810 may include combining fields 2812 to form frames 2813 of progressive video 2814. For example, associated fields a0, a1 may be combined to form frame A, associated fields b0, b1 may be combined to form frame B, associated fields c0, c1 may be combined to form frame C, associated fields d0, d1 may be combined to form frame D, and so on.

For example, process 2810 of telecine reversal includes receiving telecine converted interlaced video 2805 (e.g., telecined video fields), providing video fields after detection and deletion of two redundant fields per 5 frame cycle (e.g., interlaced video 2811), and combining fields pairs to form frames (e.g., frames 2813 of progressive video 2814). For example, the processes for the reversal of the 4:1b pull down pattern may include deleting the redundant second a0 field and the first e1 field and parity reversal of field pairs (e.g., (b1, b0), (c1, c0), and (d1, d0)) to provide 24 frames per second video. Process 2810, when applied on telecined film content generated via 4:1 pull down such as 4:1b pull down, may be fully reversible, generating 4 frames from every set of 5 telecined frames, resulting in overall film frame rate of 24 frames per second from telecined 30 (e.g., specifically 29.97) frames per second video.

As discussed, beyond the 3:2 pattern, the 2:3:3:2 pattern, and the 4:1 patterns (e.g., pattern 4:1a and 4:1b) discussed herein, there may be many other telecine patterns that may be used for telecine conversion. In some examples, the telecine pattern used for content may not be known (e.g., associated with the content) as telecine conversion may be part of the content creation and such conversion may not be signaled or documented for users of the content.

Furthermore, as discussed, in some examples, telecine conversion techniques may use synthesized fields instead of actual (e.g., copied) fields for field insertion. For example, synthesized fields may be generated by equal or distance weighted averaging of neighboring actual fields. Such synthesized fields may be used in cartoon or animation content, for example. In such examples, nuance may be needed for cartoon or animation content that is often available at very low input frame rates between 6 and 12 frames per second. In such examples, instead of repeating fields or frames, averaging of frames or fields to either directly generate 30 frames per second (or 60 fields per second) video or first generating 24 frames per second video and then going through telecine conversion to 30 frames per second (60 fields per second) video may be implemented. In some examples, telecine conversion techniques may use a combination of field repeating for certain fields and field synthesis for generation of other fields for telecine conversion. In such examples, synthesized fields may be very difficult or impossible to reverse.

Although, in some examples, pull down pattern detection may not be difficult, in other examples, there are several reasons that telecine pattern detection may be difficult. Such difficulty of detection may, in turn, makes the telecine reversal difficult and/or inaccurate. First, in low detailed or low contrast scenes, detection may be difficult as it may be difficult to uniquely find the start of the 5 frame pattern. Second, editing video scenes (e.g., shortening of program length, insertion of commercials, stretching of time to fill a time length) may result in partial or broken telecine patterns (e.g., broken 3:2 patterns or broken 2:3:3:2 patterns or the like) making pattern detection difficult. Third, as discussed, there are multiple telecine patterns that may be used such that determining which pattern was used in itself is a challenge. A combination of these reasons and others makes telecine inversion challenging.

As discussed, there may be a need for reversal of telecine patterns. Furthermore, there may also be a need for deinterlacing (e.g., reversal of interlace) when video of interlaced format is used. For example, video of 30 interlaced frames per second after deinterlacing may be converted to either 30 or 60 frames per second progressive video. For example, reasons for deinterlacing of interlaced video to generate progressive video may include a desire for the eventual display of the video on devices that largely demand progressive video and the increased need to convert video to progressive format for compression.

Figure 5A:
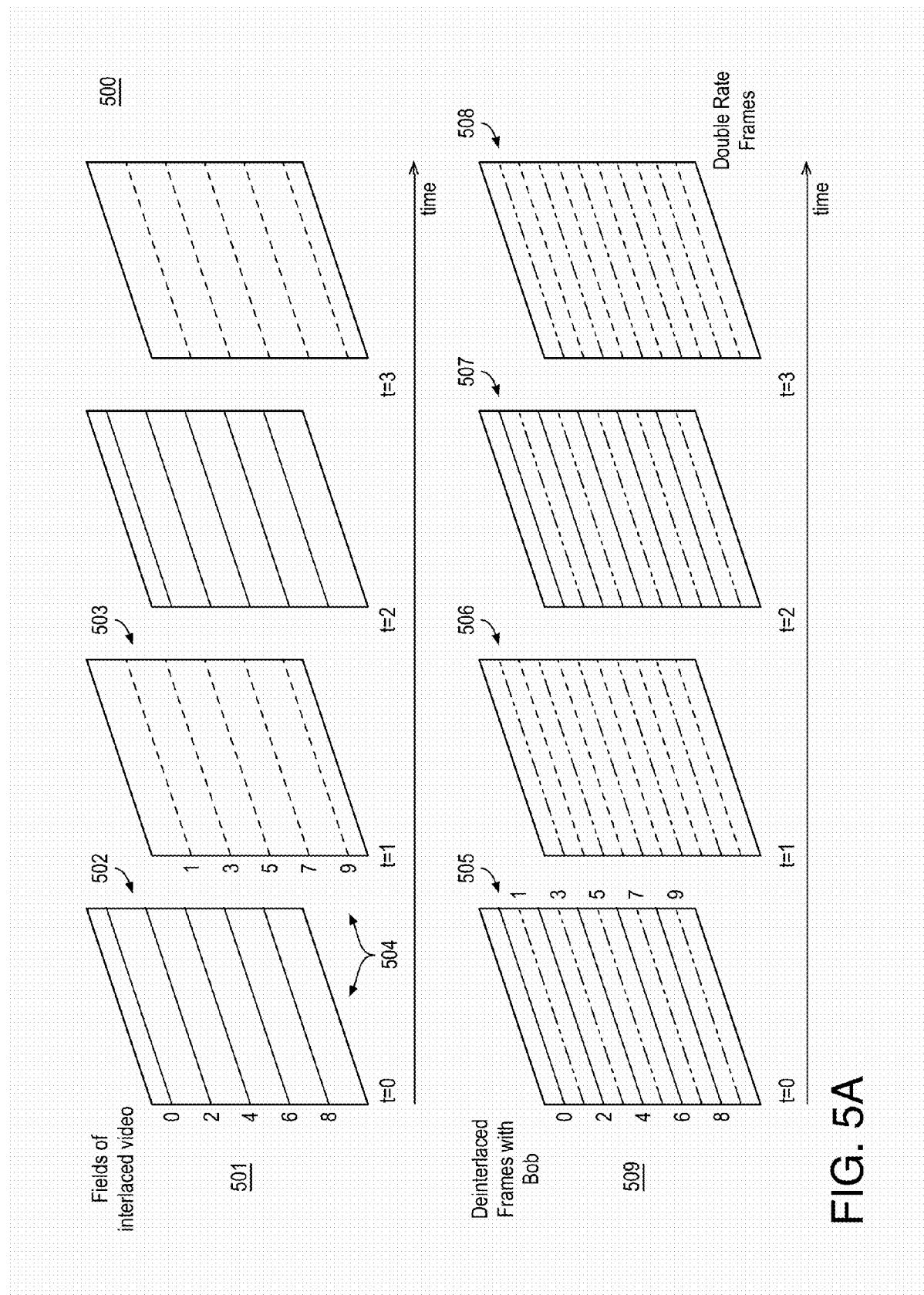
FIG. 5A is a diagram illustrating an example process for deinterlacing interlaced video.

FIG. 5A is a diagram illustrating an example process 500 for deinterlacing interlaced video 501, arranged in accordance with at least some implementations of the present disclosure. For example, process 500 may illustrate an example Bob deinterlacing technique. As shown in FIG. 5A, interlaced video 501 may include a top field 502 and a bottom field 503 of an interlaced frame 504. For example, top fields including top field 502 may be at even times (e.g., t=0, 2, and so on) and bottom fields including bottom field 503 may be at odd times (e.g., t=1, 3, and so on). Furthermore, top fields including top field 502 may include even scan lines (e.g., scan lines 0, 2, 4, 6, 8, and so on) and bottom fields including bottom field 503 may include even odd scan lines (e.g., scan lines 1, 3, 5, 7, 9, and so on). As shown, a Bob deinterlacing technique may double the lines at each time location by generating odd lines (e.g., lines 1, 3, 5, 7, 9, and so on) at even times and generating even lines (e.g., 0, 2, 4, 6, 8, and so on) at odd times. Such line generation may generate progressive frames 505-508 of progressive video 509.

For example, deinterlacing with Bob may include first considering each interlaced frame of video as composed of 2 fields, a top field and a bottom field each with half the number of lines of a frame and offset by half the vertical line interval (e.g., as shown with respect to top field 502 and bottom field 503). As shown in FIG. 5A, interlaced video 501 may include a sequence of top fields at even time (e.g., t=0, 2, 4, . . . ) locations with each field including even lines (e.g., 0, 2, 4, 6, 8, . . . ), and a sequence of bottom fields at odd time (e.g., t=1, 3, 5, . . . ) locations with each field including odd lines (e.g., 1, 3, 5, 7, 9, . . . ). As discussed, a Bob deinterlacer may doubles the lines at each time location, for example by generating odd lines (e.g., 1, 3, 5, 7, 9, . . . ) at even time locations (e.g., t=0, 2, 4, . . . ) and generating even lines (e.g., 0, 2, 4, 6, 8, . . . ) at odd time locations (e.g., t=1, 3, 5, . . . ).

A Bob deinterlacer may generate the missing lines using any suitable technique or techniques. For example, a Bob deinterlacer may generate the missing lines by repeating lines (e.g., copying a line above or below the missing line). In other examples, a Bob deinterlacer may generate missing lines by averaging a line above and line below the missing line to synthesize the missing line (e.g., averaging lines 2 and 4 to generate line 3). In yet other examples, a Bob deinterlacer may use a longer tap filter across several lines above and below the missing line to synthesize the missing line. As discussed, a Bob deinterlacer generates output with twice the frame rate than the input frame rate (e.g., in the example of FIG. 5A, a frame is provided at each time t=0, 1, 2, 3 instead of even times t=0, 2). Although a Bob deinterlacer may increase frame rate, some artifacts such as jagged effects on oblique lines and flickering in areas of sharp edges (e.g., static text) may occur. In some Bob deinterlacers, such as those using interpolation filters, such artifacts may be present but less prominent.

Figure 5B:
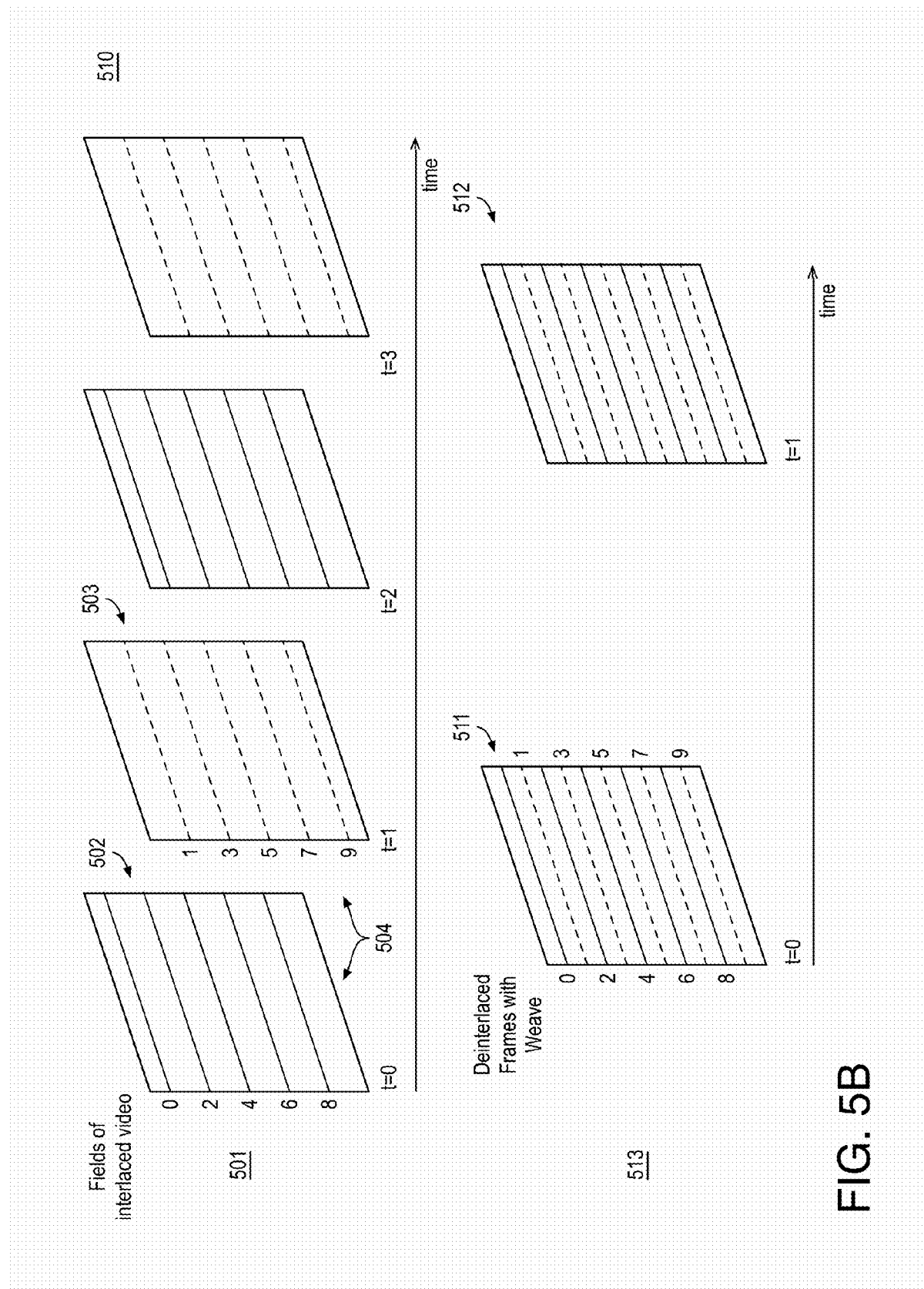
FIG. 5B is a diagram illustrating an example process for deinterlacing interlaced video.

FIG. 5B is a diagram illustrating an example process 510 for deinterlacing interlaced video 501, arranged in accordance with at least some implementations of the present disclosure. For example, process 510 may illustrate an example Weave deinterlacing technique. As shown in FIG. 5B, interlaced video 501 may include top field 502 and bottom field 503 of interlaced frame 504 as discussed with respect to FIG. 5A. For example, top fields including top field 502 may be at even times (e.g., t=0, 2, and so on) and bottom fields including bottom field 503 may be at odd times (e.g., t=1, 3, and so on). Furthermore, top fields including top field 502 may include even scan lines (e.g., scan lines 0, 2, 4, 6, 8, and so on) and bottom fields including bottom field 503 may include even odd scan lines (e.g., scan lines 1, 3, 5, 7, 9, and so on). As shown, a Weave deinterlacing technique may combine such top and bottom fields to generate progressive frames 511, 512 of progressive video 513.

For example, a Weave deinterlacer may treat each pair of fields as a single frame unit as shown in FIG. 5B. Such a Weave deinterlacer may allow for retaining full vertical resolution, albeit at half the frame rate as compared to a Bob deinterlacer. In examples where there little motion between fields, a Weave deinterlacer may result in preservation of details but in examples where there is motion between fields, a Weave deinterlacer may result in an artifacts such as serration or combing artifacts or the like such that the position of a moving edge in each field is shifted (e.g., not the same).

As discussed, Bob and Weave deinterlacers may be used to deinterlacer interlaced video. In some examples, Bob and Weave deinterlacers may be combined to deinterlace interlaced video. For example, regions of fields or frames may be analyzed to determine which regions are stationary and which regions are moving. In such examples, different deinterlacers may be used for stationary and moving regions (e.g., different deinterlacers may be used for different regions). For example, in regions where there is motion, missing pixels may be generated by a Bob deinterlacer using line repeating or an interpolation filter (e.g., a linear filter, a cubic filter, etc.). In stationary regions, a Weave deinterlacer may be used that generates missing pixels by copying from the previous field. Such use of different deinterlacing techniques for different regions may reduce artifacts in the resultant progressive video.

Figure 6:
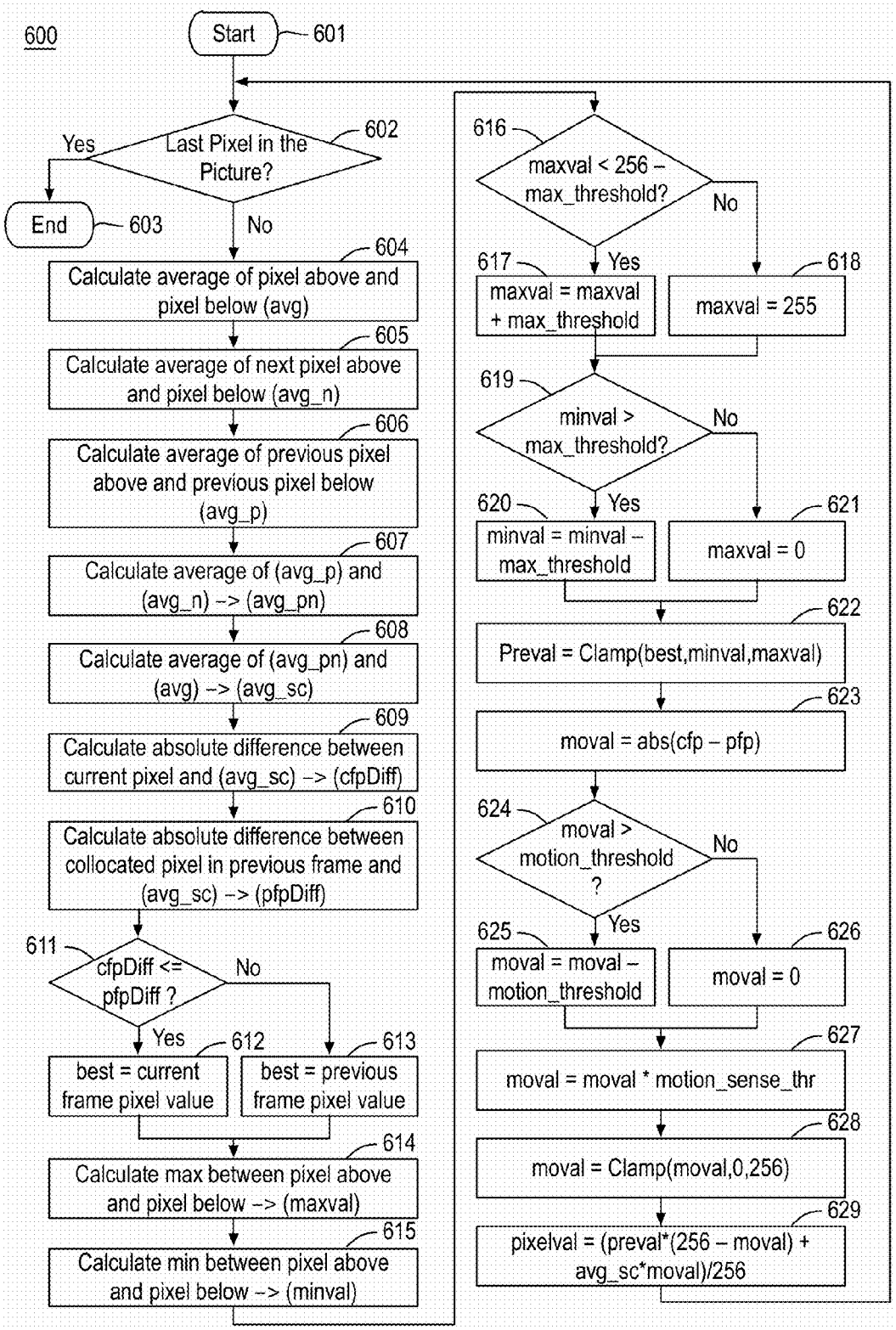
FIG. 6 is a flow diagram illustrating an example process for deinterlacing interlaced video.

FIG. 6 is a flow diagram illustrating an example process 600 for deinterlacing interlaced video, arranged in accordance with at least some implementations of the present disclosure. Process 600 may include one or more operations 601-629 as illustrated in FIG. 6. Process 600 may be performed by a device to deinterlace interlaced video, for example. In some examples, process 600 may be used to implement a GreedyH deinterlacer.

For example, a GreedyH deinterlacer may include an improved Greedy deinterlacer for high motion content. A GreedyH deinterlacer may first analyze spatial variations (e.g., pixels of a line above and line below missing pixels and previous field (e.g., intra) and previous frame (e.g., inter) variations to derive pixels of missing lines. For example, in the case of stationary content, the temporal neighbor is likely to have value between vertical neighbors in current field and in the case of motion, intra field interpolation is likely to provide more accurate pixel values as correlation between samples of current field is likely the highest. For example, GreedyH deinterlacing may produce good properties on vertical edges at the expense of distortion of vertical detail and the appearance of aliasing. Process 600 will be discussed with respect to the following pixel layout.

E A C
x y z
F B D where pixels x, y, z may be missing (e.g., and determined via process 6000 and pixels A-F may be known pixels. As shown, pixels E, A, C may be above pixels x, y, z, respectively and pixels F, B, D may be below pixels x, y, z, respectively Process 600 may begin from start operation 601 at decision operation 602, "Last Pixel in the Picture", where it may be determined if the current pixel is the last pixel in the picture. If so, process 600 may end at end operation 603.

If not, process 600 may continue at operation 604, "Calculate average of pixel above and pixel below (avg)", where an average of the pixel above and below a current pixel may be determined. For example, if the current pixel is y, the average, avg, may be determined as avg=o=(A+B)/2.

Process 600 may continue at operation 605, "Calculate average of next pixel above and pixel below (avg_n)", where an average of the next pixel above and next pixel below the current pixel may be determined. For example, if the current pixel is y, the next average, avg_n, may be determined as avg_n=p=(C+D)/2.

Process 600 may continue at operation 606, "Calculate average of previous pixel above and previous pixel below (avg_p)", where an average of the previous pixel above and previous pixel below the current pixel may be determined. For example, if the current pixel is y, the previous average, avg_p, may be determined as avg_p=q=(E+F)/2.

Process 600 may continue at operation 607, "Calculate average of (avg_p) and (avg_n)→(avg_pn)", where an average of the previous pixel average and next pixel average may be determined for the current pixel. For example, if the current pixel is y, the average of the previous pixel average and the next pixel average, avg_pn, may be determined as avg_pn=r=(p+q)/2.

Process 600 may continue at operation 608, "Calculate average of (avg_pn) and (avg)→(avg_sc)", where an average of the average of the pixel above and the pixel below and the average of the previous pixel average and next pixel average may be determined for the current pixel. For example, if the current pixel is y, the discussed average, avg_sc, may be determined as avg_sc=s=(o+r)/2.

Process 600 may continue at operation 609, "Calculate absolute difference between current pixel and (avg_sc)→(cfpDiff)", where an absolute difference between the current pixel (of the previous field) and the average determined at operation 608 may be determined for the current pixel. For example, if the current pixel is y, the absolute difference between the current pixel and the average determined at operation 608, cfpDiff, may be determined as cfpDiff=u=abs(t−s), where t is the current pixel (of the previous field).

Process 600 may continue at operation 610, "Calculate absolute difference between collocated pixel in previous frame and (avg_sc)→(pfpDiff)", where an absolute difference between a collocated pixel in a previous frame and the average determined at operation 608 may be determined for the current pixel. For example, if the current pixel is y, the absolute difference between the collocated pixel and the average determined at operation 608, pfpDiff, may be determined as pfpDiff=v=abs(w−s), where w is the collocated pixel.

Process 600 may continue at decision operation 611, "cfpDiff<=pfpDiff", where a determination may be made as to whether the absolute difference between the current pixel and the average determined at operation 608 is less than or equal to (e.g., not greater than) the absolute difference between the collocated pixel and the average determined at operation 608.

If so, process 600 may continue at operation 612, "best=current frame pixel value", where the best value for the current missing pixel may be determined as the current frame pixel value (e.g., of the previous field). For example, if the current pixel is y, the best value, b, may be determined as b=t.

If not, process 600 may continue at operation 612, "best=previous frame pixel value", where the best value for the current missing pixel may be determined as the previous frame pixel value. For example, if the current pixel is y, the best value, b, may be determined as b=w.

Process 600 may continue at operation 614, "Calculate max between pixel above and pixel below→(maxval)", where a max between the pixel above and the pixel below the current missing pixel may be determined. For example, if the current pixel is y, the max between the pixel above and the pixel below the current missing pixel, maxval, may be determined as maxval=m=max(A, B).

Process 600 may continue at operation 615, "Calculate min between pixel above and pixel below→(minval)", where a min between the pixel above and the pixel below the current missing pixel may be determined. For example, if the current pixel is y, the min between the pixel above and the pixel below the current missing pixel, minval, may be determined as minval=n=min(A, B).

Process 600 may continue at decision operation 616, "maxval<256−max_threshold?", where a determination may be made as to whether the max between the pixel above and the pixel below the current missing pixel is less than the difference between 256 (e.g. a maximum allowed value) and max_threshold. For example, max_threshold, t1, may be provided as a predetermined threshold value and the decision at operation 616 may be determined as to whether m<256−t1.

If so, process 600 may continue at operation 617, "maxval=maxval+max_threshold", where maxval may be updated as maxval+max_threshold. For example, maxval may be provided as maxval=maxval+max_threshold. (e.g., m+=t1).

If not, process 600 may continue at operation 618, "maxval=255", where maxval may be updated as 255. For example, maxval may be provided as maxval=255.

Process 600 may continue at decision operation 619, "minval<max_threshold?", where a determination may be made as to whether the min between the pixel above and the pixel below the current missing pixel is less than the previously discussed max_threshold, t1. For example, the decision at operation 619 may be determined as to whether n<t1.

If so, process 600 may continue at operation 620, "minval=minval−max_threshold", where minval may be updated as minval−max_threshold. For example, minval may be provided as minval=minval−max_threshold. (e.g., n=n−t1).

If not, process 600 may continue at operation 621, "minval=0", where minval may be updated as 0. For example, minval may be provided as minval=n=0.

Process 600 may continue at operation 622, "Preval=Clamp(best,minval,maxval)", where an estimate may be determined based on a clamping operation using best (e.g., b), minval (e.g. n), and maxval (e.g., m). For example, the estimate, j, may be determined as j=clamp(b, m, n).

Process 600 may continue at operation 623, "moval=abs (cfp−pfp)", where a motion value may be determined based on the current frame pixel (e.g., of the previous field) and the previous frame pixel. For example, the motion value, moval or k, may be determined as moval=k=abs(cfp−pfp)=abs(t−w).

Process 600 may continue at decision operation 624, "moval>motion_threshold ?", where a determination may be made as to whether the motion value is greater than a motion threshold. For example, the motion threshold, motion_threshold or t2 may be a predetermined motion threshold. For example, the decision at operation 624 may be determined as whether k>t2.

If so, process 600 may continue at operation 625, "moval=moval−motion_threshold", where moval may be updated as moval−motion_threshold. For example, moval may be provided as moval=moval−motion_threshold. (e.g., k=k−t2).

If not, process 600 may continue at operation 626, "moval=0", where moval may be updated as 0. For example, moval may be provided as moval=k=0.

Process 600 may continue at operation 627, "moval=moval*motion_sense_thr", where moval may be updated as moval*motion_sense_thr. For example, motion_sense_thr may be a motion sensing threshold such as a predetermined threshold, t3. For example, moval may be provided as moval=moval*motion_sense_thr. (e.g., k=k·t3).

Process 600 may continue at operation 628, "moval=Clamp(moval,0,256)", where moval may be updated based on a clamping operation using moval, 0, and 256. For example, the update to moval, k, may be determined as k=clamp(moval,0,256).

Process 600 may continue at operation 629, "pixelval= (preval*(256−moval)+avg_sc*moval)/256", where the current missing pixel value may be determined based on the best value (e.g., via preval), moval, and the average determined at operation 608 as discussed. For example the current pixel value, f, may be determined as f=(j*(256−k)+s*k)/256.

As discussed with respect to decision operation 602, operations 604-629 may be repeated for each pixel in the current picture. For example, process 600 may provide a GreedyH deinterlacer implementation.

For example, the operations of process 600 may be provided as follows: 0. Is this the last pixel, if so, exit, else continue to next step; 1. With respect to current pixel, compute average o=(A+B)/2 using pixel above and below of previous field; 2. Calculate average p=(C+D)/2 of next pixel above and next pixel below; 3. Calculate average q=(E+F)/2 of previous pixel above and previous pixel below; 4. Calculate average r=(p+q)/2 using computed previous and next pixels; 5. Calculate average s=(o+r)/2 using average of pixels above and below, and average of next and previous pixels; 6. Calculate absolute difference u=abs(t−s) of current pixel (of previous field) and averaged pixel s; 7. Calculate absolute difference v=abs(w−s) of previous frame pixel and averaged pixels; 8. Compare difference pixels u, and v. if (u<v) b=t, else b=w, where b=best estimate; 9. Calculate m=max(A, B), and n=min(A,B); 10. If (m<256−t1), m+=t1, else m=255, where t1 is max threshold; 11. If (n>t1), n+=t1, else n=0; 12. Calculate estimate j=clamp (b, m, n) where j represents pre value; 13. Calculate k=abs (t−w) where k represents motion value; 14. if (k>t2), k=k−t2, else k=0, where t2 is motion threshold; 15. k=k*t3, where t3 is motion_sense_threshold; 16. k=clamp (k, 0, 256); 17. f=(j*(256−k)+s*k)/256; 18. Go back to step 0.

As discussed, in some examples, deinterlacing may include motion compensation techniques.

Figure 7:
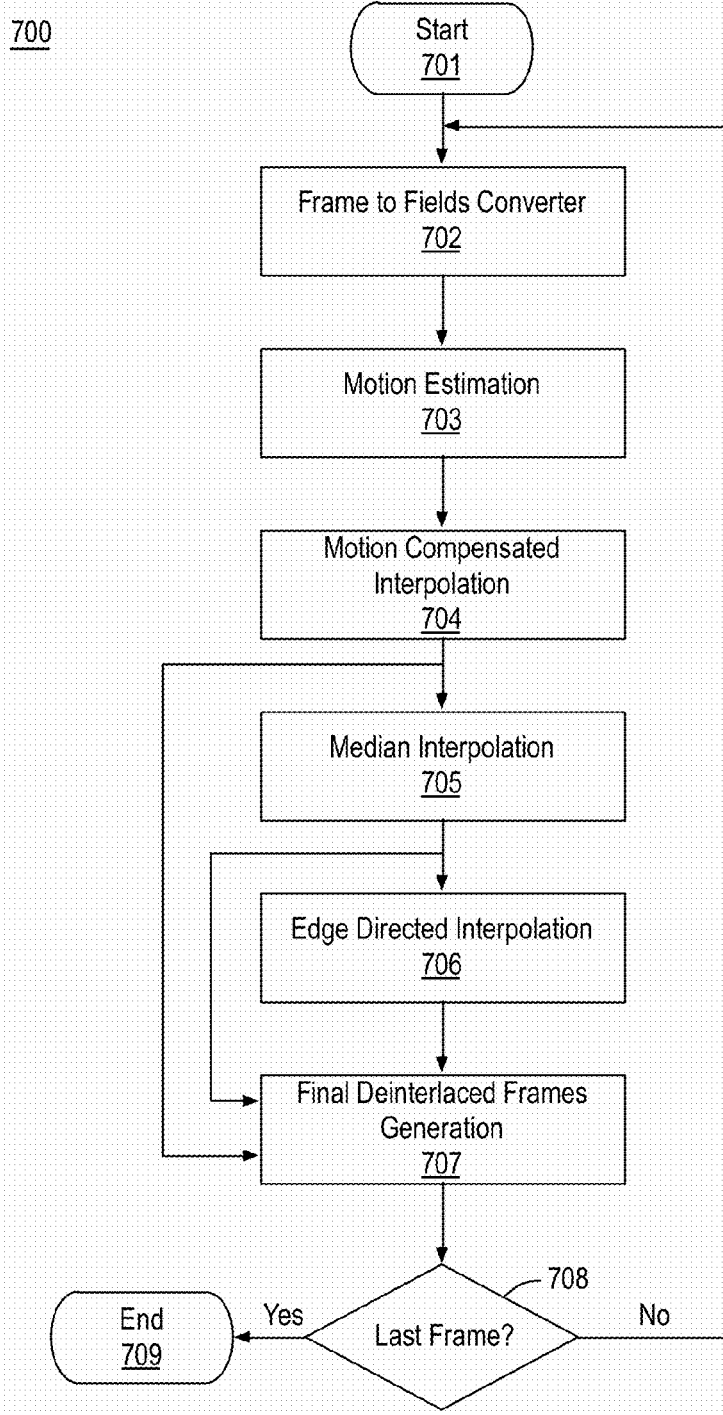
FIG. 7 is a flow diagram illustrating an example adaptive process for deinterlacing interlaced video.

FIG. 7 is a flow diagram illustrating an example adaptive process 700 for deinterlacing interlaced video, arranged in accordance with at least some implementations of the present disclosure. For example, process 700 may use motion compensation interpolation, median filtering, and edge directed interpolation to perform improved deinterlacing. Such a process may provide higher quality deinterlacing at the cost of increased computational complexity. Process 700 may include one or more operations 701-709 as illustrated in FIG. 7. Process 700 may form at least part of a video preprocess as discussed herein.

Process 700 may begin from start operation 701 at decision operation 702, "Frame to Fields Converter", where frames may be converted to fields.

Process 700 may continue at operation 703, "Motion Estimation", where motion estimation may be performed on a block basis between line blocks of fields that are available (e.g., blocks may include lines that are available but such block may not include missing pixels). For example, operation 703 may generate motion vectors on a block basis.

Process 700 may continue at operation 704, "Motion Compensated Interpolation", where the motion vectors determined at operation 703 may be scaled and used to obtain line-blocks to fill in lines for each missing field that needs to be recreated for combining with each existing field to create each deinterlaced frame. For example, the line-blocks may fill in the missing pixels discussed at operation 703.

Process 700 may continue at operation 705, "Median Interpolation", where the blocks having filled lines may be median interpolated. For example, such median interpolation may reduce artifacts such as motion artifacts. For example, a median interpolator may, on a pixel-by-pixel basis take the median value of the pixel in the line immediately above, the pixel in the line immediately below, and the current pixel from the synthesized motion compensated interpolated field. Such median interpolation techniques may introduce artifacts that may be at least partially resolved at operation 706.

Process 700 may continue at operation 706, "Edge Directed Interpolation", where median interpolation determined pixels may be filtered spatial interpolation generated by following edges (e.g., edge directed interpolation) to modify pixels of motion compensated synthesized lines.

Process 700 may continue at operation 707, "Final Deinterlaced Frames Generation", where the edge directed interpolated pixels may be provided as final deinterlaced frames.

Process 700 may continue at decision operation 708, "Last Frame", where a determination may be made as to whether the current frame is the last frame for processing. If so, process 700 may end at end operation 709. If not, process 700 may continue at operation 702 as discussed.

Furthermore, as shown, one or both of operations 706 and 707 may be skipped in process 700. For example, processing may continue directly from operation 704 to operation 707 or processing may continue directly from operation 705 to operation 707. Such processing may be on decision operations evaluating the synthesized pixels (not shown) or based on predetermined modes selections or the like.

As discussed, process 700 may provide for converting video frames to fields and on a block basis performing motion estimation between the line-blocks of fields that are available. The computed motion vectors may then be appropriately scaled and used to obtain line-blocks to fill in lines each missing field that needs to be recreated for combining with each existing fields to create each deinterlaced frame. The lines filled by block motion compensated interpolation may then be the starting basis for further enhancement in order to generate final missing lines to create a deinterlaced field that may then be combined with available field to create each deinterlaced frame; a sequence of such frames results in final deinterlaced video. In an example motion compensated deinterlacer, the enhancement process may consist of median interpolation to reduce motion artifacts a process that reduces block appearance that can result on edges from motion compensation process. The median interpolator on a pixel-pixel basis may take the median value of the pixels in line immediately above, the pixel from line immediately below, and current pixel from the synthesized motion compensated interpolated field. Such median filtering process may introduce some artifacts such that the next step may involve filtering the motion compensated pixels with spatial interpolation generated by following edges (edge directed interpolation) and using it to modify pixels of motion compensated synthesized lines, resulting in the final interpolated field that forms each deinterlaced frame.

As discussed, in some examples the interlaced format in North America has a frame rate of 29.97 (e.g., a field rate of 59.94 fields per second) and the frame rate for content captured from film is 23.976 (e.g., (24/1001)×1000), for the purpose of discussion herein including the following discussion, a frame rate of interlaced video is assumed to be 30 frames per second (e.g., 60 fields per second) and a frame rate of film is assumed to be 24 frames per second.

For example, some video content may originate in interlaced format at 30 frames per second (60 fields per second) while other video content may originate in progressive format at 24 frames per second, 30 frames per second, or 60 frames per second, digital content distributors may use a unified format for distribution of digital content.

Figure 8:
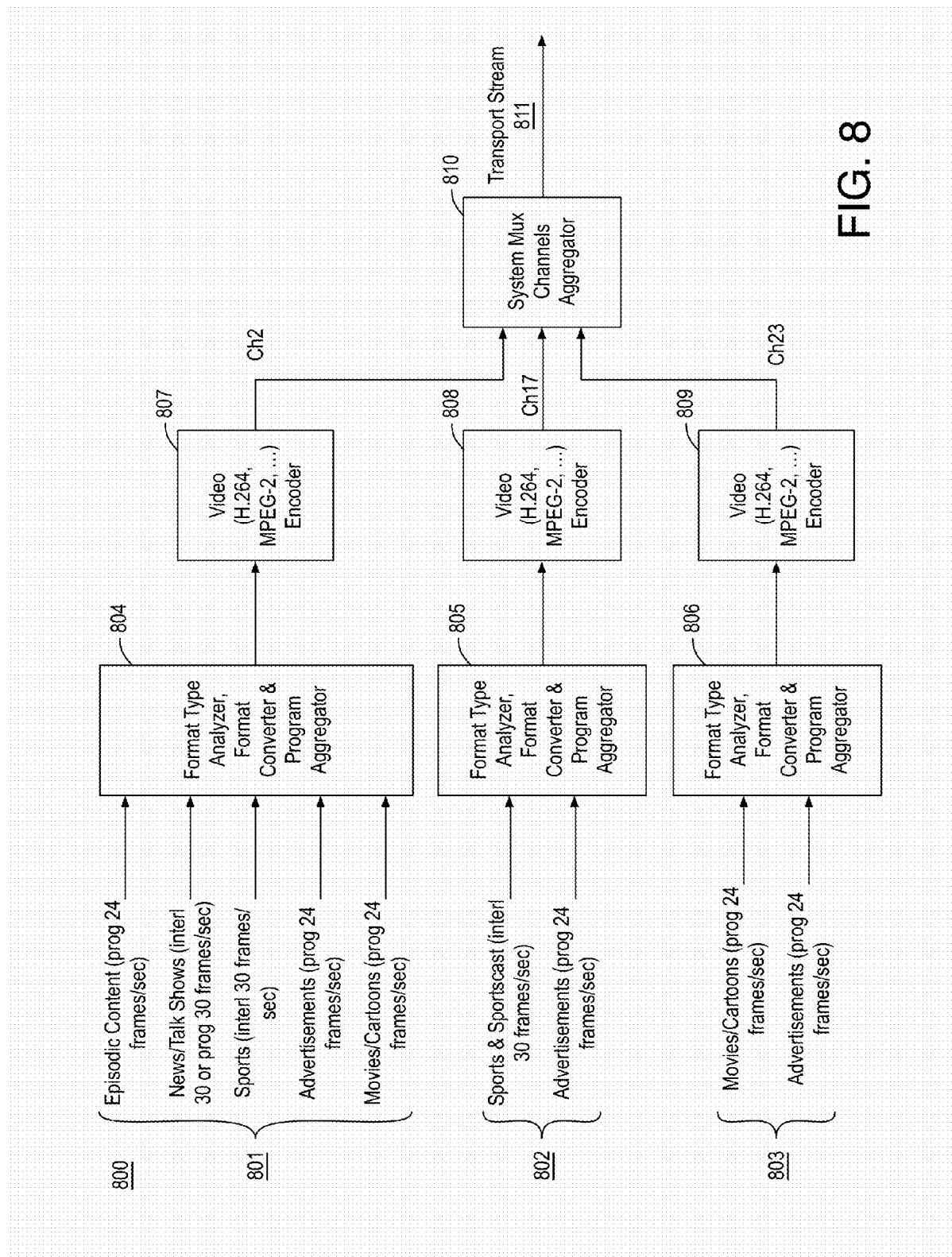
FIG. 8 is a diagram illustrating an example video program aggregation system.

FIG. 8 is a diagram illustrating an example video program aggregation system 800, arranged in accordance with at least some implementations of the present disclosure. As shown in FIG. 8, system 800 may include a format type analyzer, format converter and program aggregator 804, a format type analyzer, format converter and program aggregator 805, a format type analyzer, format converter and program aggregator 806, a video encoder 807, a video encoder 808, a video encoder 809, and a system mux channels aggregator 810.

For example, format type analyzer, format converter and program aggregator 804 may include video content 801 and format type analyzer, format converter and program aggregator 804 may analyze formats, convert formats, and aggregate video content 801. Video encoder 807 may then encode the aggregated video content (e.g., via a codec such as H.264, MPEG-2, or the like) to generate encoded aggregated video content. Similarly, format type analyzer, format converter and program aggregator 805 may include video content 802 and format type analyzer, format converter and program aggregator 805 may analyze formats, convert formats, and aggregate video content 802. Video encoder 808 may then encode the aggregated video content (e.g., via a codec such as H.264, MPEG-2, or the like) to generate encoded aggregated video content. Furthermore, format type analyzer, format converter and program aggregator 806 may include video content 803 and format type analyzer, format converter and program aggregator 806 may analyze formats, convert formats, and aggregate video content 803. Video encoder 809 may then encode the aggregated video content (e.g., via a codec such as H.264, MPEG-2, or the like) to generate encoded aggregated video content.

As shown, video content 801, 802, 803 may each be associated with a channel such as TV channel or content channel such as channels 2, 17, and 23, respectively, in the illustrated example. Also as shown, the encoded video content may be multiplexed and/or aggregated via system mux channels aggregator 810 to generate transport stream 811. In the illustrated example, transport stream 811 includes video content 801, 802, 803 for channels 2, 17, 13. However, transport stream 811 may include video content for any number of channels and/or programs.

In some examples, each broadcast TV channel (e.g., channels 2, 17, 13 of video content 801, 802, 803, respectively) may be packaged as a single stream including programs one-after-the-other, to be broadcast. For example, some of the programs such as TV network news on the same broadcast channel may originate in interlaced format (e.g., 1080i HD), some movies may originate as 24 frames per second (e.g., telecined to 60 fields per second at 1080i HD), some commercials may originate at 24 frame per second (e.g., telecined to 60 fields per second at 1080i HD), some episodic content (e.g., sitcoms or the like) may originate at 24 frames per second (e.g., telecined to 1080i) or 30 frames per second (e.g., directly 1080p HD), and high action sports such as car racing or downhill skiing may originate at 60 frames per second (e.g., 720p HD). In some examples, a common distribution format (e.g., for transport stream 811) for HD uses 1080 lines interlaced at 30 frames per second (e.g., 60 fields per second) format after encoding 1080 lines interlaced signals directly (e.g., if the video content originated as interlaced video) or after encoding 30 frames per second (e.g., 60 fields per second) interlaced format after conversion of 24 frames per second format (e.g., if the content originated as progressive film content at 24 frames per second0.

For example, FIG. 8 illustrates a broadcast channel Ch2 video stream as composed of video content 801 including a sequence of shows including episodic content (e.g., at progressive 24 frames per second), news/talk shows (e.g., at interlaced 30 frames per second or progressive 30 frames per second), sports (e.g., at interlaced 30 frames per second), advertisements (e.g., at progressive 24 frames per second), and movies/cartoons (e.g., at progressive 24 frames per second). Similarly, FIG. 8 illustrates other broadcast or cable channels such as, for example, specialized channel Ch 17 carrying sports (e.g., at interlaced 30 frames per second), sportscast (e.g., at interlaced 30 frames per second), and advertisement (e.g., at progressive 24 frames per second) and specialized cable channel Ch 23 carrying movies/cartoons (e.g., at progressive 24 frames per second), and advertisements (e.g., at progressive 24 frames per second).

In such examples, rather than distribute content in a lossless form that would require very high bitrate, content may be distributed after having undergone lossy compression (e.g., slightly lossy compression) using the MPEG-2, the H.264 standard, or the like (e.g., as implemented via video encoders 807, 808, 809. For example, the compression bitrates for MEPG-2 or H.264 compression may be fairly high, in the range of 60 to 300 Mbits per second (for HD) to ensure that content quality is high (e.g., near lossless), if not completely lossless. Each channel's raw video stream thus undergoes light compression resulting in a compressed stream. Furthermore, for each channel, in addition to video, there may be one or more audio streams carrying the associated sound information (e.g., in stereo or higher formats), and system 800 may provide associated audio encoding, which is not shown for clarity of presentation.

As shown, several such compressed streams (e.g. broadcast or cable channels Ch2, Ch7 and Ch23, or the like) may be bundled/multiplexed by a channel aggregator (e.g., system mux channels aggregator 810) into a transport stream (e.g., transport stream 811) such as an MPEG-2 transport stream. In some examples, several such transport streams collectively may represent all video streams (e.g., TV channels) available in a geographic region.

Figure 9:
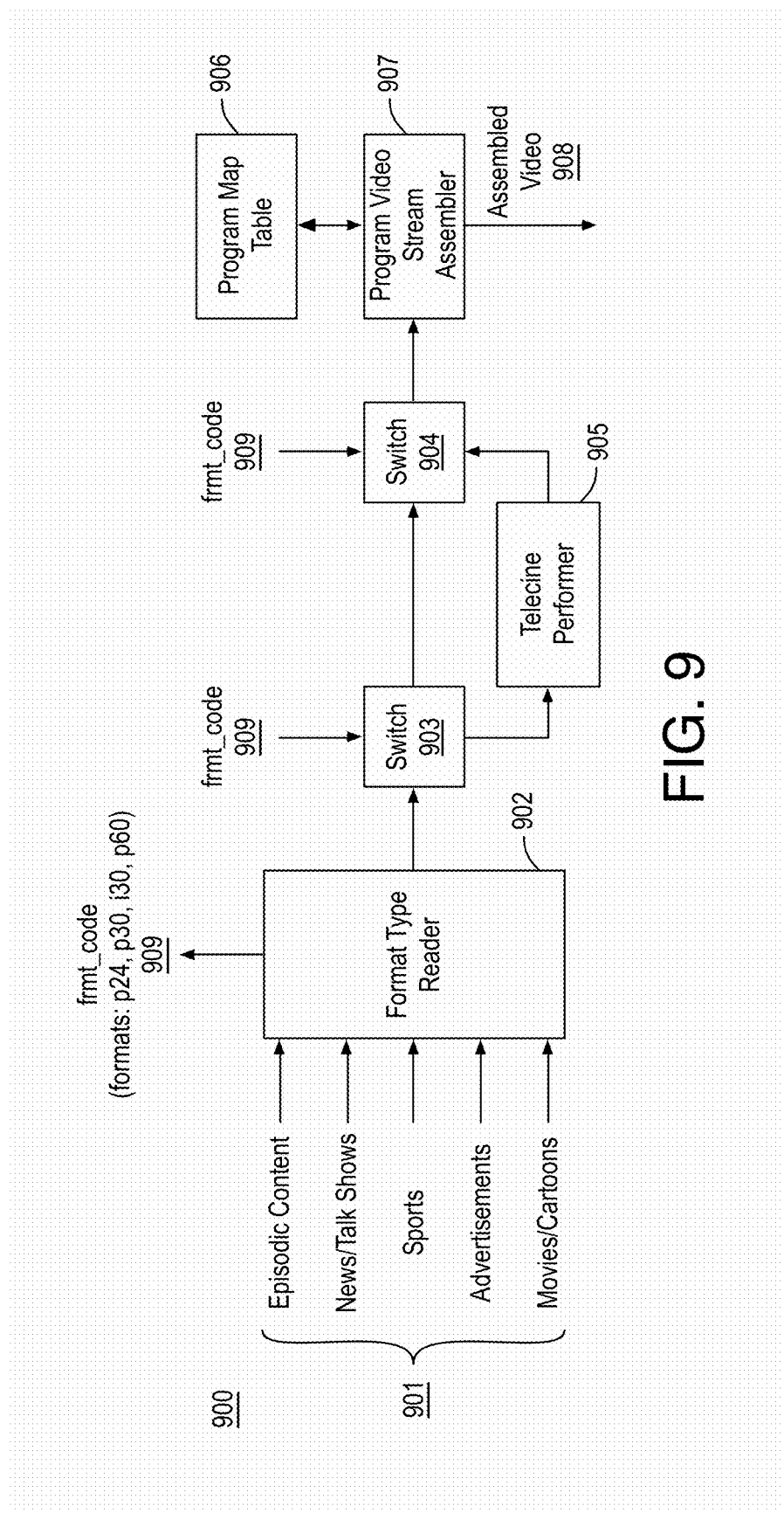
FIG. 9 is a diagram illustrating an example video program aggregation system.

FIG. 9 is a diagram illustrating an example video program aggregation system 900, arranged in accordance with at least some implementations of the present disclosure. As shown in FIG. 9, system 900 may include a format type reader 902, switches 903, 904, a telecine performer 905, a program video stream assembler 907, and a program map table 906. For example, format type reader 902 may receive video content 901, which may include a variety of content and associated formats. Format type reader 902 may analyze video content 901 or portions thereof to determine a format code (frmt_code) 909, which may, for example, include one of progressive 24 frames per second (p24), progressive 30 frames per second (p30), interlaced 30 frames per second (p30), progressive 60 frames per second (p60), or the like.

As shown, format code 909 may be provided to switches 903, 904, which may operate to provide a path for video content 901 or portions thereof. For example, if format code 909 indicates a portion of video content 901 originated from an interlaced camera (e.g., the format is true interlaced), switches 903, 904 may bypass telecine performer 905 and provide the video content portion to program video stream assembler 907. In other examples, if format code 909 indicates video content 901 or a portion thereof originated as progressive 24 frames per second video, switches 803, 904 may operated to provide the video content to telecine performer 905. Telecine performer 905 may provide a telecine operation to the progressive 24 frames per second video to generate 30 frames per second (e.g., 60 fields per second) telecined video. Such telecined video may be considered fake interlaced or pseudo-interlaced as discussed herein since telecined video has the structure of interlaced video but some fields are repeated, swapped, and/or synthesized as discussed herein. The telecine pattern may include 3:2 pull down, 2:3: 3:2 pull down, blended, or any other telecine pattern. For example, more than 50 telecine patterns may be used by various content providers or aggregators.

As shown, interlaced video, telecined video, or progressive video of a higher frame rate may be provided to program video stream assembler 907, which may assemble the video to generate assembled video 908. Such assembled video may be provided to a video encoder (e.g., video encoders 807, 808, 809) for encoding (e.g., light encoding) and such encoded video may be multiplexed with other channels to generate a transport stream as discussed with respect to system 800. Furthermore, each portion or program of video content 901 (e.g., episodic content, news/talk shows, sports, movies/cartoons, etc.) may be mapped to provide a program map table 906. For example, program map table 906 may identify each program of video content 901 and the order of each program.

As shown, FIG. 9 illustrates the conversion and program aggregation process discussed in FIG. 8. For example, different sources of video each corresponding to a program (e.g., episodic content, news/talk shows, sports, advertisements, movies/cartoons, etc.) may, depending on the type of program, be progressive (e.g., 24, 30 or 60 frames per second) or interlaced (30 frames per second) formats of typically in Standard definition (e.g., 480p) resolution or High definition (e.g., 720p or 1080p) resolution. For example, such video formats may correspond to video formats in North America. For example, episodic content may be progressive 24 frames per second video, news/talk shows may be progressive 30 frames per second video or interlaced 30 frames per second video, sports content may be interlaced 30 frames per second video, advertisements may be progressive 24 frames per second video, and movies/cartoons may be progressive 24 frames per second video.

As discussed, if the content originated from an interlaced camera it may be kept as is. Furthermore, any episodic content, movie/cartoon content, or commercials (e.g., advertisements) that originates from a 24 frames per second film source may be telecine converted to 60 fields per second. Also, as shown, the program assembler (e.g., program video stream assembler 907) may lay out a stream of programs such as, for example, first a talk show (e.g., with or without commercials intermingled), followed by several other talk shows (e.g., with or without intermingled commercials), followed by several sitcoms and episodic content (e.g., with intermingled commercials), followed by a movie (e.g., with or without intermingled commercials), followed by other episodic content, and so on, with each program identified by program map table 906. The assembled raw video program (e.g., assembled video 908) may be in a common format, such as 30 frames per second and such assembled raw video program content may then undergo light encoding as discussed with respect to system 800 of FIG. 8. An alternative to the discussed processing may include first encoding (e.g., via MPEG-2 or H.264) each video program separately and assembling the compressed streams of different format types and/or frame rates into a channel. Such techniques may not include the benefit of a unified format/frame rate for the entire stream.

In such examples, a service provider (e.g., an internet service provider providing video content over the internet or other network) does not have much control over the content aggregation process. For example, the service provider may be delivered the high quality/high bitrate content. The service provider may choose to process such content such as by providing higher compression (via, for example, H.264 or HEVC). Such a process would first require decoding the received high bitrate encoded content. The decoded content may then be encoded using a higher efficiency encoding process and deliver the content as, for example, a consumer digital video service.

Figure 10:
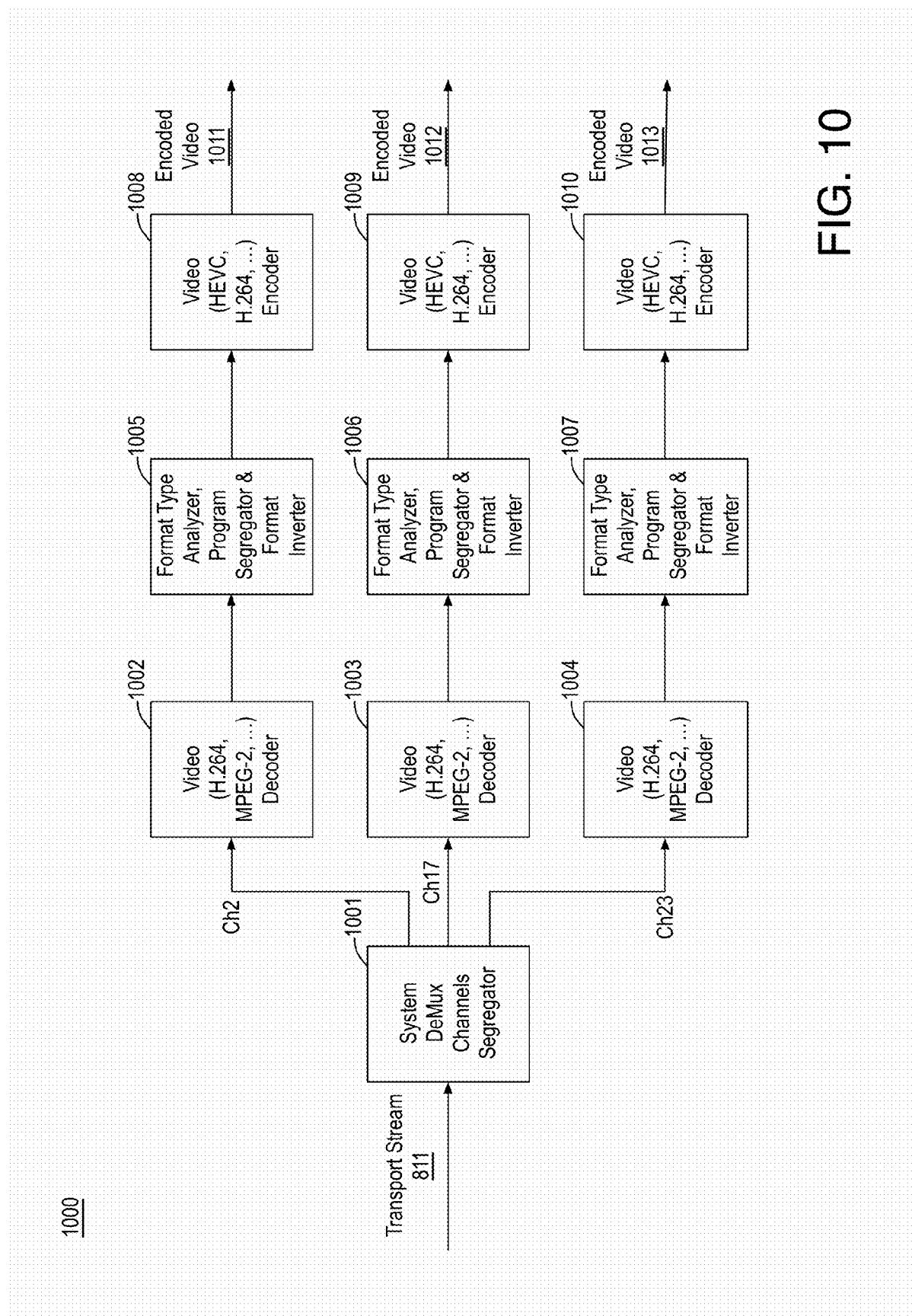
FIG. 10 is a diagram illustrating an example video program repackaging system.

FIG. 10 is a diagram illustrating an example video program repackaging system 1000, arranged in accordance with at least some implementations of the present disclosure. As shown in FIG. 10, system 1000 may include a system demux channels segregator 1001, a video decoder 1002, a video decoder 1003, a video decoder 1004, a format type analyzer, program segregator and format inverter 1005, a format type analyzer, program segregator and format inverter 1006, a format type analyzer, program segregator and format inverter 1007, a video encoder 1008, video encoder 1009, and a video encoder 1010.

For example, system demux channels segregator 1001 may receive transport stream 811 (or similar transport stream). System demux channels segregator 1001 may segregate transport stream 811 into channels (e.g., ch2, ch17, ch23, or the like) or separate video streams and provide such channels or video streams to video decoders 1002, 1003, 1004. Video decoders 1002, 1003, 1004 may decode the channels or video streams to generate decoded channels or video streams. For example, video decoders 1002, 1003, 1004 may implement the suitable codec (e.g., H.264, MPEG-2, or the like) associated with the channels or video streams to decode the encoded channels or video streams.

The decoded channels or video streams may be provided to format type analyzer, program segregator and format inverters 1005, 1006, 1007, which may receive the decoded channels or video streams, determine the format type(s) of the received channels or video streams or portions thereof, segregate programs within the received channels or video streams and invert the format of the channels or video streams. For example, the format(s) may be inverted to a format suitable for encoding via state-of-the art video encoders such as a progressive video format. For example, format type analyzer, program segregator and format inverters 1005, 1006, 1007 may invert interlaced formats and/or telecined formats to progressive formats for encoding.

As shown, the inverted channels or video streams may be provided to video encoders 1008, 1009, 1010, which may encode the inverted channels or video streams to generate encoded video 1011, 1012, 1013. For example, encoded video 1011, 1012, 1013 may be compressed such that a service provider may provide such encoded video 1011, 1012, 1013 to users. In some examples, encoded video 1011, 1012, 1013 may be highly compressed and of suitable quality for distribution over the internet or other network and for viewing over displays designed for progressive video such as monitors, displays of handheld devices, displays of laptops, and modern HDTV displays, or the like.

For example, FIG. 10 may illustrate a process of demultiplexing and decoding aggregated content and re-encoding of the content at a higher compression factors for delivery of a video service by a service provider. The re-encoded content may again be multiplexed (not shown) into for example, an MPEG-2 transport or another format such as MP4 file format or the like for delivery of the service. For example, the components of FIG. 10 10 may provide a mechanism for demultiplexing video channels (and associated audio streams processing including decoding and re-encoding, although for the sake of clarity of presentation such of audio streams processing is not shown). For example, as shown, each demultiplexed video stream representing a video channel may be provided from systems demux channels segregator 1001 to a corresponding video decoder (e.g., an MPEG-2, H.264, or the like decoder such as one of video decoders 1002-1004), and optional format conversions (e.g., via format type analyzer, program segregator and format inverters 1005-1007) prior to re-encoding at higher compression for example via an HEVC encoder (or other encoder such as MPEG-2, H.264, VP9, or the like) such as one of video encoders 1008-1010. For example, decoding of the compressed aggregated content results in decoded YUV frames (typically in 8-bit YUV 4:2:0 format although the process may also be applied to higher chroma such as 4:2:2 and 4:4:4 as well as higher bit depths).

Unlike the entire process at the content aggregation side (as discussed with respect to FIGS. 8 and 9), the process illustrated in FIG. 10 may be performed by a service provider and may therefore be controlled by the service provider. Such control over processing may include, for example, the processing/conversion of video formats, details of video encoding (e.g., the codec, encoder complexity, implantation in hardware or software, resolution, compression bitrates, stream switching delay, encoding parameters, rate control, etc.), and/or details of audio encoding, which are not shown for the sake of clarity of presentation. The overall processing (including format conversion) performed by the service provider may have a significant impact on final video quality particularly when the lightly encoded content delivered to the service provider is of high quality. For example, service providers may thereby differentiate themselves in terms of the quality of video service they deliver to users.

As discussed, a system for decoding and re-encoding video such as system 1000 may include one or more format type analyzer, program segregator and format inverters 1005, 1006, 1007. Such format type analyzer, program segregator and format inverters 1005, 1006, 1007 may be implemented via a variety of techniques.

Figure 11A:
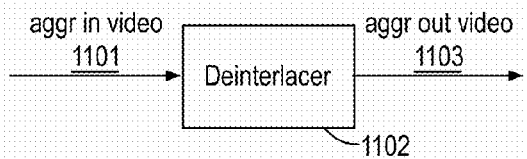
FIG. 11A illustrates an example format type analyzer, program segregator and format inverter system.

FIG. 11A illustrates an example format type analyzer, program segregator and format inverter system 1100, arranged in accordance with at least some implementations of the present disclosure. As shown in FIG. 11A, the format type analyzer, program segregator and format inverter may include a deinterlacer 1102. For example, deinterlacer 1102 may receive aggregated input video (aggr in video) 1101, which may correspond to one of the decoded channels or video streams discussed with respect to system 1000 (e.g., decoded channels or video streams provided to format type analyzer, program segregator and format inverters 1005, 1006, 1007, please refer to FIG. 10). As shown, deinterlacer 1102 may deinterlace aggregated input video 1101 to generate aggregated output video (aggr out video) 1103. For example, aggregated output video 1103 may include progressive video and aggregated output video 1103 may be provided to a video encoder (e.g., one of video encoders 1008, 1009, 1010) for encoding, and such encoded video may be optionally multiplexed and subsequently distributed via a service provider or the like. Deinterlacer 1102 may deinterlace aggregated input video 1101 using any deinterlacing technique such as those discussed herein.

For example, system 1100 of FIG. 11A may provide a basic format type analyzer, program segregator and format inverter. As discussed, system 1100 may only include a deinterlacer such as deinterlacer 1102. For example, the input aggregated video (e.g., aggregated input video 1101) may always assumed to be of interlaced format and such input aggregated video may be converted by the deinterlacer to progressive format for further processing/encoding as discussed herein.

Figure 11B:
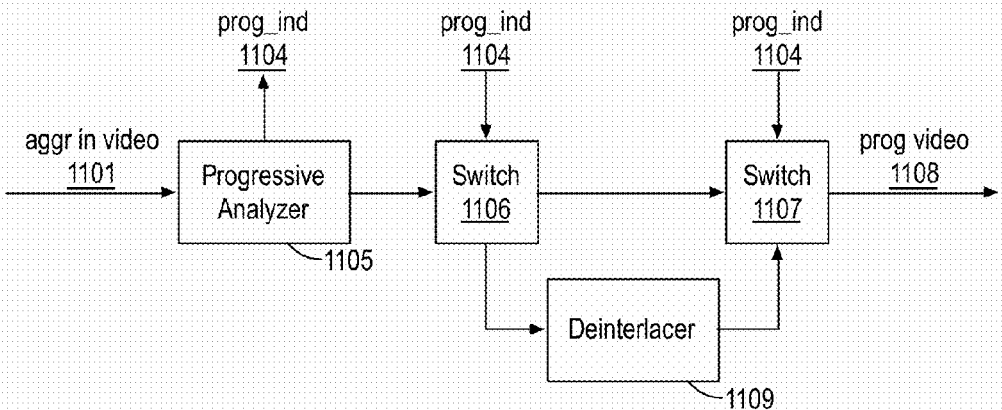
FIG. 11B illustrates an example format type analyzer, program segregator and format inverter system.

FIG. 11B illustrates an example format type analyzer, program segregator and format inverter system 1110, arranged in accordance with at least some implementations of the present disclosure. As shown in FIG. 11B, the format type analyzer, program segregator and format inverter may include a progressive analyzer 1105, switches 1106, 1107, and a deinterlacer 1109. For example, progressive analyzer 1105 may receive aggregated input video 1101, which, as discussed, may correspond to one of the decoded channels or video streams discussed with respect to system 1000 (e.g., decoded channels or video streams provided to format type analyzer, program segregator and format inverters 1005, 1006, 1007, please refer to FIG. 10). As shown, progressive analyzer 1105 may determine, based on aggregated input video 1101, progressive indicator (prog_ind) 1104, which may include a binary value or flag indicating whether aggregated input video 1101 (or a portion thereof) is progressive or interlaced.

As shown, progressive indicator 1104 may be provided to switches 1106, 1107. For example, switches 1106, 1107 may operate under the control of progressive indicator 1104 such that if a portion of aggregated input video 1101 is determined to be progressive, switches 1106, 1107 may bypass deinterlacer 1109 and provide the portion of video directly as progressive video (prog video) 1108 (e.g., without further processing). Furthermore, switches 1106, 1107, when the portion of aggregated input video 1101 is determined to be interlaced, provide the portion of video to deinterlacer 1109. Deinterlacer 1109 may deinterlace the portion of video to generate progressive video, which may be provided as progressive video 1108. For example, system 1110 may provided detected progressive portions of aggregated input video 1101 without further processing and system 1110 may deinterlace detected interlaced portions of aggregated input video 1101 to generate progressive video 1108. For example, progressive video 1108 may be provided to a video encoder (e.g., one of video encoders 1008, 1009, 1010) for encoding, and such encoded video may be optionally multiplexed and subsequently distributed via a service provider or the like. Deinterlacer 1109 may deinterlace aggregated input video 1101 using any deinterlacing technique such as those discussed herein.

For example, the format type analyzer, program segregator and format inverter system of FIG. 11B may provide improved performance over example format type analyzer, program segregator and format inverter system of FIG. 11. The format type analyzer, program segregator and format inverter system of FIG. 11B may include a progressive analyzer (e.g., progressive analyzer 1105) that may analyze if input video is progressive or interlaced and indicate the result as binary value of prog_ind flag (e.g., prog_ind 1104). The prog_ind flag may control operation of two switches (e.g., switches 1106, 1107) such that either the input video is sent to a deinterlacer (e.g., deinterlacer 1109) or it bypasses the deinterlacer. The output of the second switch (e.g., switch 1107) is the final output video in progressive format.

Some content aggregation processes discussed herein may introduce artifacts, which, if not corrected by a service provider, may have a significant impact on the final video quality. For example, some processes may convert 24 frames per second film, commercial and episodic content to 30 frames per second (e.g., 60 fields per second) interlaced content, a format that may not be efficiently compressible by a higher compression state of the art standard (e.g., HEVC or the like) or such processes may show visible artifacts after compression is used by the service provider. Also, if the content originated lightly compressed as interlaced content and after decoding it results in this format, the encoding needed next with a newer higher compression state of the art codec (e.g., HEVC) may not support or provide efficient coding for the format. Therefore, before further compression for service delivery, video format preprocessing may be performed for the conversion of content, after decoding the aggregated content, to convert it into a suitable format for further processing. Furthermore, as discussed, portions of content in a single stream (e.g., a broadcast stream) may include different formats. In some examples, information about boundaries between such substreams may not be available at all or, if it is available, it may not be accurate.

Current approaches may follow a simplistic path and may not adapt well to content aggregation. For example, current approaches may be designed to handle conversions when the type of video format used by a program is known such as if video source is an interlaced camera or DVD or Blu-Ray (BD) disk. However, current approaches may not be adaptive enough to handle, with good quality, conversions needed by aggregated content such as content formed by the concatenation of different content types (e.g., movies, sports, news programs, episodic shows, talk shows, etc.), different content formats and/or frame rates (e.g., interlaced, progressive, 24, 30, and 60 frames per second, film scanned, camera generated, animation, etc.), or edited content (e.g., time scaled, such as expanded or contracted, frames removed, etc.). Such differences in the video may make content format conversions such as interlace reversal (e.g., deinterlacing) or telecine reversal difficult. For example, in a complex video stream containing many types of content, formats, and editing, before applying any format inversions, it first may be necessary to automatically determine the input format of the source video. Such format determinations may also be difficult to perform accurately, making it difficult to determine what inversions to apply.

Furthermore, the process of encoding of raw content, even at high bitrates tends to reduce frame-frame or field-field correlation, which may be critical to making decisions about format of the content. Current approaches may use relatively simple detection measures which may lead to inaccurate detection which may, in turn, cause unwanted artifacts and/or higher bitrates.

The embodiments discussed herein may improve video processing of aggregated content to correctly reverse the format conversion preprocessing (which may introduce artifacts) applied during the aggregation process to generate a single progressive video stream of programs. The embodiments may adaptively determine if the content is progressive or interlaced and/or whether the content is true interlaced (e.g., generated by an interlaced camera) or pseudo/fake interlaced (e.g., having interlacing generated by a telecine process). For example, if the content is determined to be progressive, it may be output as such, bypassing any other processing. Furthermore, if the content is deemed to be interlaced, a further determination may be performed as to whether the interlaced content is true interlaced or fake interlaced. If the content is deemed to be true interlace, it may be provided to an interlace reverser/deinterlacer. For example, the interlace reverser/deinterlacer may be a content adaptive deinterlacer as is discussed further herein. If the content is determined to be fake interlaced it is determined to have undergone telecine conversion. In such examples, an adaptive and efficient telecine converter may adaptively determine which of the several patterns were used for telecine conversion and undo the telecine process, resulting in progressive video such as 24 frames per second progressive video or the like. In some examples, for some video programs, the format of video may be known (e.g., from encoded parameters in MPEG-2 bitstream or the like). However, in other examples, such information is not known. By evaluating such information and implementing the techniques discussed herein various embodiments may provide a fully automatic method for determining the format and the conversions necessary to produce high quality progressive format video for encoding (e.g. at higher compression factors/lower bitrate) by a service provider. As a result, embodiments discussed herein may offers benefits such as reduction of visual artifacts in a resulting video signal when displayed on progressive display and more efficient compression of video frame substreams with fewer artifacts with state of the art video encoders.

Figure 12:
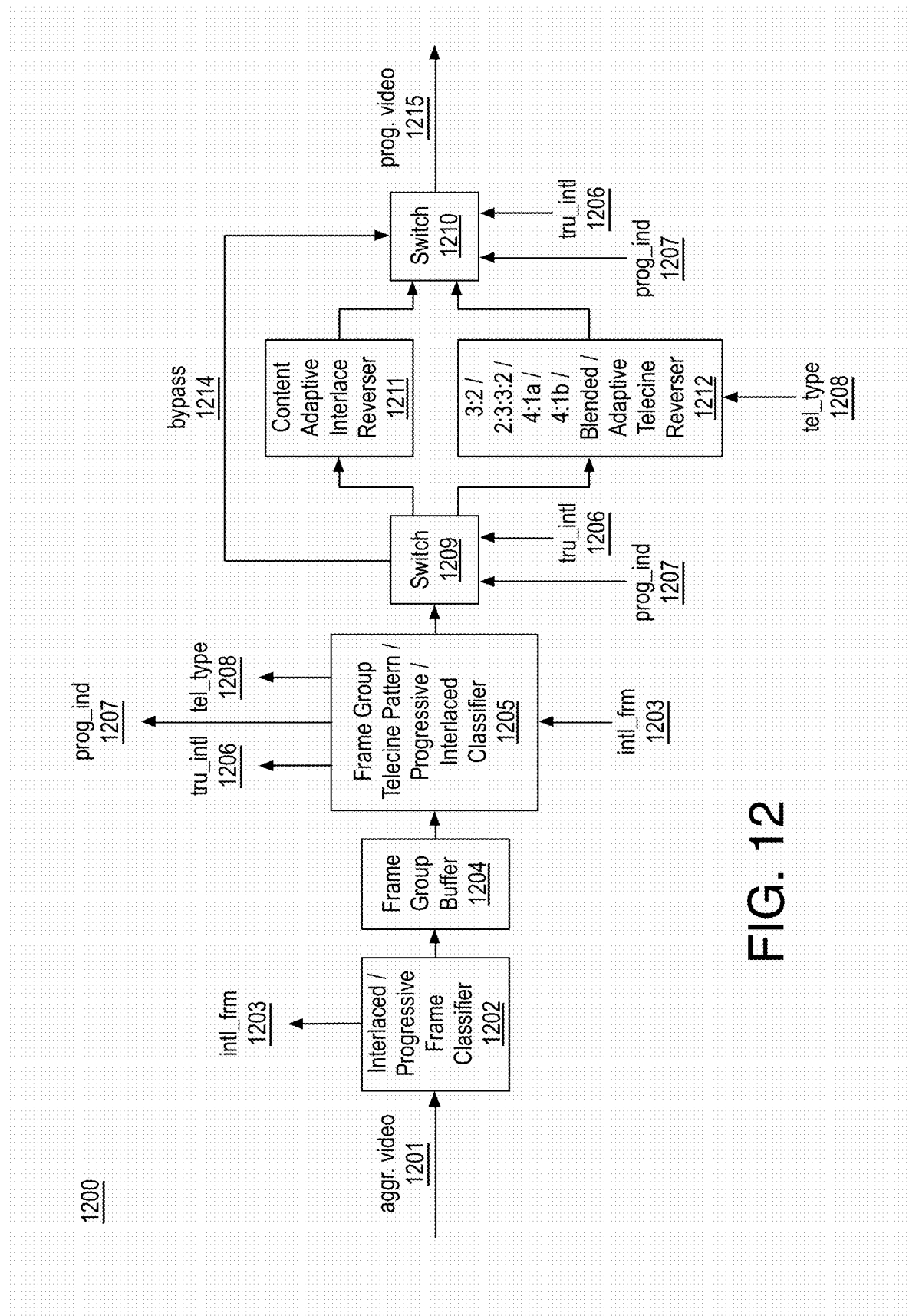
FIG. 12 illustrates an example format type analyzer, program segregator and format inverter system.

FIG. 12 illustrates an example format type analyzer, program segregator and format inverter system 1200, arranged in accordance with at least some implementations of the present disclosure. As shown in FIG. 12, the format type analyzer, program segregator and format inverter (e.g., system 1200) may include an interlaced/progressive frame classifier 1202, a frame group buffer 1204, a frame group telecine pattern/progressive/interlaced classifier 1205, switches 1209, 1210, a content adaptive interlace reverser 1211, and a telecine reverser (3:2/2:3:3:2/4:1a/4:1b/blended/adaptive telecine reverser) 1212. For example, interlaced/progressive frame classifier 1202 may receive aggregated input video (aggr. video) 1201, which may correspond to one of the decoded channels or video streams discussed with respect to system 1000 (e.g., decoded channels or video streams provided to format type analyzer, program segregator and format inverters 1005, 1006, 1007, please refer to FIG. 10).

As shown, interlaced/progressive frame classifier 1202 may determine a frame pattern for frames of aggregated input video 1201 such as whether the frames are interlaced or progressive. In this context the term interlaced includes both true interlaced (e.g., from an interlaced camera or the like) or fake/pseudo interlaced (e.g., interlaced based on telecine process). Also as shown, interlaced/progressive frame classifier 1202 may provide an interlaced frame indicator (intl_frm) 1203 for frames of aggregated input video 1201 corresponding to whether each frame is determined to be interlaced or progressive. Interlaced/progressive frame classifier 1202 may determine whether a frame is interlaced or progressive using any suitable technique or techniques such as those discussed with respect to FIGS. 13-16, 25, 17, 26, and 18 or elsewhere herein.

As shown, aggregated input video 1201 may be stored in frame group buffer 1204. For example, 15 or 16 frames may be stored in frame group buffer including 5 frames of a current frame group, 5 frames of a previous frame group, 5 frames of a subsequent frame group, and 1 optional control frame. Furthermore the stored frames (e.g., the frame groups and optional control frame) may be provided to frame group telecine pattern/progressive/interlaced classifier 1205. Also, interlaced frame indicators 1203 for the frame group may be provided to frame group telecine pattern/progressive/interlaced classifier 1205. Frame group telecine pattern/progressive/interlaced classifier 1205 may determine, for the current frame group, a frame group format or pattern such as whether the frame group is progressive, interlaced, or telecined. Further, if the frame group is telecined, frame group telecine pattern/progressive/interlaced classifier 1205 may determine a telecine pattern for the frame group. For example, the telecine pattern may be one of 3:2 pull down, 2:3:3:2 pull down, blended, or others. Furthermore, the telecine pattern may be determined to be unknown via frame group telecine pattern/progressive/interlaced classifier 1205.

Also as shown, frame group telecine pattern/progressive/interlaced classifier 1205 may provide one or more of a true interlaced indicator (tru_intl) 1206, a progressive indicator (prog_ind) 1207, and a telecine type indicator (tel_type) 1208 for frame groups of aggregated input video 1201. For example, true interlaced indicator 1206 may indicate a frame group is a true interlaced frame group having an all interlaced frame group format, progressive indicator 1207 may indicate a frame group is a progressive frame group having an all progressive frame group format, and telecine type indicator 1208 may indicate a frame group is a telecined frame group and which telecine pattern (e.g., 3:2 pull down, 2:3:3:2 pull down, blended, or unknown) the frame group has. Frame group telecine pattern/progressive/interlaced classifier 1205 may determine the frame group format or pattern using any suitable technique or techniques such as those discussed with respect to FIG. 19 or elsewhere herein.

As shown, progressive indicator 1207 and true interlaced indicator 1206 may be provided to switches 1209, 1210. Switches 1209, 1210 may operate under the control of progressive indicator 1207 and true interlaced indicator 1206 to provide portions or segments of aggregated input video 1201 to one of bypass 1214, content adaptive interlace reverser 1211, or telecine reverser 1212. For example, if progressive indicator 1207 is true, the associated portions or segments of aggregated input video 1201 may be provided to bypass 1214 such that those portions or segments of aggregated input video 1201 are provided without further processing as progressive video (prog. video) 1215. Furthermore, if true interlaced indicator 1206 is true, the associated portions or segments of aggregated input video 1201 may be provided to content adaptive interlace reverser 1211 such that those portions or segments of aggregated input video 1201 may be deinterlaced and provided as progressive video 1215. If neither progressive indicator 1207 nor true interlaced indicator 1206 are true (e.g., the video portion is telecined), the associated portions or segments of aggregated input video 1201 may be provided to telecine reverser 1212 such that those portions or segments of aggregated input video 1201 may be telecine reversed and provided as progressive video 1215.

As discussed, content adaptive interlace reverser 1211 may receive portions or segments of aggregated input video 1201, deinterlace the portions or segments, and provide the resultant progressive video as progressive video 1215. Content adaptive interlace reverser 1211 may deinterlace the portions or segments of aggregated input video 1201 using any suitable technique or techniques such at those discussed with respect to FIGS. 5A, 5B, 6, 7, and 24 or elsewhere herein.

Figure 23:
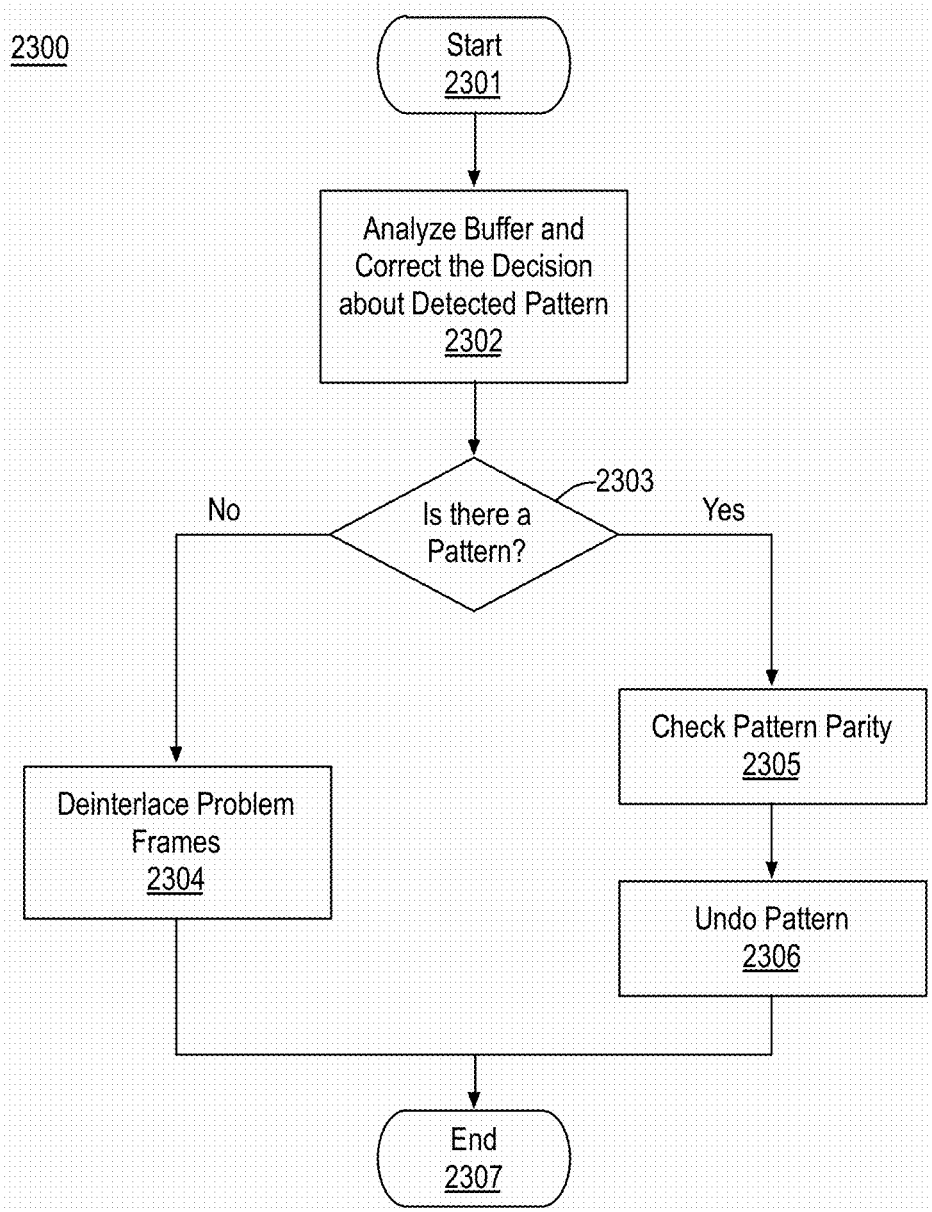
FIG. 23 is a flow diagram illustrating an example process 2300 for telecine reversal.

Furthermore, as discussed, telecine reverser 1212 may receive portions or segments of aggregated input video 1201, telecine reverse the portions or segments, and provide the resultant progressive video as progressive video 1215. telecine reverser 1212 may telecine reverse the portions or segments of aggregated input video 1201 using any suitable technique or techniques such at those discussed with respect to FIGS. 3B, 4B, and 23 or elsewhere herein. In some examples, if no telecine pattern is found (e.g., the pattern is determined to be unknown), the delecine process may include deinterlacing techniques as discussed herein.

As discussed, FIG. 12 illustrates a format type analyzer, program segregator and format inverter. The format type analyzer, program segregator and format inverter may be more complicated than those discussed with respect to FIGS. 11A and 11B. For example, the format type analyzer, program segregator and format inverter of FIG. 11 may provide greater accuracy. As discussed, the format type analyzer, program segregator and format inverter of FIG. 11 may include an interlaced/progressive frame classifier (e.g., interlaced/progressive frame classifier 1202) that may classify each frame into either interlaced or progressive (e.g., it may output a binary signal intl_frm), followed by a frame group buffer (e.g., frame group buffer 1204) that may buffer a group of 15 frames (e.g., to keep a group of 5 past frames, a group of 5 current frames, and a group of 5 future frames) for analysis by a frame group telecine pattern type/progressive/interlaced classifier (e.g., frame group telecine pattern/progressive/interlaced classifier 1205) that may output several signals that may characterize the behavior of the group of frames under consideration such as if the group of frames is true interlaced or not (e.g., via tru_intl), progressive or not (e.g., via prog_ind), and, if present, the type of telecine pattern (e.g., via tel_type) it uses.

These signals may control operation of a pair of switches (e.g., switches 1209, 1210) that may operate in one of the three modes. The first mode may allow bypassing (e.g., via bypass 1214) of any processing and may let the progressive 30 or 60 frames per second video signal pass as is without any processing. The second mode may allow for performing 3:2, or 2:3:3:2, or blended or adaptive telecine pattern reversal (e.g., via telecine reverser 1212) depending on the original telecine pattern used by the content aggregator (e.g., and detected via frame group telecine pattern/progressive/interlaced classifier 1205). The resulting output after telecine reversal may be a 24 frames per second inverse telecined video signal for example. The third mode may allow for performing interlace reversal by using content adaptive deinterlacing (e.g., via content adaptive interlace reverser 1211) to produce a high quality deinterlaced signal. This adaptive deinterlacer may provide output of progressive 30 frames per second or 60 frames per second video given 60 fields per second (e.g., 30 frames per second) interlaced video for example. The final result of these inversions is an all progressive signal (e.g., progressive video 1215) obtained after undoing the conversions performed by the content aggregator. Such a final result may correspond to a format and frame rate that is suitable for efficient video coding and (progressive) display.

As discussed, interlaced/progressive frame classifier 1202 may classify frames of aggregated video 1201 as interlaced or progressive. Interlaced/progressive frame classifier 1202 may classify frames of aggregated video 1201 using any suitable technique.

Figure 13:
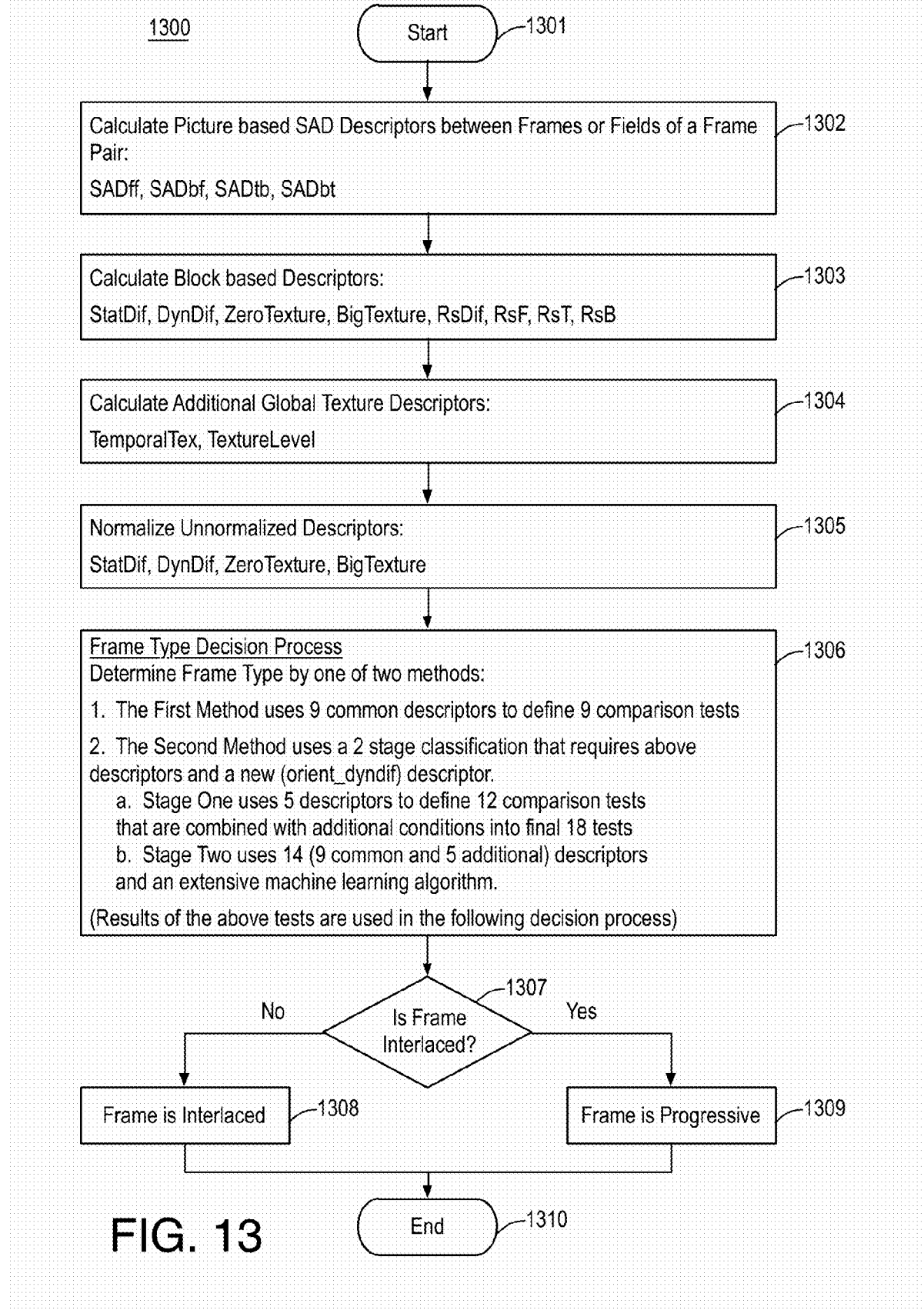
FIG. 13 is a flow diagram illustrating an example process for classifying frames.

FIG. 13 is a flow diagram illustrating an example process 1300 for classifying frames, arranged in accordance with at least some implementations of the present disclosure. As discussed, in some examples, process 1300 or portions thereof may be performed by interlaced/progressive frame classifier 1202 of system 1200 to provide interlaced frame indicator 1203. For example, interlaced/progressive frame classifier 1202 may output intl_frm=1 if a current frame is an interlaced frame and intl_frm=0 otherwise. Process 1300 may include one or more operations 1301-1310 as illustrated in FIG. 13. Process 1300 may form at least part of a video preprocess as discussed herein.

Prior to the discussion of process 1300 with respect to FIG. 13, terminology and descriptors are discussed. For example, a set or group of descriptors (e.g., 10 descriptors with 7 being explicit and 3 being implicit) referred to herein as common descriptors may be defined and generated or determined as follows.

A descriptor SADff (e.g., field pair SAD) may be determined as a sum of absolute difference (SAD) between a pair of fields of a frame, normalized by frame size. A descriptor SADbf may be determined as sum of absolute difference between bottom fields of a pair of frames, normalized by field size. For example, SADbf may be used implicitly in determining DynDif (as is discussed further herein). A descriptor RsF may be determined as a measure of vertical texture in a frame as squares of differences between consecutive rows of pixels of a frame averaged over the number of pixels of the entire frame. A descriptor RsT may be determined as a measure of vertical texture of the top-field of a frame as squares of differences between consecutive rows of pixels of the top-field averaged over the number of pixels of the entire top field. For example, RsT may be used implicitly in determining bTexd (as is discussed further herein). A descriptor RsB: may be determined as a measure of vertical texture of the bottom-field of a frame as squares of differences between consecutive rows of pixels of the bottom-field averaged over the number of pixels of the entire bottom field. For example, RsB may be used implicitly in determining bTexd (as is discussed further herein).

A descriptor DynDif (e.g., dynamic texture) may be determined as a sum of variable thresholded differences between block Rs of a frame (e.g., block based vertical texture, bRsF) as compared to block Rs of top field (e.g., block based vertical texture, bRsT) averaged over the number of pixels of a frame. For example, if, for a block RsF (e.g., block of the frame) determination, the block size is 8×8, then the corresponding block size for block RsT (block of the top field) is 8×4.

As discussed, DynDif may be a sum of variable thresholded differences. The threshold, dyn_thr, may be dynamic and may be based on SADff, and SADbf. For example, dyn_thr may be determined based on the following Pseudo-Code (1):

if (max(SADff, SADbf)<0.45)
   dyn_thr=31
else if (max(SADff, SADbf)<0.5)
   dyn_thr=63
else if (max(SADff, SADbf)<1)
   dyn_thr=127
else if (max(SADff, SADbf)<1.5)
   dyn_thr=255
else if (max(SADff, SADbf)<2.0)
   dyn_thr=512
else if (max(SADff, SADbf)<2.5)
   dyn_thr=1023
else if (max(SADff, SADbf)<3)
   dyn_thr=2047
else
   dyn_thr=4095 Pseudo-Code (1)

Once the threshold, dyn_thr, is determined, a measure of block based difference of frame and top field texture may be determined. For blocks where this difference is greater than the threshold, dyn_thr, the differences may be accumulated to generate DynDif for the frame as shown in Pseudo-Code (2):
bTexd=bRsF−bRsT
if (bTexd>dyn_thr) {
   cnt_texblk++
   DynDif=DynDif+bTexd
} Pseudo-Code (2)
where bTexd may be the block texture difference and cnt_texblk may be a count of blocks where texture is determined to be artificial and caused by motion (e.g., when the texture difference is greater than the threshold). After accumulating DynDif for all blocks of a frame, a normalized value of DynDif may be determined by dividing it by the number of pixels in the frame.

A descriptor StatDif (e.g., static texture) may be determined as a sum of the static thresholded difference between block Rs of a frame (e.g., bRsF) and as compared to block Rs of a top field of the frame (e.g., bRsT) averaged over the number of pixels in the frame. For example, the threshold may be static and set to a value of 4096. For example, when a block texture difference is greater than the static threshold, the difference may be accumulated to determine StatDif for the frame as shown in Pseudo-Code (3):
if (bTexd>4096) {
   StatDif=StatDif+bTexd
} Pseudo-Code (3)
where bTexd may be the block texture difference as discussed. After accumulating StatDif for all blocks of a frame, a normalized value of StatDif may be determined by dividing it by the number of pixels in the frame.

A descriptor TemporalTex (e.g., temporal texture) may be determined as a measure of the difference between dynamic texture, DynDif, and static texture, StatDif, as follows: TemporalTex=DynDif−StatDif. A descriptor BigTexture (e.g., big texture) may be determined as a thresholded count of frame blocks having a high texture value. For example, BigTexture may be determined by comparing block Rs of a frame (e.g., bRsF) to a threshold. For example, the threshold may be static and set to a value of 16383. For example, BigTexture may be determined as shown in Pseudo-Code (4):
if (bRsF>16383)
   BigTexture++ Pseudo-Code (3)

A descriptor TextureLevel (e.g., texture level) may be determined as a measure of the difference between the texture level of a frame and the average texture of its fields (e.g., the fields of the frame). For example, TextureLevel may be determined as follows: TextureLevel=(RsF−((RsT+RsB)/2)).

As discussed, multiple descriptors may be determined for a frame and such descriptors may be used to determine whether the frame is progressive or interlaced.

Process 1300 may begin from start operation 1301 at decision operation 1302, "Calculate Picture based SAD Descriptors between Frames or Fields of a Frame Pair: SADff, SADbf, SADtb, SADbt", where descriptors may be determined for a frame or picture. For example, SAD descriptors may be determined for a frame and its fields. As shown, in some examples, the descriptors may include some or all of SADff, SADbf, SADtb, and SADbt. For example, SADff and SADbf may be determined as discussed herein. Descriptor SADtb may be determined as a sum of absolute differences between the top field of the current frame and the bottom field of the previous frame normalized by field size. Descriptor SADbt may be determined as a sum of absolute differences between the bottom field of the current frame and the top field of the previous frame normalized by field size.

Process 1300 may continue at operation 1303, "Calculate Block based Descriptors: StatDif, DynDif, ZeroTexture, BigTexture, RsDif, RsF, RsT, RsB", where descriptors determined as an aggregation of block based descriptors may generated. For example, StatDif, DynDif, BigTexture, RsF, RsT, RsB may be determined as discussed herein. Descriptor RsDif may be determined as an absolute difference between vertical texture of top and bottom fields of the same frame. Descriptor ZeroTexture may be determined as a conditional count of blocks without texture (as is discussed further herein).

Process 1300 may continue at operation 1304, "Calculate Additional Global Texture Descriptors: TemporalTex, TextureLevel" where global texture descriptors may be determined. For example, TemporalTex and TextureLevel may be determined as discussed herein.

Process 1300 may continue at operation 1305, "Normalize Unnormalized Descriptors: StatDif, DynDif, ZeroTexture, BigTexture", where unnormalized descriptors may be normalized. For example, StatDif, DynDif, ZeroTexture, and BigTexture may be normalized based on a number of pixels in the frame or the like.

Process 1300 may continue at operation 1306, "Frame Type Decision Process", where a frame type decision process may be selected. For example, process 1300 includes a selection between two methods although any number of methods may be provided. For example, operation 1306 provides a selection between a first method that may use descriptors and comparison tests (e.g., 9 common descriptors to define 9 comparison tests as shown) and a second method that may use a 2 stage classification structure. For example, the 2 stages may include a first stage that may use descriptors and comparison tests (e.g., 5 descriptors—including a new descriptor orient_dyndif—to define 12 comparison tests that are combined with additional conditions into final 18 tests) and second stage that may use descriptors and machine learning (e.g., 14 (9 common and 5 additional) descriptors and an extensive machine learning algorithm). Examples of such methods and stages, if applicable, are discussed further herein).

Process 1300 may continue at decision operation 1307, "Is Frame Interlaced?", where a determination may be made as to whether the current frame is interlaced. Such a decision operation may be based on the methods described with respect to operation 1306, which are discussed further herein. If the frame is determined to be interlaced, process 1300 may continue at operation 1308, "Frame is Interlaced" where the frame may be indicated as interlaced and interlaced frame indicator (intl_frm) 1203 may be set to true or 1 or the like (please refer to FIG. 12) and process 1300 may end at end block 1310. If the frame is determined not to be interlaced, process 1300 may continue at operation 1309, "Frame is Progressive" where the frame may be indicated as progressive (e.g., not interlaced) and interlaced frame indicator (intl_frm) 1203 may be set to false or 0 or the like (please refer to FIG. 12) and process 1300 may end at end block 1310.

As discussed with respect to operation 1306, a second method (e.g., Method 2) may use a 2 stage classification structure to determine if the current frame is interlaced or progressive. For example, the first stage may use 5 descriptors to define 12 comparison tests, which may be combined with additional descriptors resulting in an decision technique that uses 18 comparisons. Furthermore, the second stage may use a machine learning process that is trained to work on a critical region of uncertainty. Both the first stage and the second stage use aforementioned descriptors and a key descriptor referred to as orient_DynDif that is a measure of ratio of DynDif (e.g., a texture difference) and a count of blocks with artificial texture (e.g., cnt_texblk, please refer to Pseudo-Code (2)).

Figure 14:
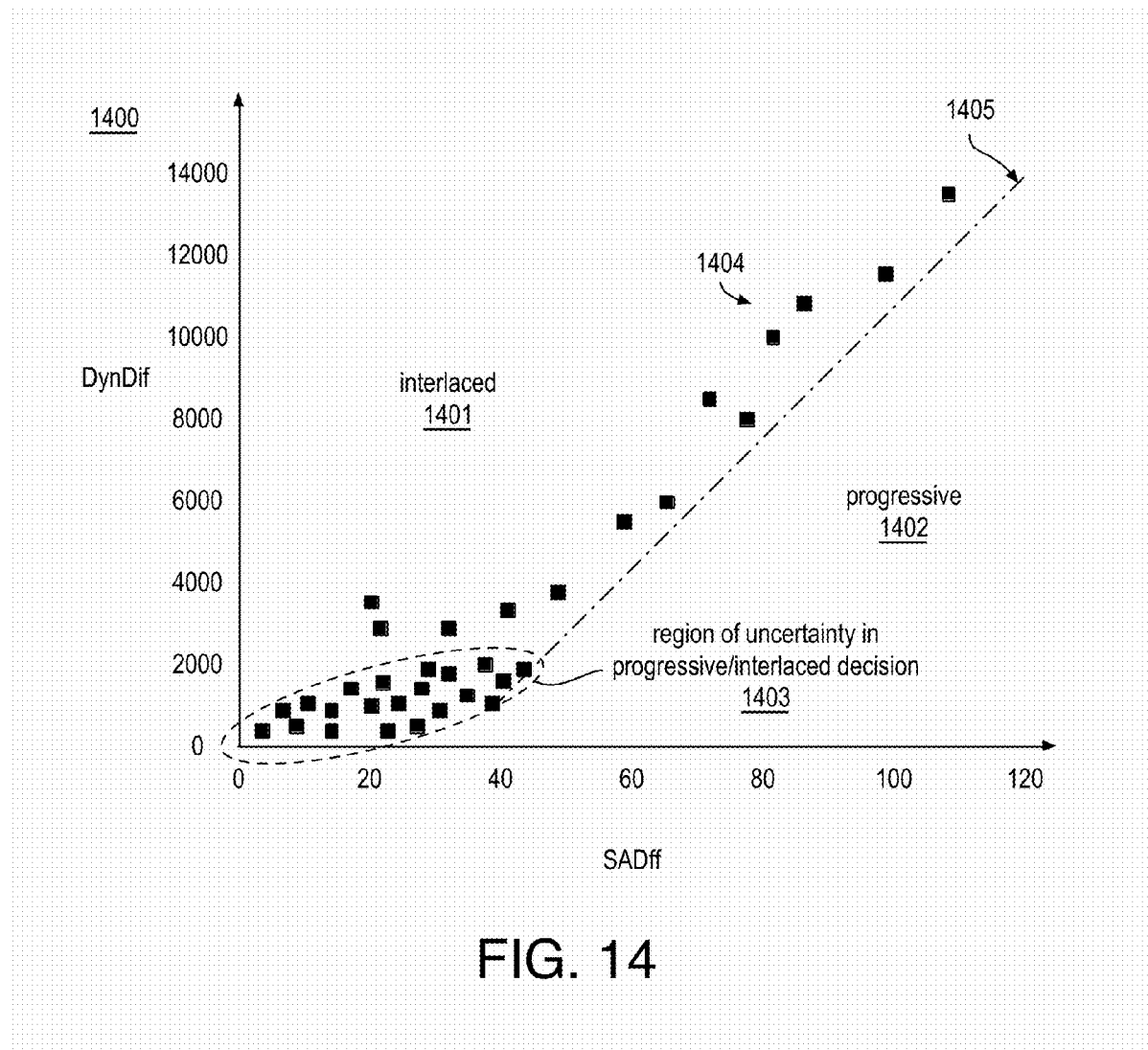
FIG. 14 is a chart of example dynamic texture versus field pair SAD for example frames.

FIG. 14 is a chart 1400 of example dynamic texture versus field pair SAD for example frames, arranged in accordance with at least some implementations of the present disclosure. As shown, chart 1400 provides dynamic texture (e.g., DynDif) on the vertical axis and field pair SAD (e.g., SADff) on the horizontal axis. For example, chart 1400 illustrates example data points 1404 for example frames. For example, chart 1400 may illustrate the importance of descriptor orient_DynDif and a region of uncertainty in progressive/interlaced decision 1403.

As shown, a line 1405 in FIG. 14 illustrates a partitioning of SADff vs DynDif space into 3 regions: interlaced region 1401, progressive region 1402, and region of uncertainty in progressive/interlaced decision 1403. In some examples, the slope of line 1405 may be associated with descriptor orient_DynDif. As shown, in some examples, line 1405 may be approximately diagonal (e.g., about 45 degrees). For example, progressive region 1402 (e.g., the region to the right side of line 1405) may correspond to classification of a frame as progressive, while interlaced region 1401 (e.g., the region to the left side of line 1405) may correspond to classification of a frame as interlaced. Furthermore, at the bottom left and for small values of SADff and DynDif a region of uncertainty in progressive/interlaced decision 1403 may exist such that classification of the frame is difficult. In some method 2 examples, this region may be handled via stage 2 by a machine learning process as is discussed further herein.

Figure 15:
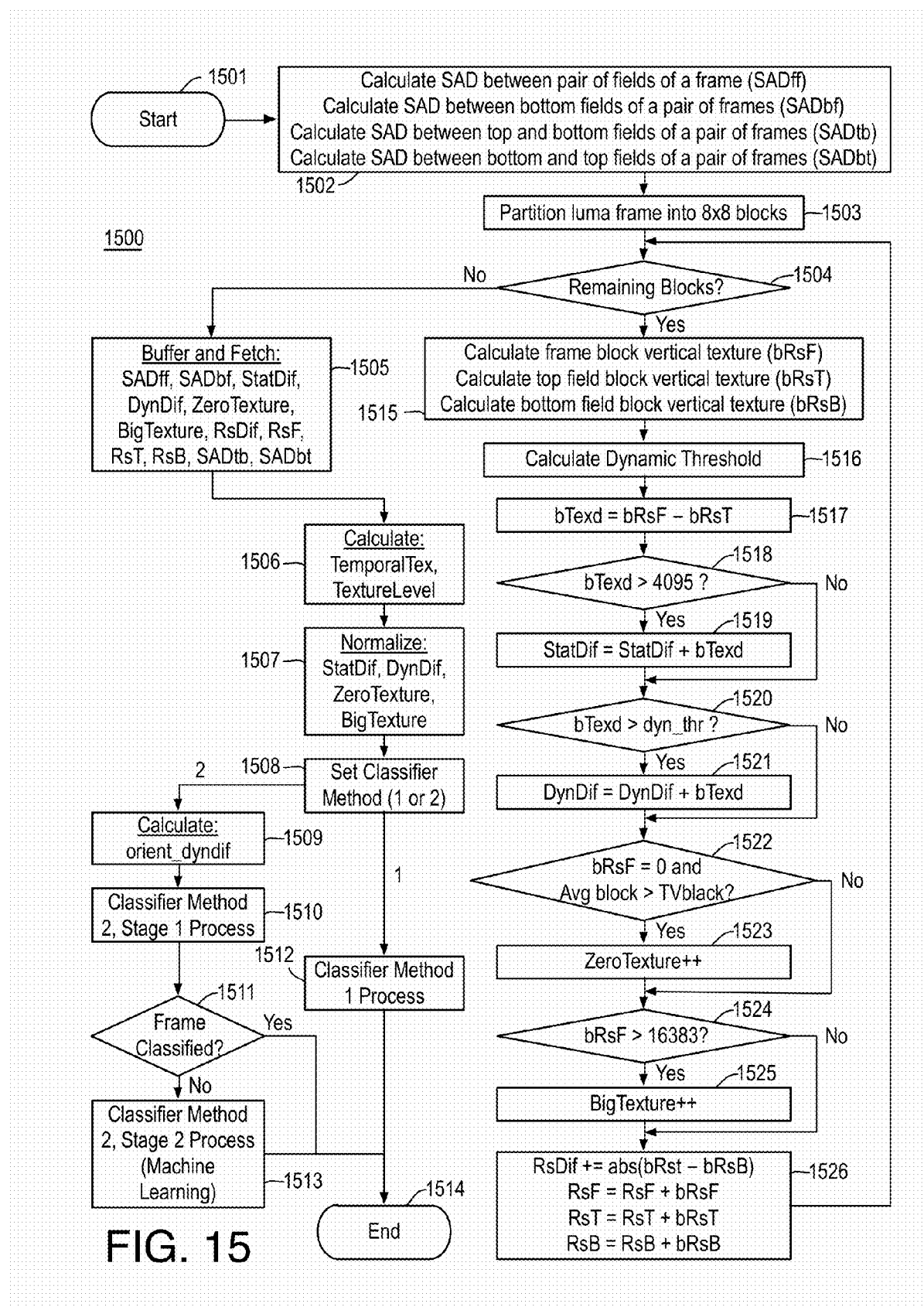
FIG. 15 is a flow diagram illustrating an example process for classifying frames.

FIG. 15 is a flow diagram illustrating an example process 1500 for classifying frames, arranged in accordance with at least some implementations of the present disclosure. As discussed, in some examples, process 1500 or portions thereof may be performed by interlaced/progressive frame classifier 1202 of system 1200 to provide interlaced frame indicator 1203. For example, interlaced/progressive frame classifier 1202 may output intl_frm=1 if a current frame is an interlaced frame and intl_frm=0 otherwise (e.g., if the frame is determined to be progressive). Process 1500 may include one or more operations 1501-1526 as illustrated in FIG. 15. Process 1500 may form at least part of a video preprocess as discussed herein. In some examples, process 1500 may expand and provide more detail relative to process 1300 as discussed herein.

As shown, process 1500 may begin from start operation 1501 at operation 1502, where SADff, SADbf, SADtb, and SADbt may be determined as discussed herein. For example, SADff may be determined as a sum of absolute differences (SAD) between the pair of fields of a frame, SADbf may be determined as a SAD between bottom fields of a pair of frames, SADtb may be determined as a SAD between top and bottom fields of a pair of frames, and SADbt may be determined as a SAD between bottom and top fields of a pair of frames. For example, SADtb and SADbt may be SADs between a top field of a current frame and a bottom field of a previous frame and a bottom field of a current frame and a top field of a previous frame, respectively. As discussed, SADff, SADbf, SADtb, and SADbt may be normalized by frame or field size as required.

Process 1500 may continue at operation 1503, "Partition luma into 8×8 blocks", where the current frame may be partitioned into 8×8 blocks. In the example of process 1500, the current frame is partitioned into 8×8 blocks, however any suitable partition size may be used.

Process 1500 may continue at decision operation 1504, "Remaining blocks?", where a determination may be made as to whether there are any remaining blocks for processing. If so, process 1500 may continue at operations 1515-1526. If not, process 1500 may continue at operations 1505-1514. For example, operations 1503-1526 may comprises a block based processing loop for determining several descriptors, thresholding them as needed, and aggregating them to determine frame based values.

For example, process 1500 may continue at operation 1515, where bRsF, bRsT, and bRsB. For example, bRsF may be determined as a frame block vertical texture. For example, bRsF may be determined as a measure of vertical texture in a frame block as squares of differences between consecutive rows of pixels of a frame block averaged over the number of pixels of the frame block. Similarly, bRsT may be determined as a top field block vertical texture and bRsB may be determined as a bottom field block vertical texture.

Process 1500 may continue at operation 1516, "Calculate Dynamic Threshold", where a dynamic threshold may be determined. For example, the dynamic threshold, dyn_thr, may be determined as discussed with respect to Pseudo-Code (1). In some examples, the dynamic threshold may be determined as discussed with respect to FIG. 16 herein. For example, the dynamic threshold may be used to threshold a block based texture difference, bTexD. In some examples, dynamic threshold, dyn_thr, may have a value of 11, 63, 127, 255, 511, 1023, 2047, or 4095.

Process 1500 may continue at operation 1517, "bTexd=bRsF–bRsT", where a block based texture difference may be determined. For example, the block based texture difference, bTexd, may be determined as a difference between the frame block vertical texture, bRsF, and the top field block vertical texture, bRsT.

Process 1500 may continue at decision operation 1518, "bTexd>4095?", where a determination may be made as to whether the block based texture difference is greater than a static threshold. In the example of process 1500, the static threshold may be 4095, however the static threshold may be any suitable value. If so, process 1500 may continue at decision operation 1520 as is discussed further herein. If not, process 1500 may continue at operation 1519, "StatDif=StatDif+bTexd", where a descriptor StatDif (e.g., static texture) may be established and/or accumulated. For example, StatDif may be accumulated over the entire current frame.

Process 1500 may continue at decision operation 1520, "bTexd>dyn_thr?", where a determination may be made as to whether the block based texture difference is greater than the dynamic threshold determined at operation 1516. If not, process 1500 may continue at operation 1522 as is discussed further herein. If so, process 1500 may continue at operation 1521, "DynDif=DynDif+bTexd", where descriptor DynDif (e.g., dynamic texture) may be established and/or accumulated. For example, DynDif may be accumulated over the entire current frame.

Process 1500 may continue at decision operation 1522, "bRsF=0 and Avg block>TVblack?", where a determination may be made as to whether the frame block vertical texture, bRsF, is very small. In the example of process 1500, a threshold of 0 is used to determine whether bRsF is small, however any suitable threshold may be used. Furthermore, a determination may be made as to whether an average block is greater than a threshold TVblack (e.g., whether the block is above a black color). If not, process 1500 may continue at operation 1524 as is discussed further herein. If so, process 1500 may continue at operation 1523, "ZeroTexture++", where descriptor ZeroTexture (e.g., a count of blocks of a frame having little or no texture) may be established and/or incremented. For example, ZeroTexture may be accumulated over the entire current frame.

Process 1500 may continue at decision operation 1524, "bRsF>16383?", where a determination may be made as to whether the frame block vertical texture is very large via comparison to a threshold. In the example of process 1500, a threshold of 16383 may be used, however any suitable threshold may be used. If not, process 1500 may continue at operation 1526 as is discussed further herein. If so, process 1500 may continue at operation 1525, "BigTexture++", where descriptor BigTexture (e.g., a count of blocks of a frame having very large texture) may be established and/or incremented. For example, BigTexture may be accumulated over the entire current frame.

Process 1500 may continue at operation 1526, where descriptors RsDif, RsF, RsT, and RsB may be established and/or accumulated. For example, the descriptors may be accumulated over the entire current frame. For example, descriptor RsDif may be an absolute difference between vertical texture of top and bottom fields of the same frame and RsDif may be determined as an absolute difference of Rs between top and bottom field accumulated over a field as shown. Descriptor RsF may be a measure of vertical texture of a frame, descriptor RsT may be a measure of vertical texture of a top field, and descriptor RsB may be a measure of vertical texture of a bottom field. Such descriptors may be accumulated on a block by block basis via the loop of operations 1504-1526 as discussed.

As discussed, when all blocks of a frame are completed, process 1500 may continue at operation 1505, where the discussed descriptors may be buffered to/fetched from memory. For example, such descriptors may be saved to memory for further processing and fetched from memory as needed via process 1500 and/or other processed discussed herein. For example, the following descriptors may be buffered and/or fetched: SADff, SADbf, StatDif, DynDif, ZeroTexture, BigTexture, RsDif, RsF, RsT, RsB, SADtb, SADbt.

Process 1500 may continue at operation 1506, "Calculate: TemporalTex, TextureLevel", where descriptors TemporalTex and TextureLevel may be determined as discussed herein. For example, descriptor TemporalTex may be determined as a measure of the difference between dynamic texture, DynDif, and static texture, StatDif and descriptor TextureLevel may be determined as a measure of the difference between the texture level of a frame and the average texture of its fields.

Process 1500 may continue at operation 1507, "Normalize: StatDif, DynDif, ZeroTexture, BigTexture", where descriptors StatDif, DynDif, ZeroTexture, BigTexture may be normalized as discussed herein. For example, StatDif, DynDif, ZeroTexture, BigTexture may be normalized by picture size.

Process 1500 may continue at operation 1508, "Set Classifier Method (1 or 2)", where a classifier method may be set for the current frame. For example, the classifier method may be made for a source video, a sequence of frames, or on a frame-by-frame basis. For example, method 1 may use purely a curve fitting approach on measured data and method 2 may use a two stage approach such that stage 1 of method 2 is based on a curve fitting approach on measured data and stage 2 of method 2 may use a machine learning based approach. Furthermore, method 2 may also use a new descriptor orient_dyndif as discussed herein.

If method 1 is selected, process 1500 may continue at operation 1512, "Classifier Method 1 Process", where classifier method 1 may be applied as is discussed further to designate the current frame as interlaced or progressive herein and process 1500 may end at end operation 1514.

If method 2 is selected, process 1500 may continue at operation 1509, "Calculate: orient_dyndif", where descriptor orient_dyndif may be determined as is discussed further herein. Process 1500 may continue at operation 1510, "Classifier Method 2, Stage 1 Process", where classifier method 2, stage 1 may be applied as is discussed further herein. Process 1500 may continue at decision operation 1511, "Frame Classified?, where a determination may be made as to whether the frame was classified via method 2, stage 1. If so, process 1500 may end at end operation 1514. If not, process 1500 may continue at operation 1513, "Classifier Method 2, Stage 2 Process (Machine Learning)", where classifier method 2, stage 2 may be applied as is discussed further herein to designate the current frame as interlaced or progressive and process 1500 may end at operation 1514.

As discussed with respect to operation 1516, in some examples, a dynamic threshold may be determined during block based processing of a frame to determine whether the frame is interlaced or progressive.

Figure 16:
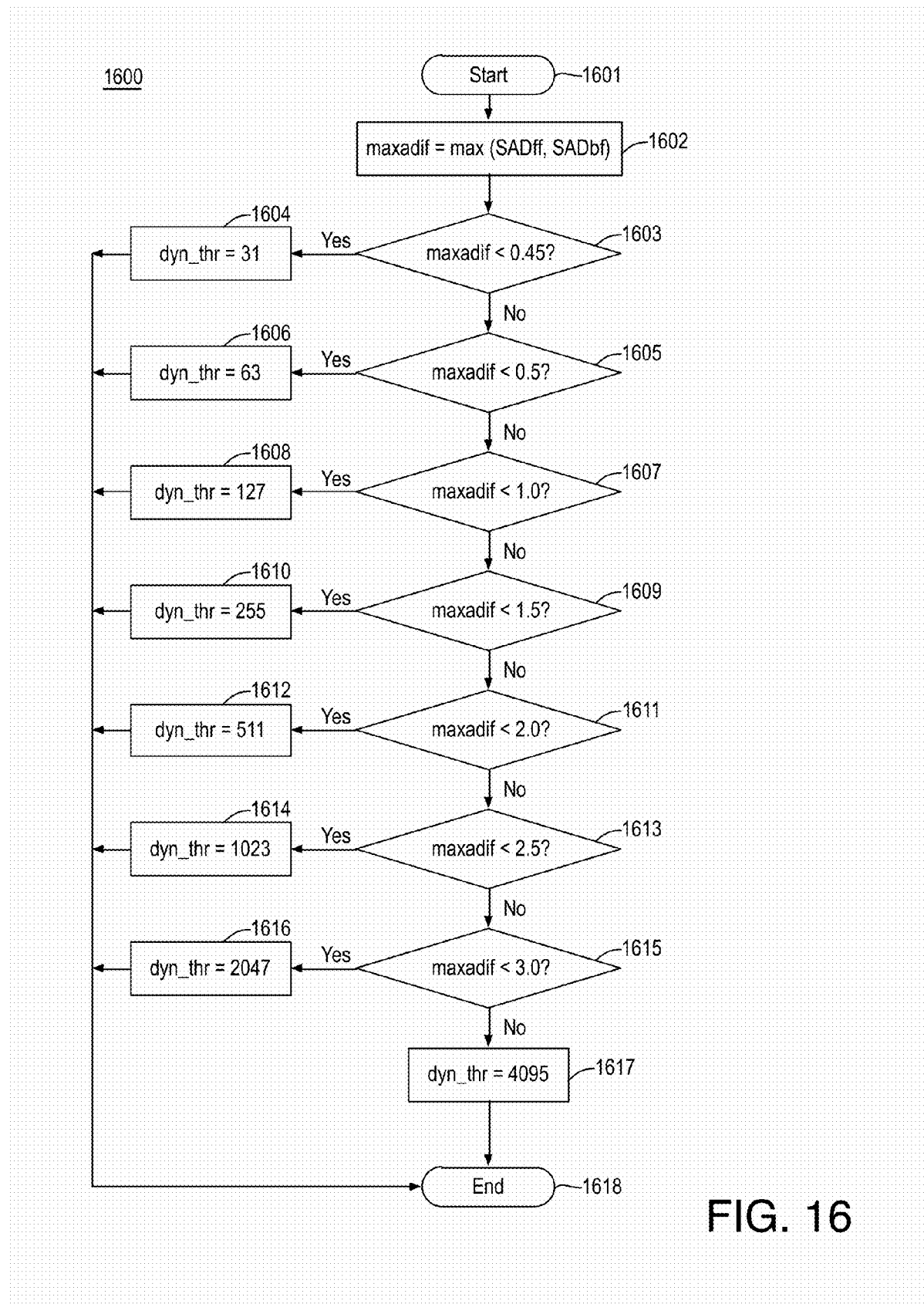
FIG. 16 is a flow diagram illustrating an example process for generating a dynamic threshold.

FIG. 16 is a flow diagram illustrating an example process 1600 for generating a dynamic threshold, arranged in accordance with at least some implementations of the present disclosure. As discussed, in some examples, process 1600 or portions thereof may be performed by interlaced/progressive frame classifier 1202 of system 1200 to provide a dynamic threshold, dyn_thr. For example, process 1600 may be performed on a block by block basis (e.g. a dynamic threshold may be determined for each block of a frame). Process 1600 may include one or more operations 1601-1617 as illustrated in FIG. 16. Process 1600 may form at least part of a video preprocess as discussed herein.

As shown, process 1600 may begin from start operation 1601 at operation 1602, "maxadif=max (SADff, SADbf)", where a descriptor maxadif may be set as a maximum of SADff and SADbf. For example, a maximum of the sum of absolute difference (SAD) between a pair of fields of a frame normalized by frame size and the sum of absolute difference between bottom fields of a pair of frames normalized by field size may be determined a maximum sum of absolute differences for the frame.

Process 1600 may continue at decision operation 1603, "maxadif<0.45?", where the maximum may be compared to a first threshold. In the example of process 1600, the first threshold is 0.45, however any suitable first threshold may be used. If the maximum is less than the first threshold, process 1600 may continue at operation 1604, "dyn_thr=31", where the dynamic threshold may be set to a first value and process 1600 may end at end operation 1618. In the example of process 1600, the first value is 31, however any suitable first value may be used.

If the maximum is not less than the first threshold, process 1600 may continue at decision operation 1605, "maxadif<0.5?", where the maximum may be compared to a second threshold. In the example of process 1600, the second threshold is 0.5, however any suitable second threshold may be used. If the maximum is less than the second threshold, process 1600 may continue at operation 1606, "dyn_thr=63", where the dynamic threshold may be set to a second value and process 1600 may end at end operation 1618. In the example of process 1600, the second value is 63, however any second value may be used.

If the maximum is not less than the second threshold, process 1600 may continue at decision operation 1607, "maxadif<1.0?", where the maximum may be compared to a third threshold. In the example of process 1600, the third threshold is 1.0, however any suitable third threshold may be used. If the maximum is less than the second threshold, process 1600 may continue at operation 1608, "dyn_thr=127", where the dynamic threshold may be set to a third value and process 1600 may end at end operation 1618. In the example of process 1600, the third value is 127, however any suitable third value may be used.

If the maximum is not less than the third threshold, process 1600 may continue at decision operation 1609, "maxadif<1.5?", where the maximum may be compared to a fourth threshold. In the example of process 1600, the fourth threshold is 1.5, however any suitable fourth threshold may be used. If the maximum is less than the third threshold, process 1600 may continue at operation 1610, "dyn_thr=255", where the dynamic threshold may be set to a fourth value and process 1600 may end at end operation 1618. In the example of process 1600, the fourth value is 255, however any suitable fourth value may be used.

If the maximum is not less than the fourth threshold, process 1600 may continue at decision operation 1611, "maxadif<2.0?", where the maximum may be compared to a fifth threshold. In the example of process 1600, the fifth threshold is 2.0, however any suitable fifth threshold may be used. If the maximum is less than the fourth threshold, process 1600 may continue at operation 1612, "dyn_thr=511", where the dynamic threshold may be set to a fifth value and process 1600 may end at end operation 1618. In the example of process 1600, the fifth value is 511, however any suitable fifth value may be used.

If the maximum is not less than the fifth threshold, process 1600 may continue at decision operation 1613, "maxadif<2.5?", where the maximum may be compared to a sixth threshold. In the example of process 1600, the sixth threshold is 2.5, however any suitable sixth threshold may be used. If the maximum is less than the fifth threshold, process 1600 may continue at operation 1614, "dyn_thr=1023", where the dynamic threshold may be set to a sixth value and process 1600 may end at end operation 1618. In the example of process 1600, the sixth value is 1023, however any suitable sixth value may be used.

If the maximum is not less than the sixth threshold, process 1600 may continue at decision operation 1615, "maxadif<3.0?", where the maximum may be compared to a seventh threshold. In the example of process 1600, the seventh threshold is 3.0, however any suitable seventh threshold may be used. If the maximum is less than the sixth threshold, process 1600 may continue at operation 1616, "dyn_thr=2047", where the dynamic threshold may be set to a seventh value and process 1600 may end at end operation 1618. In the example of process 1600, the seventh value is 2047, however any suitable seventh value may be used.

If the maximum is not less than the sixth threshold, process 1600 may continue at operation 1617, "dyn_thr=4095", where the dynamic threshold may be set to an eighth/default value and process 1600 may end at end operation 1618. In the example of process 1600, the eighth/default value is 4095, however any suitable seventh value may be used.

As shown, process 1600 may first determine the larger of the two SADs: the SAD for the frame (e.g., SADff) and the SAD for the bottom field (e.g., SADbf) and assign the determined value to a descriptor maxadif. Next, a series of tests may be conducted on maxadif and, based on whether maxadif is less than predetermined threshold, a dynamic threshold may be provided, or the testing of maxadif may continues until a maximum threshold to be tested (e.g., the sixth threshold) is reached and, if maxadif is larger than the maximum threshold, a large value (e.g., the eighth/default value of 4095 or the like) may be assigned to dyn_thr. In the example, the first test for maxadif compares it to a pre-fixed value of 0.45, if it is smaller, dyn_thr is assigned a value of 31. On the other hand if maxadif is greater than equal to 0.45, it is compared with 0.5, if it is smaller than this value, dyn_thr is assigned a value of 63, if not, the process for comparisons and assignment of next dyn_thr continues. If maxadif is found to be greater than or equal to 3.0, dyn_thr is assigned the value of 4095, which is the largest value that can be assigned to dyn_thr. In the illustrated example, maxadif is compared to the described thresholds using a less than comparator, however any suitable comparator (e.g., less than or equal, not greater than, or the like) may be used.

As discussed with respect to operation 1512, in some examples, a classifier method 1 may be applied to designate the current frame as interlaced or progressive. For example, the classifier method 1 may use purely a curve fitting approach based on measured data and determined descriptors to designate the current frame as interlaced or progressive.

Figure 25:
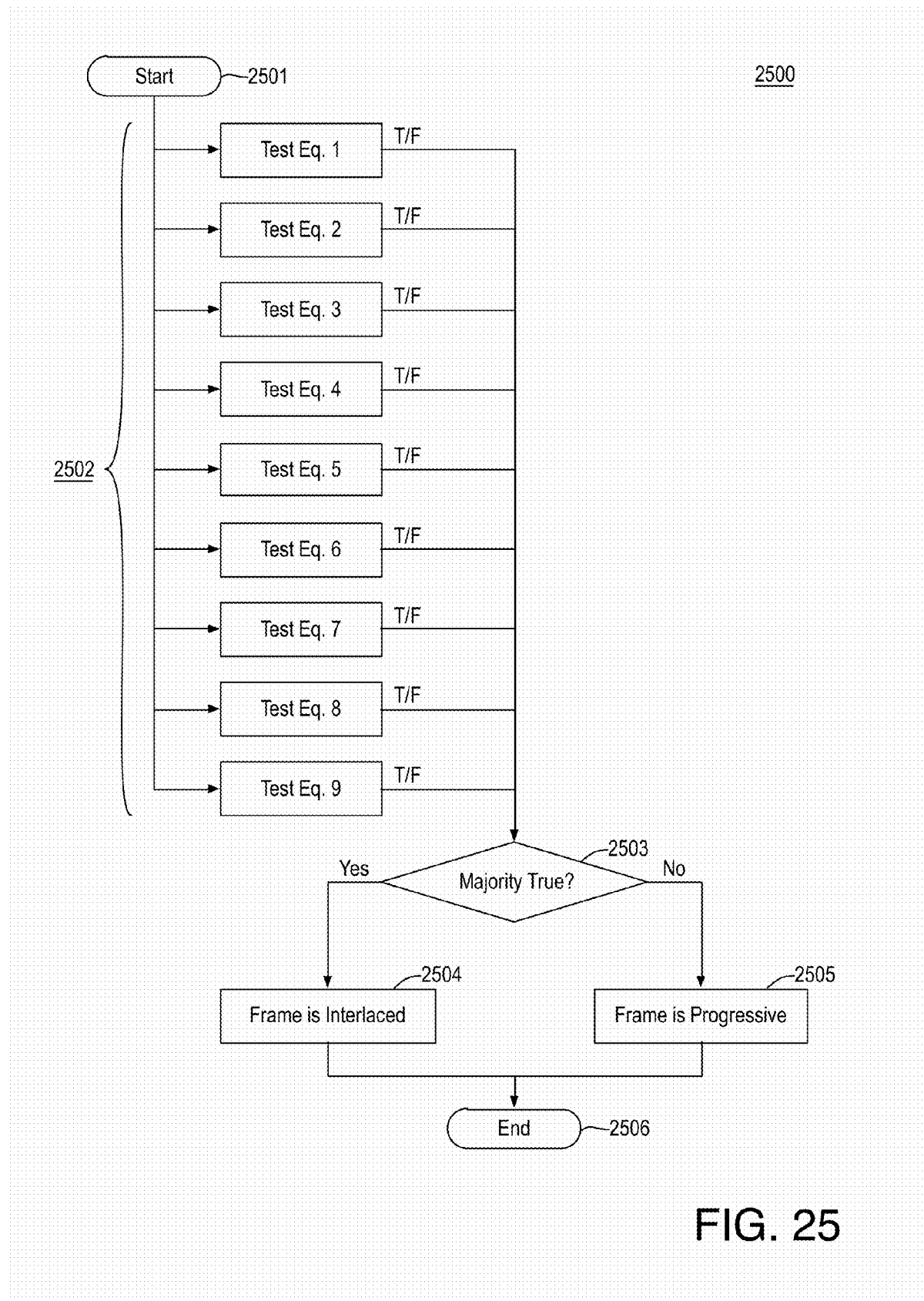
FIG. 25 is a flow diagram illustrating an example process for classifying a frame as interlaced or progressive.

FIG. 25 is a flow diagram illustrating an example process 2500 for classifying a frame as interlaced or progressive, arranged in accordance with at least some implementations of the present disclosure. As discussed, in some examples, process 2500 or portions thereof may be performed by interlaced/progressive frame classifier 1202 of system 1200 to provide interlaced frame indicator 1203. For example, interlaced/progressive frame classifier 1202 may output intl_frm=1 if a current frame is an interlaced frame and intl_frm=0 otherwise (e.g., if the frame is determined to be progressive). Process 2500 may include one or more operations 2501-2506 as illustrated in FIG. 25. Process 2500 may form at least part of a video preprocess as discussed herein.

As discussed, a method 1 may use descriptors and comparison tests to determine whether a current frame is progressive or interlaced. For example, method 1 may use the aforementioned set of 10 common (e.g., 7 explicit, 3 implicit) descriptors such as SADff, RsG (e.g., which depends on RsT, RsB), StatDif, DynDif (e.g., which depends on SADbf), TemporalTex, TextureLevel, and BigTexture. This set of descriptors may be used to perform 9 comparison tests to determine if an input frame is interlaced or not. For example, the equations of comparison tests may be based on curve fitting using observed data. Such equations may be used in process 2500 as is discussed further herein and example equations (e.g., Equations (1)-(9)) are as follows:

$$\text{DynDif} < (1.7832 * \text{SAD}\!f\!f) - 5.3497 \quad \text{Equation (1)}$$

$$\text{BigTexture} \leq (0.2742 * \text{SAD}\!f\!f) + 0.1851 \quad \text{Equation (2)}$$

$$\text{DynDif} < (3.3571 * \text{RsF}) - 20.5594 \quad \text{Equation (3)}$$

$$\text{TemporalTex} \geq (0.1983 * \text{TextureLevel}) + 1.4804 \quad \text{Equation (4)}$$

$$\text{TemporalTex} < (2.5075 * \text{TextureLevel}) + 9.5640 \quad \text{Equation (5)}$$

$$\text{DynDif} > (-2.9723 * \text{StatDif}) + 1.5171 \quad \text{Equation (6)}$$

$$\text{RsF} < (3.3829 * \text{SAD}\!f\!f) - 2.0947 \quad \text{Equation (7)}$$

$$\text{TemporalTex} \geq (0.0344 * \text{TextureLevel}) + 0.3003 \quad \text{Equation (8)}$$

$$\text{RsF} < (-1.1642 * \text{TextureLevel}) + 1.2433 \quad \text{Equation (9)}$$

where descriptors DynDif, SADff, BigTexture, RsF, TemporalTex, TextureLevel, and StatDif may be determined as discussed herein. Furthermore, Equations (1)-(9) illustrate example parameters and comparators, however other parameters and/or comparators may be used.

As shown, process 2500 may begin from start operation 2501 at operations 2502, where tests may be performed based on Equations (1)-(9) and, for each test, an output of true or false (T/F) may be provided. In the illustrated example, Equations (1)-(9) are used, however, more or fewer tests may be provided and, as discussed, different parameter and/or comparators may be provided.

Process 2500 may continue at decision operation 2503, "Majority True", where a determination may be made as to whether a majority of operations 2502 provided an output of true. If so, process 2500 may continue at operation 2504, "Frame is Interlaced", where the current frame may be designated or determined to be interlaced and process 2500 may end at end operation 2506. If not (e.g., a majority of operations 2502 provided an output of false), process 2500 may continue at operation 2505, "Frame is Progressive", where the current frame may be designated or determined to be progressive and process 2500 may end at end operation 2506.

As discussed, process 2500 and/or method 1 as discussed herein may perform 9 comparison tests based on a variety of descriptors such that a determination may be made as to whether a frame is interlaced or progressive based on whether majority of results are true or not. For example, if 5 or more (e.g., a majority) comparisons are true, then a frame being evaluated is determined to be interlaced and, otherwise, the frame is determined to be progressive.

As discussed with respect to operations 1509-1513, in some examples, a classifier method 2 having 2 stages may be applied to designate the current frame as interlaced or progressive. For example, the classifier method 1 stage 1 may classify the current frame as interlaced, progressive, or uncertain and, if the frame is classified at stage 1 as uncertain, stage 2 may be applied to determine whether the current frame is interlaced or progressive. For example, stage 1 may use a curve fitting approach based on measured data and determined descriptors and stage 2 may use machine learning based on measured data, determined descriptors, and a machine learning algorithm to designate the current frame as interlaced or progressive. For example, method 2 may include a two stage analysis and comparison system based on 10 common descriptors discussed herein as well as new specialized descriptors.

Figure 17A:
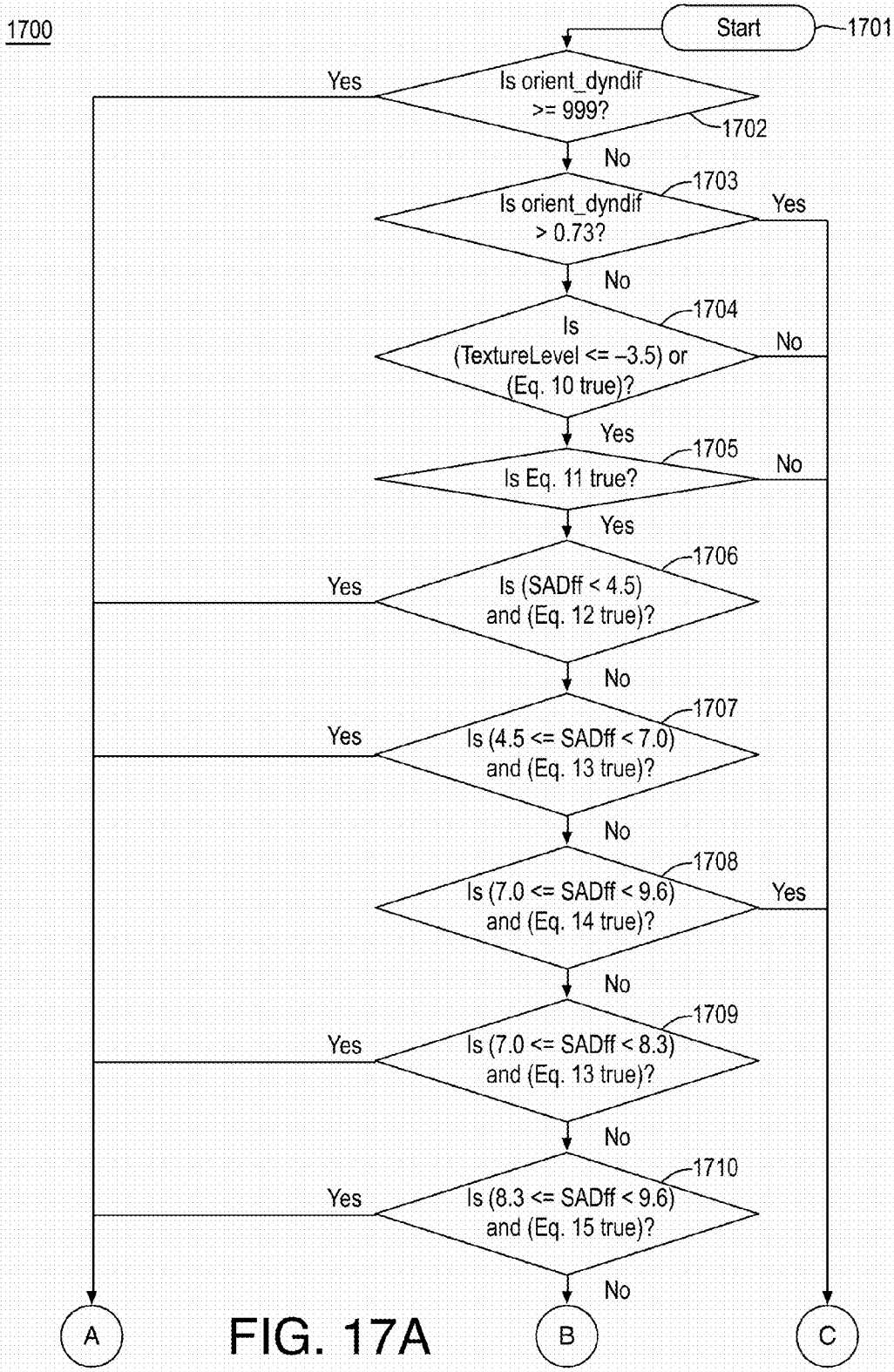
FIGS. 17A and 17B illustrate a flow diagram providing an example process for classifying a frame as interlaced, progressive, or uncertain.
Figure 17B:
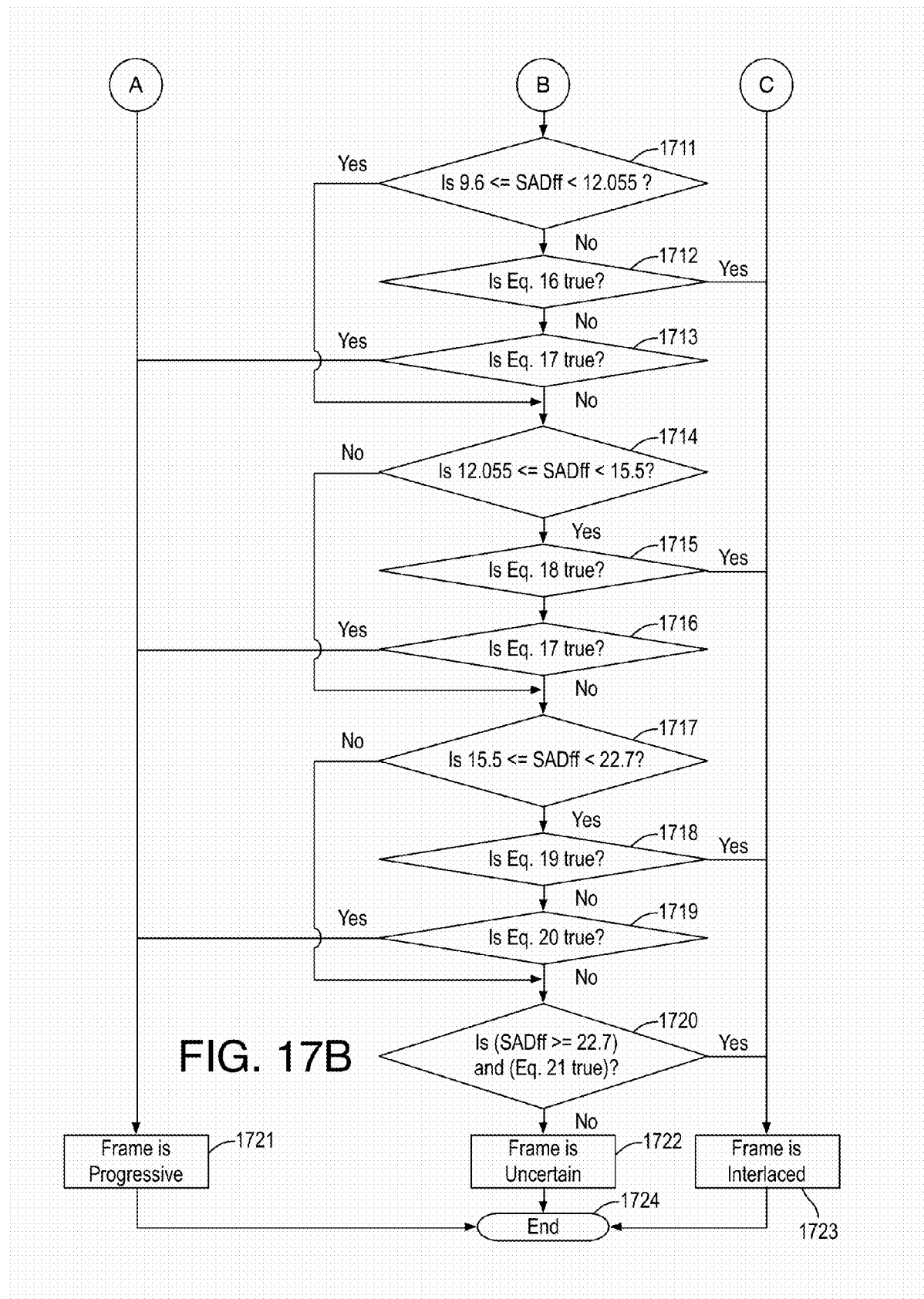

FIGS. 17A and 17B illustrate a flow diagram providing an example process 1700 for classifying a frame as interlaced, progressive, or uncertain, arranged in accordance with at least some implementations of the present disclosure. In some examples, process 1700 or portions thereof may be performed by interlaced/progressive frame classifier 1202 of system 1200 to provide interlaced frame indicator 1203. For example, interlaced/progressive frame classifier 1202 may output intl_frm=1 if a current frame is an interlaced frame and intl_frm=0 if the frame is determined to be progressive. Furthermore, interlaced/progressive frame classifier 1202 may provide no output via process 1700 if a frame is determined to be uncertain. Process 1700 may include one or more operations 1701-1724 as illustrated in FIGS. 17A and 17B. Process 1700 may form at least part of a video preprocess as discussed herein.

For example, the first stage detection (e.g., method 2, stage 1) may be based on an empirical set of twelve equations and a process that may handles areas of classification certainty (e.g., interlaced or progressive, please refer to FIG. 14). The second stage (e.g., method 2, stage 2) may be a detailed classification method that may handle the region where the frame characteristics are not clear (please refer to FIG. 14). In such regions, a technique utilizing a multidimensional analysis may be needed. To model this situation, a machine learning classifier may be used. For example, the machine learning classifier may be pre-trained based on a learning set. In some examples, the machine learning classifier may be based on a version of the C4.5 classification tree algorithm such as the J48 Java implementation of the C4.5 classification tree algorithm from Weka (Waikato Environment for Knowledge Analysis).

As discussed, method 2 may utilize additional descriptors to those discussed herein. For example, descriptor RsDif may be determined as an absolute difference between vertical texture of the top field and the bottom field of the same frame. Descriptor RsDif may be determined at operation 1303 or 1526 for example. A descriptor orient_dyndif may be determined as the arctangent of the ratio of DynDif to the frame size and the count of blocks where texture is determined to be artificial and caused by motion. In some examples, orient_dyndif may be associated with a slope or angle of line 1405 as discussed with respect to FIG. 14. For example, orient_dyndif may be determined as orient_dyndif=$\text{Tan}^{-1}$(DynDif/Frame_size/cnt_texblk). A descriptor ZeroTexture, a conditional count for blocks without texture and that are above black color, may be determined as discussed herein such as with respect to operations 1522 and 1523. A descriptor SADtb may be determined as a cross SAD between a top field of the current frame and a bottom field of the previous frame as discussed herein. A descriptor SADbt may be determined as a cross SAD between a bottom field of the current frame and a top field of the previous frame.

For example, method 2, stage 1 may use descriptors and comparison tests to determine whether a current frame is interlaced, progressive, or uncertain. In some examples, method 2, stage 1 may use 4 common explicit descriptors such as SADff, DynDif, TemporalTex, and TextureLevel in twelve comparison tests to determine if an input frame is interlaced or not. The equations of comparison tests may be based on curve fitting using observed data. Such equations may be used in process 1700 as is discussed further herein and example equations (e.g., Equations (10)-(21)) are as follows:

$$\text{TemporalTex} \le (0.997*\text{TextureLevel}^2)+(-0.0512*\text{TextureLevel})+0.2375 \quad \text{Equation (10)}$$

$$\text{DynDif} \le (0.1665*(\text{SAD}ff)^3)+(-3.3511*(\text{SAD}ff)^2)+(26.426*(\text{SAD}ff))+0.95 \quad \text{Equation (11)}$$

$$\text{DynDif}<0.0176*e^{0.6726*(\text{SAD}f)} \quad \text{Equation (12)}$$

$$\text{DynDif}<(0.058*(\text{SAD}ff)^3)+(-0.673*(\text{SAD}ff)^2)+(2.671*(\text{SAD}ff))-2.8396 \quad \text{Equation (13)}$$

$$\text{DynDif}>(-2.1491*(\text{SAD}ff)^3)+(51.764*(\text{SAD}ff)^2)+(-389.04*(\text{SAD}ff))+943.0 \quad \text{Equation (14)}$$

$$\text{DynDif} \le (5.122*(\text{SAD}ff)^2)+(-76.323*(\text{SAD}ff))+286.58 \quad \text{Equation (15)}$$

$$\text{DynDif}>(-2.3272*(\text{SAD}ff)^3)+(68.832*(\text{SAD}ff)^2)+(-649.82*(\text{SAD}ff))+2003.68 \quad \text{Equation (16)}$$

$$\text{DynDif}<(1.0189*(\text{SAD}ff)^2)+(-19.57*(\text{SAD}ff))+118.84 \quad \text{Equation (17)}$$

$$\text{DynDif}>(23.314*(\text{SAD}ff)^2)+(-581.74*(\text{SAD}ff))+3671.1 \quad \text{Equation (18)}$$

$$\text{DynDif}>(-4.4652*(\text{SAD}ff)^2)+(189.79*(\text{SAD}ff))-1624.82 \quad \text{Equation (19)}$$

$$\text{DynDif}<(23.314*(\text{SAD}ff)^2)+(-581.74*(\text{SAD}ff))+3671.1 \quad \text{Equation (20)}$$

$$\text{DynDif}>(-1.8092*(\text{SAD}ff)^2)+(180.44*(\text{SAD}ff))-3081.81 \quad \text{Equation (21)}$$

where descriptors TemporalTex, TextureLevel, DynDif, and SADff, may be determined as discussed herein. Furthermore, Equations (10)-(21) illustrate example parameters and comparators, however other parameters and/or comparators may be used. As shown, Equations (11)-(21) may only be based on DynDif and SADff.

As shown, process 1700 may begin from start operation 1701 at decision operation 1702, "Is orient_dyndif>=999?", where a determination may be made as to whether orient_dyndiff is greater than or equal to 999. If so, process 1700 may continue at operation 1721, "Frame is Progressive" (please refer to FIG. 17B), where the current frame may be designated or determined to be progressive and process 1700 may end at end operation 1724.

If not, process 1700 may continue at decision operation 1703, "Is orient_dyndif>0.73?", where a determination may be made as to whether orient_dyndiff is greater than 0.73. If so, process 1700 may continue at operation 1723, "Frame is Interlaced" (please refer to FIG. 17B), where the current frame may be designated or determined to be interlaced and process 1700 may end at end operation 1724.

If not, process 1700 may continue at decision operation 1704, "Is (TextureLevel<=-3.5) or (Eq. 10 true)?", where a determination may be made as to whether TextureLevel is less than or equal to -3.5 or Equation (10) is true. If neither are true, process 1700 may continue at operation 1723, "Frame is Interlaced", where the current frame may be designated or determined to be interlaced and process 1700 may end at end operation 1724.

If either is true, process 1700 may continue at decision operation 1705, "Is Eq. 10 true?", where a determination may be made as to whether Equation (11) is true. If not, process 1700 may continue at operation 1723, "Frame is Interlaced", where the current frame may be designated or determined to be interlaced and process 1700 may end at end operation 1724.

If Equation (11) is true, process 1700 may continue at decision operation 1706, "Is (SADff<4.5) and (Eq. 12 true)?", where a determination may be made as to whether SADff is less than 4.5 and Equation (12) is true. If both are true, process 1700 may continue at operation 1721, "Frame is Progressive", where the current frame may be designated or determined to be progressive and process 1700 may end at end operation 1724.

If one or both are false, process 1700 may continue at decision operation 1707, "Is (4.5<=SADff<7.0) and (Eq. 13 true)?", where a determination may be made as to whether SADff is greater than or equal to 4.5 and less than 7.0 and Equation (13) is true. If both are true, process 1700 may continue at operation 1721, "Frame is Progressive", where the current frame may be designated or determined to be progressive and process 1700 may end at end operation 1724.

If one or both are false, process 1700 may continue at decision operation 1708, "Is (7.0<=SADff<9.6) and (Eq. 14 true)?", where a determination may be made as to whether SADff is greater than or equal to 7.0 and less than 9.6 and Equation (14) is true. If both are true, process 1700 may continue at operation 1723, "Frame is Interlaced", where the current frame may be designated or determined to be interlaced and process 1700 may end at end operation 1724.

If one or both are false, process 1700 may continue at decision operation 1709, "Is (7.0<=SADff<8.3) and (Eq. 13 true)?", where a determination may be made as to whether SADff is greater than or equal to 7.0 and less than 8.3 and Equation (13) is true. If both are true, process 1700 may continue at operation 1721, "Frame is Progressive", where the current frame may be designated or determined to be progressive and process 1700 may end at end operation 1724.

If one or both are false, process 1700 may continue at decision operation 1710, "Is (8.3<=SADff<9.6) and (Eq. 15 true)?", where a determination may be made as to whether SADff is greater than or equal to 8.3 and less than 9.6 and Equation (15) is true. If both are true, process 1700 may continue at operation 1721, "Frame is Progressive", where the current frame may be designated or determined to be progressive and process 1700 may end at end operation 1724.

If one or both are false, process 1700 may continue at decision operation 1711 (please refer to FIG. 17B), "Is 9.6<=SADff<12.055?", where a determination may be made as to whether SADff is greater than or equal to 9.6 and less than 12.055. If so, process 1700 may continue at decision operation 1714 as discussed further herein.

If not, process 1700 may continue at decision operation 1712, "Is Eq. 16 true?", where a determination may be made as to whether Equation (16) is true. If so, process 1700 may continue at operation 1723, "Frame is Interlaced", where the current frame may be designated or determined to be interlaced and process 1700 may end at end operation 1724.

If not, process 1700 may continue at decision operation 1713, "Is Eq. 17 true?", where a determination may be made as to whether Equation (17) is true. If so, process 1700 may continue at operation 1721, "Frame is Progressive", where the current frame may be designated or determined to be progressive and process 1700 may end at end operation 1724.

If not, process 1700 may continue at decision operation 1714 (process 1700 also may continue at decision operation 1714 from decision operation 1711 as discussed), "Is 12.055<=SADff<15.5?", where a determination may be made as to whether SADff is greater than or equal to 12.055 and less than 15.5. If not, process 1700 may continue at decision operation 1717 as discussed further herein.

If so, process 1700 may continue at decision operation 1715, "Is Eq. 18 true?", where a determination may be made as to whether Equation (18) is true. If so, process 1700 may continue at operation 1723, "Frame is Interlaced", where the current frame may be designated or determined to be interlaced and process 1700 may end at end operation 1724.

If not, process 1700 may continue at decision operation 1716, "Is Eq. 17 true?", where a determination may be made as to whether Equation (17) is true. If so, process 1700 may continue at operation 1721, "Frame is Progressive", where the current frame may be designated or determined to be progressive and process 1700 may end at end operation 1724.

If not, process 1700 may continue at decision operation 1717 (process 1700 also may continue at decision operation 1717 from decision operation 1714 as discussed), "Is 15.5<=SADff<22.7?", where a determination may be made as to whether SADff is greater than or equal to 15.5 and less than 22.7. If not, process 1700 may continue at decision operation 1720 as discussed further herein.

If so, process 1700 may continue at decision operation 1718, "Is Eq. 19 true?", where a determination may be made as to whether Equation (19) is true. If so, process 1700 may continue at operation 1723, "Frame is Interlaced", where the current frame may be designated or determined to be interlaced and process 1700 may end at end operation 1724.

If not, process 1700 may continue at decision operation 1719, "Is Eq. 20 true?", where a determination may be made as to whether Equation (20) is true. If so, process 1700 may continue at operation 1721, "Frame is Progressive", where the current frame may be designated or determined to be progressive and process 1700 may end at end operation 1724.

If not, process 1700 may continue at decision operation 1720 (process 1700 also may continue at decision operation 1720 from decision operation 1717 as discussed), "Is (SADff>=22.7) and (Eq. 21 true)?", where a determination may be made as to whether SADff is greater than or equal to 22.7 and Equation (21) is true. If both are true, process 1700 may continue at operation 1723, "Frame is Interlaced", where the current frame may be designated or determined to be interlaced and process 1700 may end at end operation 1724.

If not, process 1700 may continue at operation 1722, "Frame is Uncertain", where the current frame may be designated or determined to be uncertain and process 1700 may end at end operation 1724. For example, when the current frame may be designated or determined to be uncertain a second stage of processing may be evoked to classify the current frame.

For example, the operations of process 600 may be provided as follows: 0. Is (orient_dyndif>=999 true)? If 'yes' go to step 19; 1. Is (orient_dyndif>0.73 is true)? If 'yes' the frame is 'interlaced', Go to step 19; 2. Is (TextureLevel<=−3.5) or Eq. 10 is true? If 'no' the frame is 'interlaced', Go to step 19; 3. Is Eq. 11 is true ? If 'no' the frame is 'interlaced', Go to step 19; 4. Is (SADff<4.5) and (Eq. 12 is true)? If 'yes', the frame is 'progressive', Go to step 19; 5. Is (SADff>=4.5 and SADff<7.0) and (Eq. 13 is true)? If 'yes', the frame is 'progressive', Go to step 19; 6. Is (SADff>=7.0 and SADff<9.6) and (Eq. 14 is true)? If 'yes', the frame is 'interlaced', Go to step 19; 7. Is (SADff>=7.0 and SADff<8.3) and (Eq. 13 is true)? If 'yes', the frame is 'progressive', Go to step 19; 8. Is (SADff>=8.3 and SADff<9.6) and (Eq. 15 is true)? If 'yes', the frame is 'progressive', Go to step 19; 9. Is (SADff>=9.6 and SADff<12.055) ? If 'yes', go to step 12; 10. Is (Eq. 16 true)? If 'yes', the frame is 'interlaced', Go to step 19; 11. Is (Eq. 17 true)? If 'yes', the frame is 'progressive', Go to step 19; 12. Is (SADff>=12.055 and SADff<15.5) ? If 'no', go to step 15; 13. Is (Eq. 18 true)? If 'yes', the frame is 'interlaced', Go to step 19; 14. Is (Eq. 17 true)? If 'yes', the frame is 'progressive', Go to step 19; 15. Is (SADff>=15.5 and SADff<27.7) ? If 'no', go to step 18; 16. Is (Eq. 19 true)? If 'yes', the frame is 'interlaced', Go to step 19; 17. Is (Eq. 20 true)? If 'yes', the frame is 'progressive', Go to step 19; 18. Is (SADff>=22.7) and (Eq. 21 is true)? If 'yes', the frame is 'interlaced', Go to step 19. If 'no' the decision on frame's format is 'uncertain' 19. End of Process.

As discussed, process 1700 and/or method 2, stage 1 as discussed herein may perform comparison tests based on a variety of descriptors such that a determination may be made as to whether a frame is interlaced, progressive, or uncertain. For example, the outcome of stage 1 may be a classification of a frame into progressive, interlaced, or uncertain. Furthermore, stage 1 may handle cases outside of a critical decision zone (e.g., cases that have an extremely high level of progressive/interlaced certainty). The cases in critical decision zone may be determined to be uncertain and may require special handling by stage 2.

Process 1700 provides an example method 2, stage 1, as discussed. Other method 2, stage 1 techniques may be used to determine whether a frame is interlaced, progressive, or uncertain.

Figure 26:
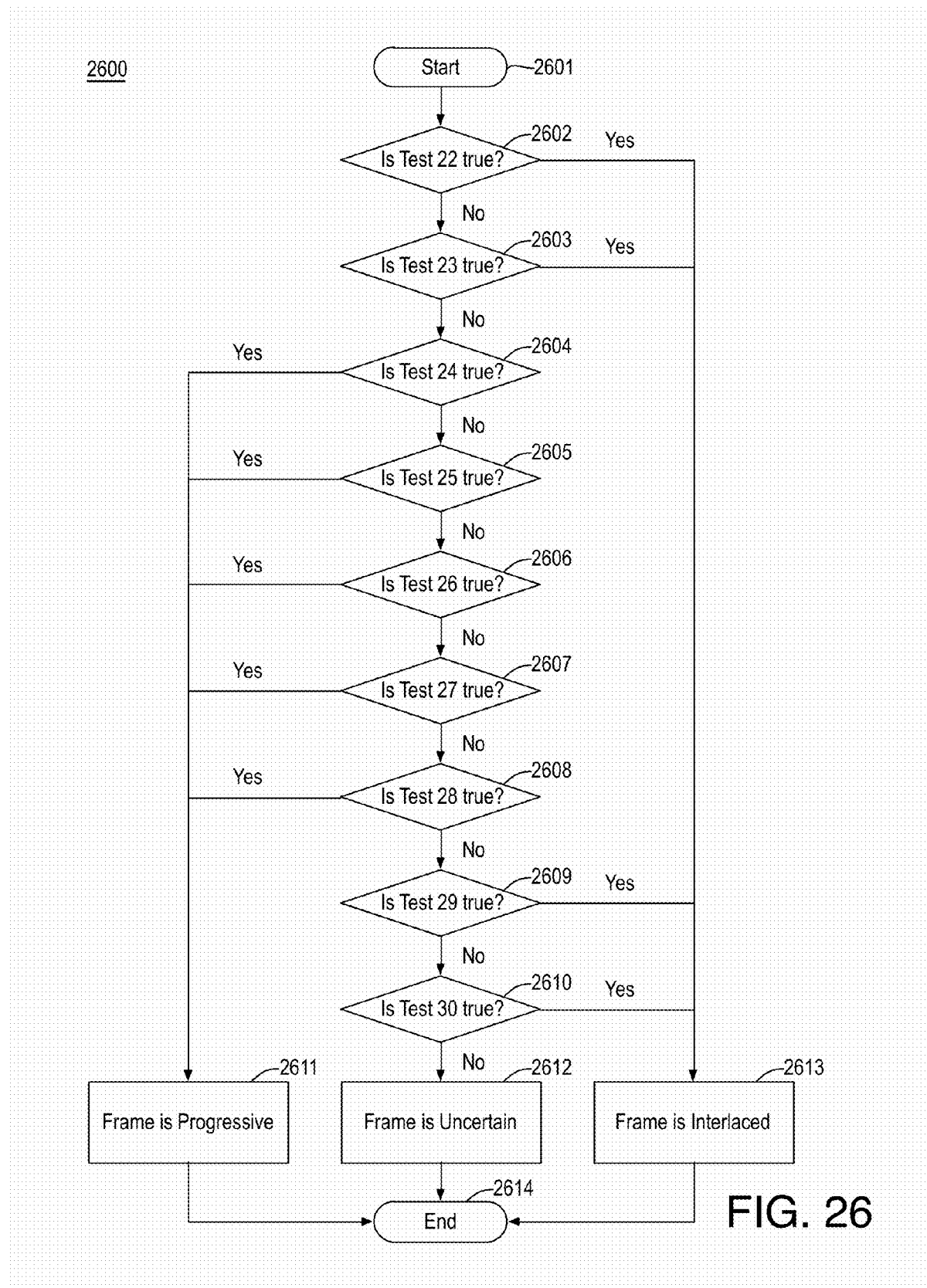
FIG. 26 is a flow diagram illustrating an example process for classifying a frame as interlaced, progressive, or uncertain.

FIG. 26 is a flow diagram illustrating an example process 2600 for classifying a frame as interlaced, progressive, or uncertain, arranged in accordance with at least some implementations of the present disclosure. In some examples, process 2600 or portions thereof may be performed by interlaced/progressive frame classifier 1202 of system 1200 to provide interlaced frame indicator 1203. For example, interlaced/progressive frame classifier 1202 may output intl_frm=1 if a current frame is an interlaced frame and intl_frm=0 if the frame is determined to be progressive. Furthermore, interlaced/progressive frame classifier 1202 may provide no output via process 2600 if a frame is determined to be uncertain. Process 2600 may include one or more operations 2601-2614 as illustrated in FIG. 26. Process 2600 may form at least part of a video preprocess as discussed herein.

For example, the first stage detection (e.g., method 2, stage 1) may be based on descriptors and comparison tests. In an example, this embodiment of method 2, stage 1 may be based on 6 descriptors (e.g., SADff, DynDif, RsF, orient_dyndif, RsDif, and StatDif) combined to form comparison tests. Such tests may be used in process 2600 as is discussed further herein and example tests (e.g., Tests (22)-(30)) are as follows:

$((SADff<1.36)$ and $(DynDif>(11.881*SADff^2)+(5.6928*SADff)+(-0.0382))$
Test (22)

$((SADff>=1.36)$ and $(DynDif>(-1.6659*SADff^2)+(22.971*SADff)+1.6771)$
Test (23)

$((SADff<3.6)$ and $(DynDif<(0.00883*SADff^2)+(-0.0122*SADff)+(0.0536))$
Test (24)

$((SADff<6.4)$ and $(DynDif<(0.2351*SADff^2)+(-1.7131*SADff)+3.2031)$
Test (25)

$((SADff>=6.4)$ and $(DynDif<(0.5894*SADff^2)+(-6.4449*SADff)+18.995)$
Test (26)

$((RsF<5.0)$ and $(orient\_dyndif<(0.0057*RsF^2)+(-0.0291*RsF))+0.0483)$
Test (27)

$((RsF>=5.0)$ and $(orient\_dyndif<(0.0151*RsF^2)+(-0.1426*RsF)+0.3796)$
Test (28)

$((RsDif<6.0)$ and $(StatDif<(0.8089*RsDif^2)+(0.4744*RsDif)+(-0.7448))$
Test (29)

$((RsDif>=6.0)$ and $(StatDif<(0.7032*RsDif^2)+(-4.6914*RsDif)+33.119)$
Test (30)

where descriptors SADff, DynDif, RsF, orient_dyndif, and RsDif may be determined as discussed herein. Furthermore, Tests (22)-(30) illustrate example parameters and comparators, however other parameters and/or comparators may be used. As shown, Equations (11)-(21) may only be based on DynDif and SADff.

As shown, process 2600 may begin from start operation 2601 at decision operation 2602, "Is Test 22 true?", where a determination may be made as to whether Test (22) is true. If so, process 2600 may continue at operation 2613, "Frame is Interlaced", where the current frame may be designated or determined to be interlaced and process 2600 may end at end operation 2614.

If not, process 2600 may continue at decision operation 2603, "Is Test 23 true?", where a determination may be made as to whether Test (23) is true. If so, process 2600 may continue at operation 2613, "Frame is Interlaced", where the current frame may be designated or determined to be interlaced and process 2600 may end at end operation 2614.

If not, process 2600 may continue at decision operation 2604, "Is Test 24 true?", where a determination may be made as to whether Test (24) is true. If so, process 2600 may continue at operation 2611, "Frame is Progressive", where the current frame may be designated or determined to be progressive and process 2600 may end at end operation 2614.

If not, process 2600 may continue at decision operation 2605, "Is Test 25 true?", where a determination may be made as to whether Test (25) is true. If so, process 2600 may continue at operation 2611, "Frame is Progressive", where the current frame may be designated or determined to be progressive and process 2600 may end at end operation 2614.

If not, process 2600 may continue at decision operation 2606, "Is Test 26 true?", where a determination may be made as to whether Test (26) is true. If so, process 2600 may continue at operation 2611, "Frame is Progressive", where the current frame may be designated or determined to be progressive and process 2600 may end at end operation 2614.

If not, process 2600 may continue at decision operation 2607, "Is Test 27 true?", where a determination may be made as to whether Test (27) is true. If so, process 2600 may continue at operation 2611, "Frame is Progressive", where the current frame may be designated or determined to be progressive and process 2600 may end at end operation 2614.

If not, process 2600 may continue at decision operation 2608, "Is Test 28 true?", where a determination may be made as to whether Test (28) is true. If so, process 2600 may continue at operation 2611, "Frame is Progressive", where the current frame may be designated or determined to be progressive and process 2600 may end at end operation 2614.

If not, process 2600 may continue at decision operation 2609, "Is Test 29 true?", where a determination may be made as to whether Test (29) is true. If so, process 2600 may continue at operation 2613, "Frame is Interlaced", where the current frame may be designated or determined to be interlaced and process 2600 may end at end operation 2614.

If not, process 2600 may continue at decision operation 2610, "Is Test 30 true?", where a determination may be made as to whether Test (30) is true. If so, process 2600 may continue at operation 2613, "Frame is Interlaced", where the current frame may be designated or determined to be interlaced and process 2600 may end at end operation 2614.

If not, process 2600 may continue at operation 2612, "Frame is Uncertain", where the current frame may be designated or determined to be uncertain and process 2600 may end at end operation 2614. For example, when the current frame may be designated or determined to be uncertain a second stage of processing may be evoked to classify the current frame.

For example, the operations of process 2600 may be provided as shown in the following Pseudo-Code (4):

```
if ((SADff<1.36) && (DynDif>2)+(5.6928 SADff)+(-
0.0382))
    frame is 'interlaced',
else if ((SADff>=1.36) && (DynDif>2)+(22.971 SADff)+
1.6771)
    frame is 'interlaced',
else if ((SADff<3.6) && (DynDif<2)+(-0.0122 SADff)+
(0.0536))
    frame is 'progressive',
else if ((SADff<6.4) && (DynDif<2)+(-1.7131 SADff)+
3.2031)
    frame is 'progressive',
else if ((SADff>=6.4) && (DynDif<2)+(-6.4449 SADff)+
18.995)
    frame is 'progressive',
else if ((RsF<5.0) && (orient_dyndif 2)+(-0.0291 RsF))+
0.0483)
    frame is 'progressive',
else if ((RsF>=5.0) && (orient_dyndif<2)+(-0.1426 RsF)+
0.3796)
    frame is 'progressive',
else if ((RsDif<6.0) && (StatDif<2)+(0.4744 RsDif)+(-
0.7448))
    frame is 'interlaced',
else if ((RsDif>=6.0) && (StatDif<2)+(-4.6914 RsDif)+
33.119)
    frame is 'interlaced',
else frame is 'uncertain' Pseudo-Code (4)
```

As discussed with respect to operations 1509-1513, in some examples, a classifier method 2 having 2 stages may be applied to designate the current frame as interlaced or progressive. As discussed, the classifier method 1 stage 1 may classify the current frame as interlaced, progressive, or uncertain and, if the frame is classified at stage 1 as uncertain, stage 2 may be applied to determine whether the current frame is interlaced or progressive. For example, stage 2 may use machine learning based on measured data, determined descriptors, and a machine learning algorithm to designate the current frame as interlaced or progressive.

Figure 18:
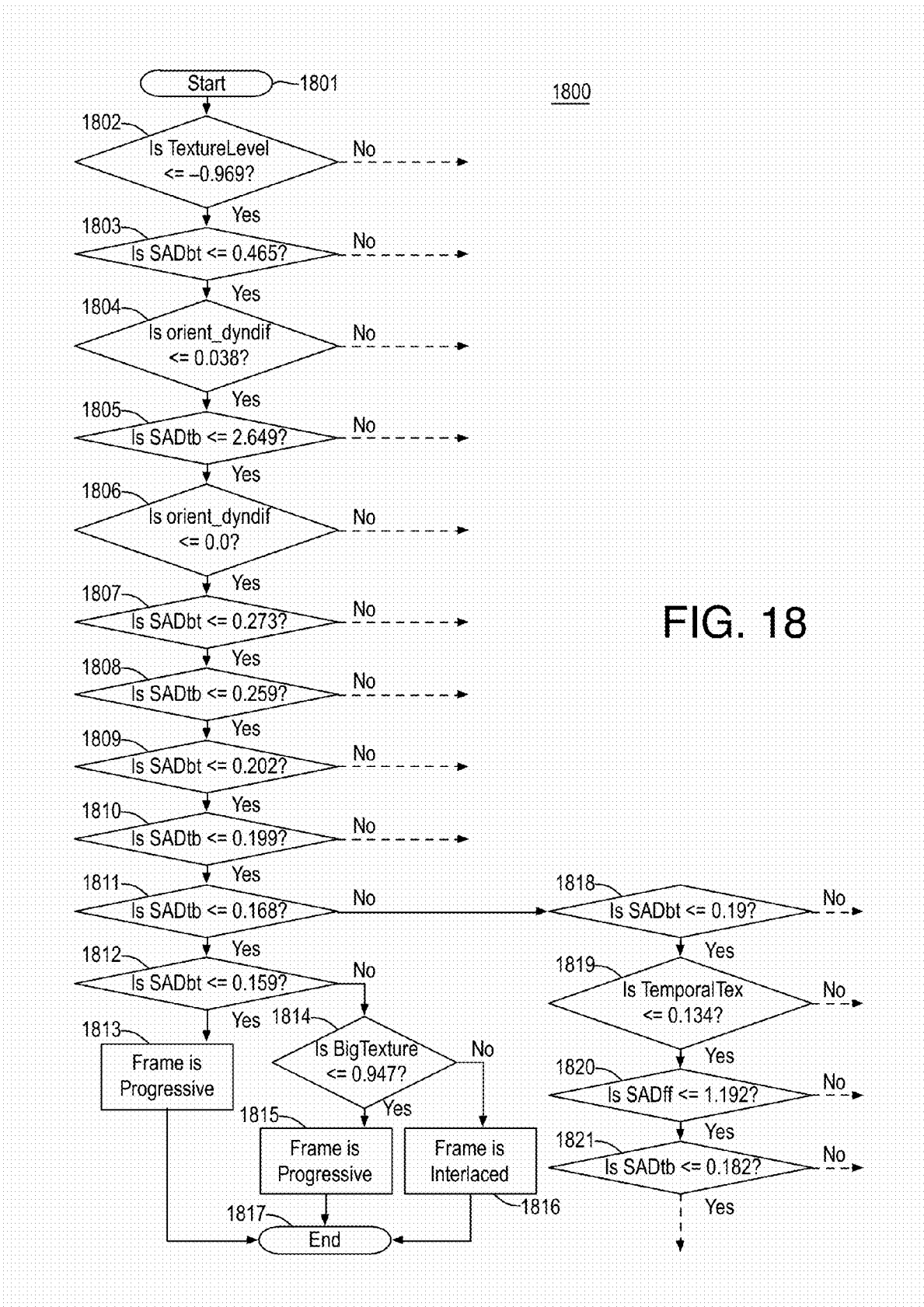
FIG. 18 is a flow diagram illustrating an example process for classifying a frame as interlaced or progressive.

FIG. 18 is a flow diagram illustrating an example process 1800 for classifying a frame as interlaced or progressive, arranged in accordance with at least some implementations of the present disclosure. In some examples, process 1800 or portions thereof may be performed by interlaced/progressive frame classifier 1202 of system 1200 to provide interlaced frame indicator 1203. For example, interlaced/progressive frame classifier 1202 may output intl_frm=1 if a current frame is an interlaced frame and intl_frm=0 if the frame is determined to be progressive. Process 1800 may include one or more operations 1801-1821 and, as discussed many more, as illustrated in FIG. 18. Process 1800 may form at least part of a video preprocess as discussed herein.

For example, method 2, stage 2 may handle cases in the critical decision zone (please refer to FIG. 14), which may be addressed by a method of multivariable space search. For example, the stage may use descriptors as discussed herein. For example, this stage may use 9 descriptors (e.g., SADff, RsG, RsT, RsB, DynDif, StatDif, TemporalTex, BigTexture, TextureLevel) out of the 10 common descriptors as well as 5 additional descriptors (e.g., RsDif, orient_dyndif, ZeroTexture, SADtb, SADbt) discussed earlier. For example, stage 2 may employ a machine learning classifier pre-trained based on a learning set. In some examples, the machine learning classifier may be based on a version of the C4.5 classification tree algorithm such as the J48 Java implementation of the C4.5 classification tree algorithm from Weka as discussed herein. For example, the classifier may be pre-trained using the discussed descriptors. FIG. 18 illustrates only a portion of the flow diagram of the classifier due to the large size of the decision tree. For example, the method 2, stage 2 classification discussed herein may implement a classifier trained using hundreds of thousands of cases to generate a flow diagram having thousands of decision operations.

As shown, process 1800 may begin from start operation 1801 at decision operation 1802, "Is TextureLevel<=-0.969?", where a determination may be made as to whether TextureLevel is less than or equal to -0.969. If not, process 1800 may provide continued processing, which is not shown for the sake of clarity of presentation.

If so, process 1800 may continue at decision operation 1803, "Is SADbt<=0.465?", where a determination may be made as to whether SADbt is less than or equal to 0.465. If not, process 1800 may provide continued processing, which is not shown for the sake of clarity of presentation.

If so, process 1800 may continue at decision operation 1804, "Is orient_dyndif<=0.038?", where a determination may be made as to whether orient_dyndif is less than or equal to 0.038. If not, process 1800 may provide continued processing, which is not shown for the sake of clarity of presentation.

If so, process 1800 may continue at decision operation 1805, "Is SADtb<=2.649?", where a determination may be made as to whether SADtb is less than or equal to 2.649. If not, process 1800 may provide continued processing, which is not shown for the sake of clarity of presentation.

If so, process 1800 may continue at decision operation 1806, "Is orient_dyndif<=0.0?", where a determination may be made as to whether orient_dyndif is less than or equal to 0.0. If not, process 1800 may provide continued processing, which is not shown for the sake of clarity of presentation.

If so, process 1800 may continue at decision operation 1807, "Is SADbt<=0.273?", where a determination may be made as to whether SADbt is less than or equal to 0.273. If not, process 1800 may provide continued processing, which is not shown for the sake of clarity of presentation.

If so, process 1800 may continue at decision operation 1808, "Is SADtb<=0.259?", where a determination may be made as to whether SADtb is less than or equal to 0.259. If not, process 1800 may provide continued processing, which is not shown for the sake of clarity of presentation.

If so, process 1800 may continue at decision operation 1809, "Is SADbt<=0.202?", where a determination may be made as to whether SADbt is less than or equal to 0.202. If not, process 1800 may provide continued processing, which is not shown for the sake of clarity of presentation.

If so, process 1800 may continue at decision operation 1810, "Is SADtb<=0.199?", where a determination may be made as to whether SADtb is less than or equal to 0.199. If not, process 1800 may provide continued processing, which is not shown for the sake of clarity of presentation.

If so, process 1800 may continue at decision operation 1811, "Is SADtb<=0.168?", where a determination may be made as to whether SADtb is less than or equal to 0.168. If so, process 1800 may continue at operation 1812 as is discussed below.

If not, process 1800 may continue at operation 1818, "Is SADbt<=0.19?", where a determination may be made as to whether SADbt is less than or equal to 0.19. If not, process 1800 may provide continued processing, which is not shown for the sake of clarity of presentation. If so, process 1800 may continue at decision operation 1819, "Is TemporalTex<=0.134?", where a determination may be made as to whether TemporalTex is less than or equal to 0.134. If not, process 1800 may provide continued processing, which is not shown for the sake of clarity of presentation. If so, process 1800 may continue at decision operation 1820, "Is SADff<=1.192?", where a determination may be made as to whether SADff is less than or equal to 1.192. If not, process 1800 may provide continued processing, which is not shown for the sake of clarity of presentation. If so, process 1800 may continue at decision operation 1821, "Is SADtb<=0.182?", where a determination may be made as to whether SADtb is less than or equal to 0.182. If not, process 1800 may provide continued processing, which is not shown for the sake of clarity of presentation. If so, process 1800 may provide continued processing, which is not shown for the sake of clarity of presentation.

As discussed process 1800 may continue, when SADtb is less than or equal to 0.168, from decision operation 1811 at decision operation 1812, "Is SADbt<=0.159?", where a determination may be made as to whether SADbt is less than or equal to 0.159. If so, process 1800 may continue at operation 1813, "Frame is Progressive", where the current frame may be designated or determined to be progressive and process 1800 may end at end operation 1817.

If not, process 1800 may continue at decision operation 1814, "Is BigTexture<=0.947?", where a determination may be made as to whether BigTexture is less than or equal to 0.947. If so, so, process 1800 may continue at operation 1815, "Frame is Progressive", where the current frame may be designated or determined to be progressive and process 1800 may end at end operation 1817. If not, 1800 may continue at operation 1816, "Frame is Interlaced", where the current frame may be designated or determined to be interlaced and process 1800 may end at end operation 1817.

As discussed, flow diagram of FIG. 18 first includes a test for TextureLevel<='texture level threshold1' which if true leads to a test if SADbt<='SADbt threshold1' which if true leads to another test if orient_dyndif<'orient_dyndif threshold1' which if true leads to another test if SADtb<='SADtb threshold1' which if true leads to another test if orient_dyndif<'orient_dyndif threshold2' which if true leads to another test if SADbt<='SADbt threshold2' which if true leads to another test if SADtb<='SADtb threshold2', etc till it leads to if SADbt<='SADbt thresholdk' which if true, leads to the conclusion that the frame being examined is 'progressive'. Alternatively if SADbt 'SADbt thresholdk' is false, the flow diagram leads to a test if BigTexture<='BigTexture threshold1' which if true, means that the frame is 'progressive' else, it is 'interlaced'.

Process 1800 provides an illustration of one portion of a method 2, stage 2 classifier. Other branches that result when some of the early tests such as for TextureLevel, or SADbt, or orient_dyndif, or SADtb, are false leading to resulting individual 'trees of tests' that need to be undertaken. For example, the classifier may result in many branches. However, process 1800 may not be computationally intensive. For example, process 1800 may represent only a small portion (e.g., about 16 decision tests) out of several thousand such tests that may be included in the classifier.

Returning briefly to FIG. 12, as discussed, frame group buffer 1204 may store 15 or 16 frames including 5 frames of a current frame group, 5 frames of a previous frame group, 5 frames of a subsequent frame group, and 1 optional control frame. Such frames may be provided or available to frame group telecine pattern/progressive/interlaced classifier 1205. As discussed, frame group telecine pattern/progressive/interlaced classifier 1205 may receive the frame groups as well as their associated frame types (e.g., via intl_frm) and frame group telecine pattern/progressive/interlaced classifier 1205 may generate true interlaced indicator (tru_intl) 1206, progressive indicator (prog_ind) 1207, and telecine type indicator (tel_type) 1208 for frame groups of aggregated input video 1201. Frame group telecine pattern/progressive/interlaced classifier 1205 may generate such indicators using any suitable technique or techniques such as those discussed herein.

Figure 19A:
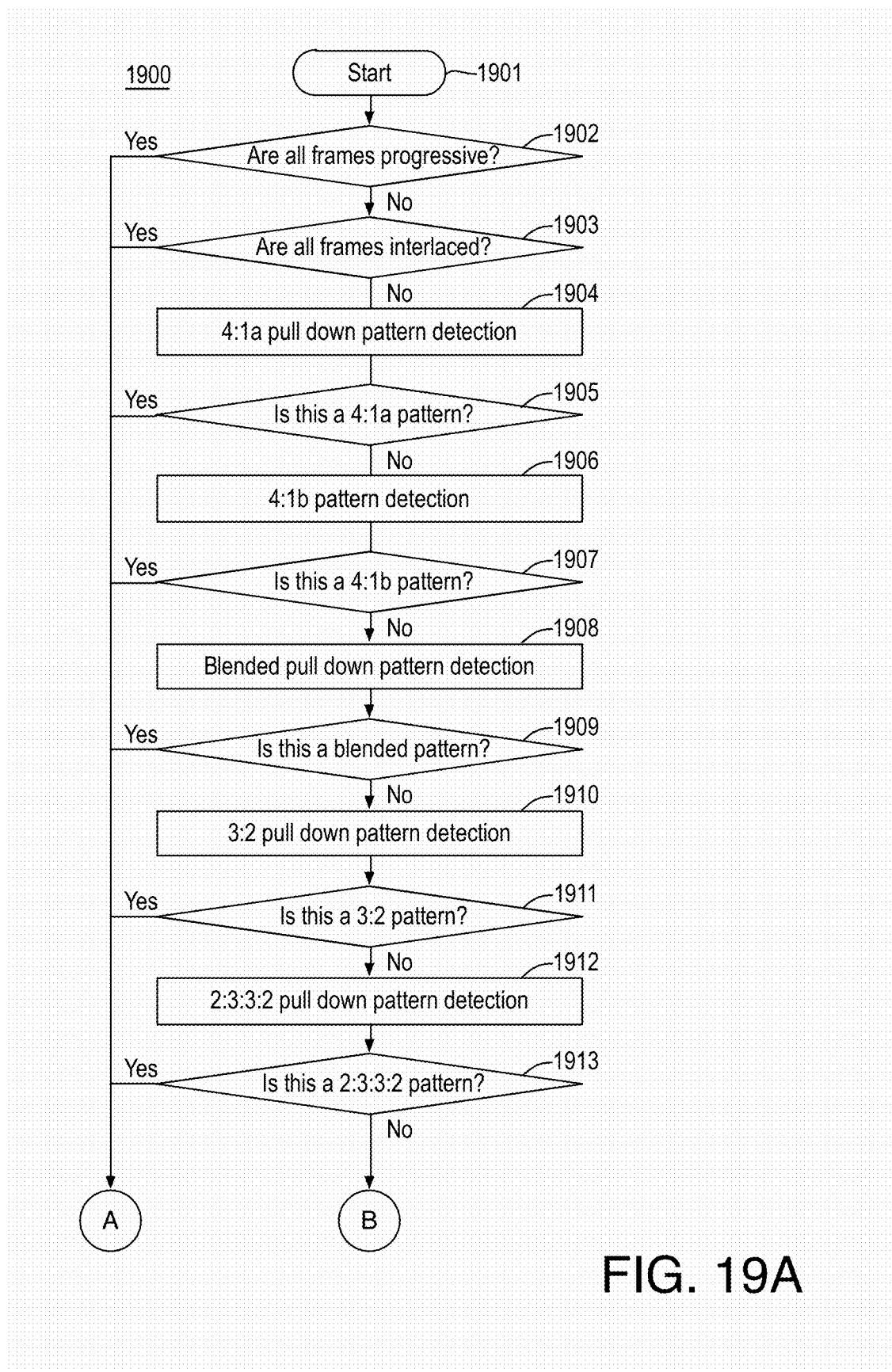
FIGS. 19A and 19B illustrate a flow diagram providing an example process for classifying a frame group.
Figure 19B:
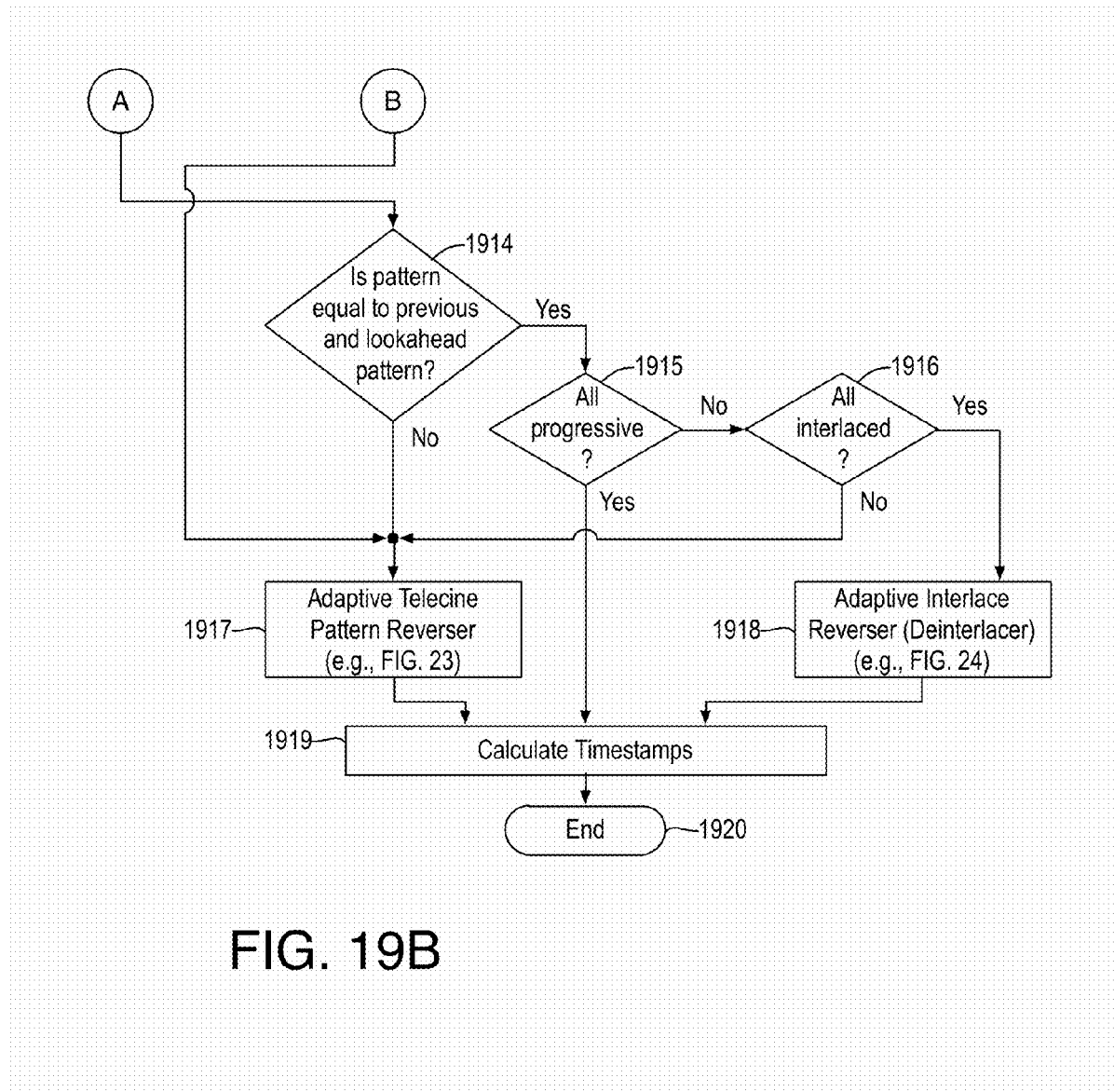

FIGS. 19A and 19B illustrate a flow diagram providing an example process 1900 for classifying a frame group, arranged in accordance with at least some implementations of the present disclosure. In some examples, process 1900 or portions thereof may be performed by frame group telecine pattern/progressive/interlaced classifier 1205 of system 1200 to provide interlaced indicator 1206, progressive indicator 1207, or telecine type indicator (tel_type) 1208 and/or to provide progressive video (e.g., detected progressive video, deinterlaced progressive video, or telecine reversed progressive video. Process 1900 may include one or more operations 1901-1920 as illustrated in FIGS. 19A and 19B. Process 1700 may form at least part of a video preprocess as discussed herein.

As discussed, in process 1900, frames may be analyzed in chunks of 5 frames called frame groups within a buffer of 15 frames which stores 5 past frames (e.g., a past frame group), 5 current frames (e.g., a current frame group), and 5 next frames (e.g. a next frame group) for analysis.

As shown, process 1900 may begin from start operation 1901 at decision operation 1902, "Are all frames progressive", where a determination may be made as to whether all frames of the current frame group are progressive. If so, process 1900 may continue at operation 1914 (please refer to FIG. 19B) as is discussed further herein.

If not, process 1900 may continue at decision operation 1903, "Are all frames interlaced", where a determination may be made as to whether all frames of the current frame group are interlaced. If so, process 1900 may continue at operation 1914 (please refer to FIG. 19B) as is discussed further herein.

If not, process 1900 may continue at operation 1904, "4:1a pull down pattern detection", where 4:1a pull down pattern detection may be performed as is discussed further herein. Process 1900 may continue at decision operation 1905, "Is this a 4:1a pattern?", where a determination may be made as to whether the current frame group has a 4:1a pattern based on the results of operation 1904. If so, process 1900 may continue at operation 1914 (please refer to FIG. 19B) as is discussed further herein.

If not, process 1900 may continue at operation 1906, "4:1b pull down pattern detection", where 4:1b pull down pattern detection may be performed as is discussed further herein. Process 1900 may continue at decision operation 1907, "Is this a 4:1b pattern?", where a determination may be made as to whether the current frame group has a 4:1b pattern based on the results of operation 1906. If so, process 1900 may continue at operation 1914 (please refer to FIG. 19B) as is discussed further herein.

If not, process 1900 may continue at operation 1908, "Blended pull down pattern detection", where blended pull down pattern detection may be performed as is discussed further herein. Process 1900 may continue at decision operation 1909, "Is this a blended pattern?", where a determination may be made as to whether the current frame group has a blended pattern based on the results of operation 1908. If so, process 1900 may continue at operation 1914 (please refer to FIG. 19B) as is discussed further herein.

If not, process 1900 may continue at operation 1910, "3:2 pull down pattern detection", where 3:2 pull down pattern detection may be performed as is discussed further herein.

Process 1900 may continue at decision operation 1911, "Is this a 3:2 pattern?", where a determination may be made as to whether the current frame group has a 3:2 pattern based on the results of operation 1910. If so, process 1900 may continue at operation 1914 (please refer to FIG. 19B) as is discussed further herein.

If not, process 1900 may continue at operation 1912, "2:3: 3:2 pull down pattern detection", where 2:3:3:2 pull down pattern detection may be performed as is discussed further herein. Process 1900 may continue at decision operation 1913, "Is this a 2:3:3:2 pattern?", where a determination may be made as to whether the current frame group has a 2:3:3:2 pattern based on the results of operation 1912. If so, process 1900 may continue at operation 1914 (please refer to FIG. 19B) as is discussed further herein.

If not, turning to FIG. 19B, process 1900 may continue at operation 1917, "Adaptive Telecine Pattern Reverser (e.g., FIG. 23)", as is discussed further herein.

As discussed, process 1900 may continue from any of decision operations 1902, 2903, 1905, 1907, 1909, 1911, or 1913 at decision operation 1914, "Is pattern equal to previous and lookahead pattern?", where a determination may be made as to whether the current frame group has the same pattern as the previous frame group (e.g., the prior frame group) and the lookahead frame group (e.g., the next frame group). For example, the current frame group pattern may be compared to the previous pattern and lookahead pattern.

If they are the same, processing may continue at decision operation 1915, "All progressive?", where a determination may be made as to whether all of the frames of the current frame group are progressive. If so, process 1900 may continue at operation 1919, "Calculate Timestamps", where timestamps may be calculated for the video (e.g., including timing information and/or frame location information). However, no additional processing (e.g., conversion) of the video may be performed as the progressive video format may be desirable for re-encoding or presentment as discussed herein.

If all of the frames are not progressive, process 1900 may continue at decision operation 1916, "All interlaced?", where a determination may be made as to whether all of the frames of the current frame group are interlaced. If so, process 1900 may continue at operation 1918, "Adaptive Interlace Reverser (Deinterlacer) (e.g., FIG. 24)", where the frames may be deinterlaced as is discussed further herein. Processing may continue at operation 1919, "Calculate Timestamps", where timestamps may be calculated for the video (e.g., including timing information and/or frame location information).

If all of the frames are not interlaced, process 1900 may continue at operation 1917 (also as discussed, process 1900 may also continue at operation 1917 from decision operations 1913 or 1914), "Adaptive Telecine Pattern Reverser (e.g., FIG. 23)", where the frames may go through telecine reversal as is discussed further herein. Processing may continue at operation 1919, "Calculate Timestamps", where timestamps may be calculated for the video (e.g., including timing information and/or frame location information). Processing may end at end operation 1920.

As discussed, process 1900 may determine a classification for a frame group. For example, if all 5 frames of the current group of frames are progressive and the previous 5 frames were progressive and next 5 frames are also progressive than the current group of 5 frames is declared to be all progressive and no further processing is required except for calculation and assignment of timestamps to each frame.

Furthermore, if all 5 frames of the current group of frames are interlaced and the previous 5 frames and the next 5 frames are also all interlaced, the current group of frames is determined to be interlaced. In such examples, the current group of frames may be sent to adaptive interlace reverser/deinterlacer (e.g., content adaptive interlace reverser 1211), which may deinterlace the frames for example as illustrated with respect to FIG. 24 (e.g. convert the frames to progressive by deinterlacing) before timestamps may be determined and assigned.

If the current group of frames is not determined to be fully interlaced (e.g., at least one of the frame does not register as interlaced), the group of frames may undergo a series of analysis tests for detection of a telecined pattern in the following order: 4:1a pattern detection, 4:1b pattern detection, blended pattern detection, 3:2 pattern detection, 2:3:3:2 pattern detection. If none of the patterns are found, the pattern is determined to be an unknown or undetectable pattern. While the aforementioned order may provide advantages, the search for the telecine patterns may be done in any order. For the known telecine patterns being tested (e.g., 4:1a, 4:1b, blended, 3:2, and 2:3:3:2), it is advantageous to use the past pattern and future (e.g., lookahead) pattern to confirm the current frame group pattern is same such to increase confidence in the detected pattern. If all of the discussed conditions are true (e.g., it is a known pattern and the known pattern is the same as the previous and next patterns), the current group of frames may be sent to an adaptive telecine pattern reverser (e.g., telecine reverser 1212), which may reverse the telecine pattern for example as illustrated with respect to FIG. 23, which may use the pattern that was detected to undo the pattern.

However, if the current frame group is not composed of all progressive frames or all interlaced frames, or is detected as an unknown telecine pattern, or if it does not match previous and/or next patterns, the current frame group is sent to the adaptive telecine pattern reverser (e.g., telecine reverser 1212), which may correct (in some examples, slightly correct) the pattern for editing errors and again determine if there is a pattern. If no pattern is detected, the adaptive telecine pattern may deinterlace individual problematic frames. As discussed, if the existence of a pattern is confirmed, the pattern can be reversed and frames output. In any event, timestamps may be calculated and assigned to frames at the output of the adaptive telecine pattern reverser.

As discussed with respect to operations 1904 and 1905, a 4:1a pull down pattern may be detected for a current frame group. The 4:1a pull down pattern may be detected using any suitable technique or techniques. As discussed earlier with respect to FIG. 27A, the 4:1a pull down pattern may be formed as a group of 4 original frames (e.g., which can be thought of as 8 fields) followed by repeat of the last frame (e.g., two fields) of the group of 4 frames. To detect a 4:1a pull down pattern, 6 frames may be examined to determine the pattern occurs inside a 5 frame cadence. For example, the average SAD value of the current top field against the previous top field (e.g., SADtf) and the average SAD value of the current bottom field against the previous bottom field (e.g., SADbf) may be determined. If the value is very small for both field comparisons (e.g., less than 0.001), then orient_dyndif is determined for the current frame. If orient_dyndif is very small (e.g., less than 0.001) and if previous and subsequent frames have a larger orient_dyndif as compared to the current frame, if all other frames have an average SAD greater than 0.001 and orient_dyndif greater than 0.001, then the pattern may be found. Such a process is shown in Pseudo-Code (5):

```
for (i=0; i<6; i++)
{
    if((SADtf[i]<0.001)    &&    (SADbf[i]<0.001)    &&
(orient_dyndif [i]<0.001) &&
```

(orient_dyndif [i]<orient_dyndif [i−1]) && // Note-only for i>0
(orient_dyndif [i]<orient_dyndif [i+1]))
}
position=i;
countDrop++;
}
if(((SADtf[i]>=0.001)||(SaDbf[i]>=0.001)) && (orient_dyndif [i]>=0.001))
    countStay++;
} Pseudo-Code (5)

Furthermore, a check may be performed as to whether a repeated frame occurs only once in the buffer as shown in Pseudo-Code (6):
if((countDrop==1) && (countStay==5))
    // Note—if this is true, the pattern has been found Pseudo-Code (6)

As discussed with respect to operations 1906 and 1907, a 4:1b pull down pattern may be detected for a current frame group. The 4:1b pull down pattern may be detected using any suitable technique or techniques. As discussed earlier with respect to FIG. 28A, the 4:1b pull down pattern may be formed as a group of an original frame (e.g., which be thought of as 2 fields) followed by 4 interlaced frames (e.g., formed from alternating fields of consecutive original frames). The sequence of fields is as follows: . . . d0 a1] [a0 a1, a0 b1, b0 c1, c0 d1, d0 a1]] [a0 a1, a0 b1, b0 c1, c0 d1, d0 a1] [a0 a1, . . . .

In such examples, 5 frames may be evaluated examined but first four or five frames may be detected as interlaced and then the following conditions as shown in Pseudo-Code (7) may be tested:
for(i=0; i<5; i++) // Note—if i=0, all conditions for i−1 are not considered.
{
    if((SADff[i]<SADtf[i]) && (SADff[i]<SADbf[i]) && (RsF[i]<RsF[i−1]) &&
    (RsF[i]<RsF[i+1]) && (StatDif[i]*3<StatDif [i−1]) && (StatDif[i]*3<StatDif [i+1]) && (DynDif[i]*3<DynDif [i−1]) &&
    (DynDif[i]*3<DynDif [i+1]))
    }
    position=i;
    countDrop++;
    }
    else
        countStay++;
}
if((countDrop==1) && (countStay==4))
    // Note—if this is true, the pattern has been found Pseudo-Code (6)

As discussed with respect to operations 1910 and 1911 (please refer to FIG. 19A), a 3:2 pull down pattern may be detected for a current frame group. The 3:2 pull down pattern may be detected using any suitable technique or techniques. In some examples, a difficulty in detecting the 3:2 pattern is that of partial 3:2 patterns. For example, a specific frame group may not be aligned with the 3:2 pattern, such that the 3:2 pattern may be offset with respect to start of the frame group. Such partial patterns may occur for many reasons including, for example, editing. In some examples, to accurately analyze frames for detection of 3:2 pattern, a number of frames may be buffered to a frame buffer such that F[x] refers to the frame located in position x in the buffer for which the analysis is being done (e.g., F[x] may be a current frame). In such 3:2 pattern detection a number of scenarios may be evaluated based on evaluation tests to determine if a 3:2 pattern (e.g., a partial or offset 3:2 pattern) is present.

For example, in a first scenario of 3:2 pattern detection, an evaluation test may determine whether first and last frames in a current buffer have a partial pattern. The evaluation test for the first scenario may be performed according to the following Test (31):
test[0]=((DynDif(F[0])>DynDif(F[1])) and (DynDif(F[0])>DynDif(F[2])) and (DynDif(F[0])>DynDif(F[3]))) or (F[0]=='interlaced')
test[1]=((DynDif(F[4])>DynDif(F[1])) and (DynDif(F[4])>DynDif(F[2])) and (DynDif(F[4])>DynDif(F[3]))) or (F[4]=='interlaced')
test[2]=((DynDif(F[5])>DynDif(F[1])) and (DynDif(F[5])>DynDif(F[2])) and (DynDif(F[5])>DynDif(F[3]))) or (F[5]=='interlaced')
test[3]=(SADff(F[0]))>min(SADtb(F[0]), SADbt(F[0]))
test[4]=(SADff(F[4]))>min(SADtb(F[4]), SADbt(F[4]))
test[5]=(SADff(F[5]))>min(SADtb(F[5]), SADbt(F[5]))
Test (31)
such that if all of test[0], test[1], test[2], test[3], test[4], and Test[5] of Test (31) are true, then a 3:2 pull down pattern is considered to have been detected. As discussed herein, if the result of the previous group of frames was also true (e.g., a 3:2 pull down pattern was detected) and/or the subsequent group of frames is also true (e.g., a 3:2 pull down pattern was detected), the current pattern may be designated or determined to be a 3:2 pull down pattern.

For example, in a second scenario of 3:2 pattern detection, an evaluation test may determine whether first and second frames in a current buffer have a partial pattern. The evaluation test for the second scenario may be performed according to the following Test (32):
test[0]=((DynDif(F[0])>DynDif(F[2])) and (DynDif(F[0])>DynDif(F[3])) and (DynDif(F[0])>DynDif(F[4]))) or (F[0]=='interlaced')
test[1]=((DynDif(F[1])>DynDif(F[2])) and (DynDif(F[1])>DynDif(F[3])) and (DynDif(F[1])>DynDif(F[4]))) or (F[1]=='interlaced')
test[2]=((DynDif(F[5])>DynDif(F[2])) and (DynDif(F[5])>DynDif(F[3])) and (DynDif(F[5])>DynDif(F[4]))) or (F[5]=='interlaced')
test[3]=(SADff(F[0]))>min(SADtb(F[0]), SADbt(F[0]))
test[4]=(SADff(F[1]))>min(SADtb(F[1]), SADbt(F[1]))
test[5]=(SADff(F[5]))>min(SADtb(F[5]), SADbt(F[5]))
Test (32)
such that if all of test[0], test[1], test[2], test[3], test[4], and Test[5] of Test (32) are true, then a 3:2 pull down pattern is considered to have been detected. As discussed herein, if the result of the previous group of frames was also true (e.g., a 3:2 pull down pattern was detected) and/or the subsequent group of frames is also true (e.g., a 3:2 pull down pattern was detected), the current pattern may be designated or determined to be a 3:2 pull down pattern.

For example, in a third scenario of 3:2 pattern detection, an evaluation test may determine whether second and third frames in a current buffer have a partial pattern. The evaluation test for the second scenario may be performed according to the following Test (33):
test[0]=((DynDif(F[1])>DynDif(F[0])) and (DynDif(F[1])>(DynDif(F[3])) and (DynDif(F[1])>DynDif(F[4]))) or (F[1]=='interlaced')
test[1]=((DynDif(F[2])>DynDif(F[0])) and (DynDif(F[2])>(DynDif(F[3])) and (DynDif(F[2])>DynDif(F[4]))) or (F[2]=='interlaced')
test[2]=(SADff(F[1]))>min(SADtb(F[1]), SADbt(F[1]))
test[3]=(SADff(F[2]))>min(SADtb(F[2]), SADbt(F[2]))

Test (33)

such that if all of test[0], test[1], test[2], and test[3] of Test (33) are true, then a 3:2 pull down pattern is considered to have been detected. As discussed herein, if the result of the previous group of frames was also true (e.g., a 3:2 pull down pattern was detected) and/or the subsequent group of frames is also true (e.g., a 3:2 pull down pattern was detected), the current pattern may be designated or determined to be a 3:2 pull down pattern.

For example, in a fourth scenario of 3:2 pattern detection, an evaluation test may determine whether third and fourth frames in a current buffer have a partial pattern. The evaluation test for the second scenario may be performed according to the following Test (34):

test[0]=((DynDif(F[2])>DynDif(F[0])) and (DynDif(F[2])>DynDif(F[1])) and (DynDif(F[2])>DynDif(F[4]))) or (F[2]=='interlaced')

test[1]=((DynDif(F[3])>DynDif(F[0])) and (DynDif(F[3])>DynDif(F[1])) and (DynDif(F[3])>DynDif(F[4]))) or (F[3]=='interlaced')

test[2]=(SADff(F[2]))>min(SADtb(F[2]), SADbt(F[2]))

test[3]=(SADff(F[3]))>min(SADtb(F[3]), SADbt(F[3]))

Test (34)

such that if all of test[0], test[1], test[2], and test[3] of Test (34) are true, then a 3:2 pull down pattern is considered to have been detected. As discussed herein, if the result of the previous group of frames was also true (e.g., a 3:2 pull down pattern was detected) and/or the subsequent group of frames is also true (e.g., a 3:2 pull down pattern was detected), the current pattern may be designated or determined to be a 3:2 pull down pattern.

For example, in a fifth scenario of 3:2 pattern detection, an evaluation test may determine whether fourth and fifth frames in a current buffer have a partial pattern. The evaluation test for the second scenario may be performed according to the following Test (35):

test[0]=((DynDif(F[3])>DynDif(F[0])) and (DynDif(F[3])>DynDif(F[1])) and (DynDif(F[3])>DynDif(F[2]))) or (F[3]=='interlaced')

test[1]=((DynDif(F[4])>DynDif(F[0])) and (DynDif(F[4])>DynDif(F[1])) and (DynDif(F[4])>DynDif(F[2]))) or (F[4]=='interlaced')

test[2]=(SADff(F[3]))>min(SADtb(F[3]), SADbt(F[3]))

test[3]=(SADff(F[4]))>min(SADtb(F[4]), SADbt(F[4]))

Test (35)

such that if all of test[0], test[1], test[2], and test[3] of Test (35) are true, then a 3:2 pull down pattern is considered to have been detected. As discussed herein, if the result of the previous group of frames was also true (e.g., a 3:2 pull down pattern was detected) and/or the subsequent group of frames is also true (e.g., a 3:2 pull down pattern was detected), the current pattern may be designated or determined to be a 3:2 pull down pattern.

For example, the evaluation tests discussed with respect to scenarios one through five may determine whether adjacent frames have a partial pattern such that the fields of those adjacent frame are not originally of the same frame (e.g., the frames comprise fields b0,c1 and c0,d1, respectively, please refer to FIGS. 3A and 3B). Such a 3:2 telecine pattern may be reversed via telecine reverser 1212 as discussed herein with respect to FIG. 3B. For example, the pertinent (e.g., previously repeated) fields may be removed, the fields may be ordered (e.g. via swapping frames c1,c0 or the like), and the fields may be combined to generate progressive video (e.g., 24 frames per second progressive video).

Figure 20:
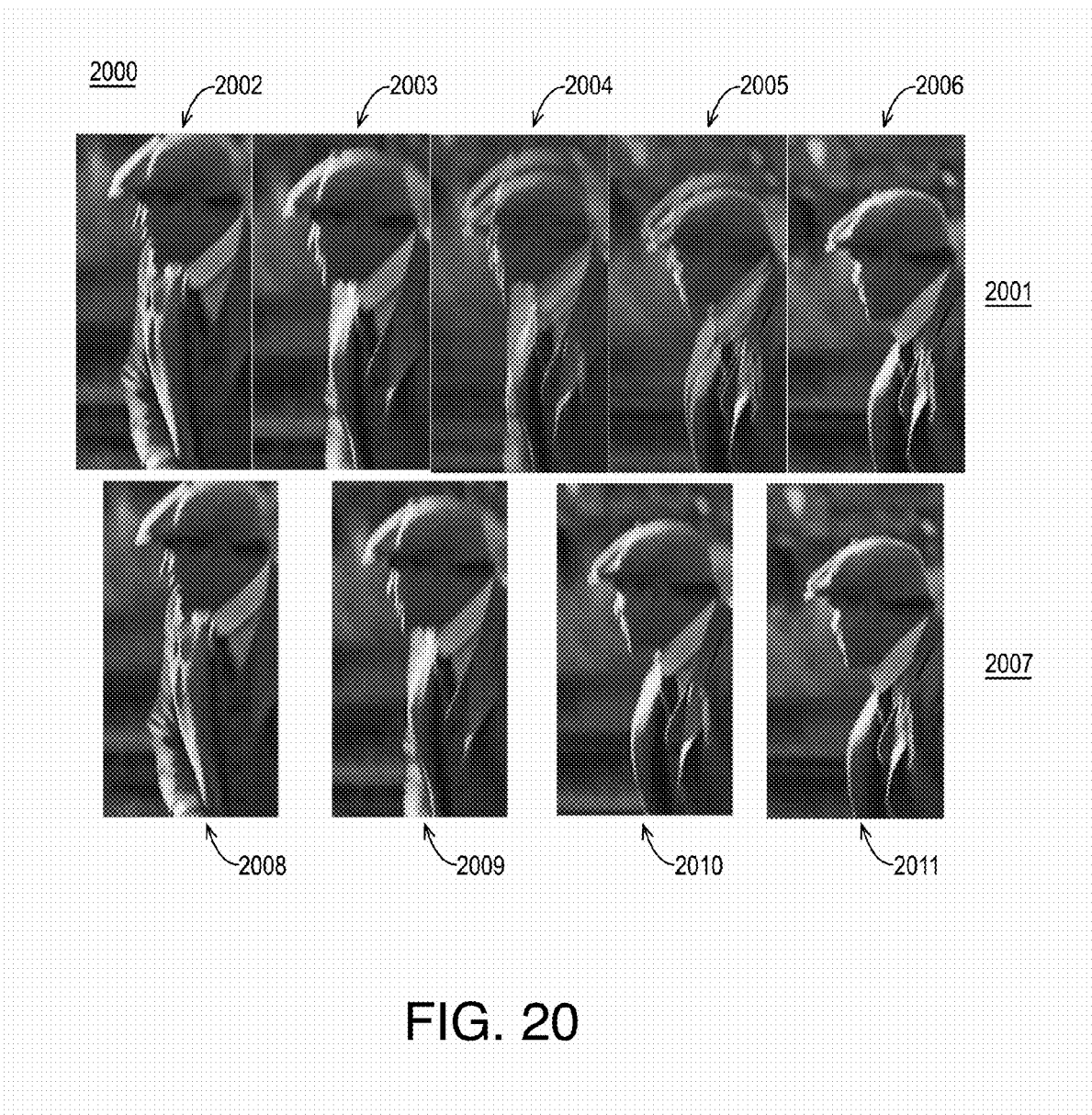
FIG. 20 illustrates example frames before and after a detelecine process.

FIG. 20 illustrates example frames 2000 before and after a detelecine process, arranged in accordance with at least some implementations of the present disclosure. As shown in FIG. 20, frames 2000 may include 3:2 telecine pattern frames 2001 including true interlaced frames 2002, 2003, 2006 and fake interlaced frames 2004 and 2005. In the example of FIG. 20, 3:2 telecine pattern frames 2001 may illustrate fields combined to form frames as discussed herein. For example, true interlaced frames 2002, 2003, 2006 may be combined (or recombined) to form true progressive frames that were only separated to form interlaced fields in the interlaced video. Fake interlaced frames 2004 and 2005 on the other hand may each be a combination of fields originally from different progressive frames. For example, a field may have been copied and inserted and the order of field may have been swapped to maintain an alternating field pattern (e.g., bottom-top-bottom-top and so on). Referring to FIG. 3A, fake interlaced frame 2004 may be associated with the frame including fields b0,c1 (e.g. fields from different frames) and fake interlaced frame 2005 may be associated with the frame including fields c0,d1 (e.g. again fields from different frames). As shown, such fake interlaced frames 2004, 2005 may have severe visual artifacts.

Frames 2000 also include deinterlaced progressive frames 2007 including frames 2008-2011. As shown, subsequent to the deinterlacing process discussed herein (e.g., 3:2 telecine pattern detection and reversal), 2 fields may be dropped and the fields may be combined to form 4 frames 2008-2011 of progressive video. For example, referring to FIG. 3B, frame 2008 may be a combination of fields a0,a1, frame 2009 may be a combination of fields b0,b1, frame 2010 may be a combination of fields c0,c1, frame 2011 may be a combination of fields d0,d1. As shown, using the discussed techniques, progressive frames 2007 may be generated free of visual artifacts. Such progressive frames 2007 may be suitable for presentment to a user or for re-encoding via a codec having high efficiency for progressive video as discussed herein.

In the example of FIG. 20, the top row of frames (e.g., 3:2 telecine pattern frames 2001) may have a frame rate of 30 frames per second and the bottom row of frames (e.g., deinterlaced progressive frames 2007) may have a frame rate of 24 frames per second.

As discussed with respect to operations 1912 and 1913 (please refer to FIG. 19A), a 2:3:3:2 pull down pattern may be detected for a current frame group. The 2:3:3:2 pull down pattern may be detected using any suitable technique or techniques. In some examples, a difficulty in detecting the 2:3:3:2 pattern is that of partial 2:3:3:2 patterns. For example, a specific frame group may not be aligned with the 2:3:3:2 pattern, such that the 2:3:3:2 pattern may be offset with respect to start of the frame group. Such partial patterns may occur for many reasons including, for example, editing. In some examples, to accurately analyze frames for detection of 3:2 pattern, a number of frames may be buffered to a frame buffer such that F[x] refers to the frame located in position x in the buffer for which the analysis is being done (e.g., F[x] may be a current frame). In such 2:3:3:2 pattern detection a number of scenarios may be evaluated based on evaluation tests to determine if a 2:3:3:2 pattern (e.g., a partial or offset 2:3:3:2 pattern) is present.

For example, in a first scenario of 2:3:3:2 pattern detection, an evaluation test may determine whether a first frame in a current buffer has a partial pattern. The evaluation test for the first scenario may be performed according to the following Test (36):

test[0]=((DynDif(F[0])>DynDif(F[1])) and (DynDif(F[0])>DynDif(F[2])) and (DynDif(F[0])>DynDif(F[3])) and (DynDif(F[0])>DynDif(F[4]))) or (F[0]=='interlaced')

test[1]=((DynDif(F[5])>(DynDif(F[1])) and (DynDif(F[5])>DynDif(F[2])) and (DynDif(F[5])>DynDif(F[3])) and (DynDif(F[5])>(DynDif(F[4]))) or (F[5]=='interlaced')

test[2]=(SADff(F[0]))>min(SADtb(F[0]), SADbt(F[0]))

test[3]=(SADff(F[5]))>min(SADtb(F[5]), SADbt(F[5]))

Test (36)

such that if all of test[0], test[1], test[2], and test[3] of Test (36) are true, then a 2:3:3:2 pull down pattern is considered to have been detected. As discussed herein, if the result of the previous group of frames was also true (e.g., a 2:3:3:2 pull down pattern was detected) and/or the subsequent group of frames is also true (e.g., a 2:3:3:2 pull down pattern was detected), the current pattern may be designated or determined to be a 2:3:3:2 pull down pattern.

For example, in a second scenario of 2:3:3:2 pattern detection, an evaluation test may determine whether a second frame in a current buffer has a partial pattern. The evaluation test for the first scenario may be performed according to the following Test (37):

test[0]=((DynDif(F[1])>DynDif(F[0])) and (DynDif(F[1])>DynDif(F[2])) and (DynDif(F[1])>DynDif(F[3])) and (DynDif(F[1])>DynDif(F[4]))) or (F[1]=='interlaced')

test[1]=(SADff(F[1]))>min(SADtb(F[1]), SADbt(F[1]))

test[2]=((SADtf(F[1])<SADbf(F[1])) and (SADbf(F[2])<SADtf(F[2]))) or ((SADtf(F[2])<SADbf(F[2])) and (SADbf(F[1])<SADtf(F[1])))

Test (37)

such that if all of test[0], test[1], and test[2] of Test (37) are true, then a 2:3:3:2 pull down pattern is considered to have been detected. As discussed herein, if the result of the previous group of frames was also true (e.g., a 2:3:3:2 pull down pattern was detected) and/or the subsequent group of frames is also true (e.g., a 2:3:3:2 pull down pattern was detected), the current pattern may be designated or determined to be a 2:3:3:2 pull down pattern.

For example, in a third scenario of 2:3:3:2 pattern detection, an evaluation test may determine whether a third frame in a current buffer has a partial pattern. The evaluation test for the first scenario may be performed according to the following Test (38):

test[0]=((DynDif(F[2])>DynDif(F[0])) and (DynDif(F[2])>DynDif(F[1])) and (DynDif(F[2])>DynDif(F[3])) and (DynDif(F[2])>DynDif(F[4]))) or (F[2]=='interlaced')

test[1]=(SADff(F[2]))>min(SADtb(F[2]), SADbt(F[2]))

test[2]=((SADtf(F[2])<SADbf(F[2])) and (SADbf(F[3])<SADtf(F[3]))) or ((SADtf(F[3])<SADbf(F[3])) and (SADbf(F[2])<SADtf(F[2])))

Test (38)

such that if all of test[0], test[1], and test[2] of Test (38) are true, then a 2:3:3:2 pull down pattern is considered to have been detected. As discussed herein, if the result of the previous group of frames was also true (e.g., a 2:3:3:2 pull down pattern was detected) and/or the subsequent group of frames is also true (e.g., a 2:3:3:2 pull down pattern was detected), the current pattern may be designated or determined to be a 2:3:3:2 pull down pattern.

For example, in a fourth scenario of 2:3:3:2 pattern detection, an evaluation test may determine whether a third frame in a current buffer has a partial pattern. The evaluation test for the first scenario may be performed according to the following Test (39):

test[0]=((DynDif(F[3])>DynDif(F[0])) and (DynDif(F[3])>DynDif(F[1])) and (DynDif(F[3])>DynDif(F[2])) and (DynDif(F[3])>DynDif(F[4]))) or (F[3]==interlaced)

test[1]=(SADff(F[3]))>min(SADtb(F[3]), SADbt(F[3]))

test[2]=((SADtf(F[3])<SADbf(F[3])) and (SADbf(F[4])<SADtf(F[4]))) or ((SADtf(F[4])<SADbf(F[4])) and (SADbf(F[3])<SADtf(F[3])))

Test (39)

such that if all of test[0], test[1], and test[2] of Test (39) are true, then a 2:3:3:2 pull down pattern is considered to have been detected. As discussed herein, if the result of the previous group of frames was also true (e.g., a 2:3:3:2 pull down pattern was detected) and/or the subsequent group of frames is also true (e.g., a 2:3:3:2 pull down pattern was detected), the current pattern may be designated or determined to be a 2:3:3:2 pull down pattern.

For example, in a fifth scenario of 2:3:3:2 pattern detection, an evaluation test may determine whether a third frame in a current buffer has a partial pattern. The evaluation test for the first scenario may be performed according to the following Test (40):

test[0]=((DynDif(F[4])>DynDif(F[0])) and (DynDif(F[4])>DynDif(F[1])) and (DynDif(F[4])>DynDif(F[2])) and (DynDif(F[4])>DynDif(F[3]))) or (F[4]==interlaced)

test[1]=(SADff(F[4]))>min(SADtb(F[4]), SADbt(F[4]))

test[2]=((SADtf(F[4])<SADbf(F[4])) and (SADbf(F[5])<SADtf(F[5]))) or ((SADtf(F[5])<SADbf(F[5])) and (SADbf(F[4])<SADtf(F[4])))

Test (40)

such that if all of test[0], test[1], and test[2] of Test (40) are true, then a 2:3:3:2 pull down pattern is considered to have been detected. As discussed herein, if the result of the previous group of frames was also true (e.g., a 2:3:3:2 pull down pattern was detected) and/or the subsequent group of frames is also true (e.g., a 2:3:3:2 pull down pattern was detected), the current pattern may be designated or determined to be a 2:3:3:2 pull down pattern.

For example, the evaluation tests discussed with respect to scenarios one through five of 2:3:3:2 pattern detection may determine whether a frame of a group of frames has a partial pattern such that the fields of the frame are not originally of the same frame (e.g., the frame includes fields b0,c1, please refer to FIGS. 4A and 4B). Such a 2:3:3:2 telecine pattern may be reversed via telecine reverser 1212 as discussed herein with respect to FIG. 4B. For example, the pertinent (e.g., previously repeated) fields may be removed and the fields may be combined to generate progressive video (e.g., 24 frames per second progressive video).

Figure 21:
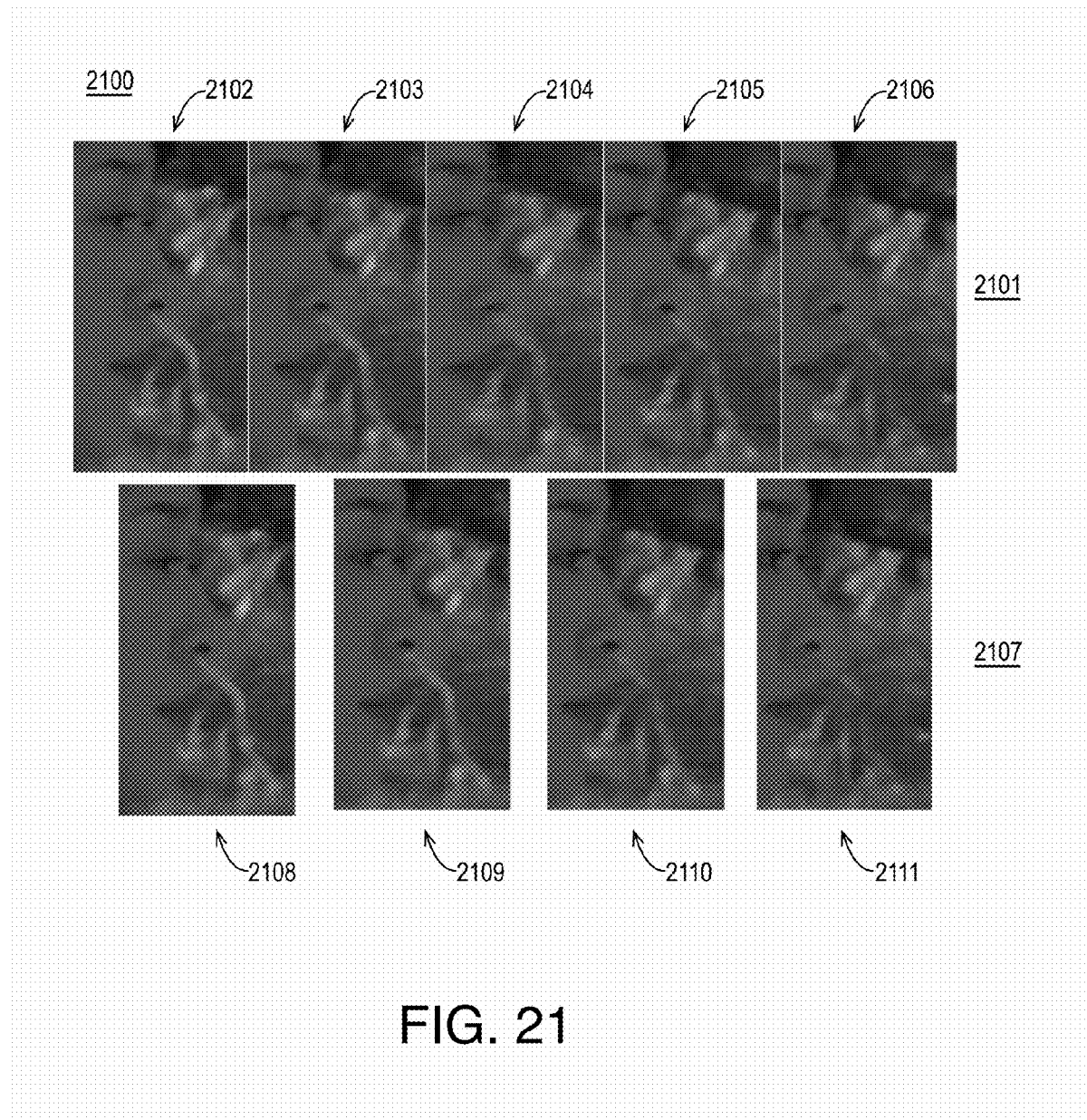
FIG. 21 illustrates example frames before and after a detelecine process.

FIG. 21 illustrates example frames 2100 before and after a detelecine process, arranged in accordance with at least some implementations of the present disclosure. As shown in FIG. 21, frames 2100 may include 2:3:3:2 telecine pattern frames 2101 including true interlaced frames 2102, 2103, 2105, 2106 and fake interlaced frame 2104. In the example of FIG. 21, 2:3:3:2 telecine pattern frames 2101 may illustrate fields combined to form frames as discussed herein. For example, true interlaced frames 2102, 2103, 2105, 2106 may be combined (or recombined) to form true progressive frames that were only separated to form interlaced fields in the interlaced video. Fake interlaced frame 2104 on the other hand may be a combination of fields originally from different progressive frames. For example, fields may have been copied and inserted in a manner to maintain an alternating field pattern (e.g., bottom-top-bottom-top and so on). Referring to FIG. 4A, fake interlaced frame 2104 may be associated with the frame including fields b0,c1 (e.g. fields from different frames). As shown, fake interlaced frame 2104 may have severe visual artifacts.

Frames 2100 also include deinterlaced progressive frames 2107 including frames 2108-2111. As shown, subsequent to the deinterlacing process discussed herein (e.g., 2:3:3:2 telecine pattern detection and reversal), 2 fields may be dropped and the fields may be combined to form 4 frames 2108-2111 of progressive video. For example, referring to FIG. 4B, frame 2108 may be a combination of fields a0,a1, frame 2109 may be a combination of fields b0,b1, frame 2110 may be a combination of fields c0,c1, frame 2111 may be a combination of fields d0,d1. As shown, using the discussed techniques, progressive frames 2107 may be generated free of visual artifacts. Such progressive frames 2107 may be suitable for presentment to a user or for re-encoding via a codec having high efficiency for progressive video as discussed herein.

In the example of FIG. 21, the top row of frames (e.g., 2:3:3:2 telecine pattern frames 2101) may have a frame rate of 30 frames per second and the bottom row of frames (e.g., deinterlaced progressive frames 2107) may have a frame rate of 24 frames per second.

As discussed with respect to operations 1908 and 1909 (please refer to FIG. 19A), a blended pull down pattern may be detected for a current frame group. The blended pull down pattern may be detected using any suitable technique or techniques. In some examples, a difficulty in detecting the blended pattern is that of partial blended patterns. For example, a specific frame group may not be aligned with the blended pattern, such that the blended pattern may be offset with respect to start of the frame group. Such partial patterns may occur for many reasons including, for example, editing. In some examples, to accurately analyze frames for detection of blended pattern, a number of frames may be buffered to a frame buffer such that F[x] refers to the frame located in position x in the buffer for which the analysis is being done (e.g., F[x] may be a current frame). In such blended pattern detection a number of scenarios may be evaluated based on evaluation tests to determine if a blended pattern (e.g., a partial or offset blended pattern) is present.

For example, in a blended pattern detection, an evaluation test may determine whether a current buffer has a blended pattern such as a 3:2 blended pull down pattern. The evaluation test for the first scenario may be performed according to the following Test (41):

test[0]=((StatDif(F[0])+2)<StatDif(F[1])) && ((StatDif(F[0])+2)<StatDif(F[2])) && ((StatDif(F[0])+2)<StatDif(F[3])) && ((StatDif(F[0])+2)<StatDif(F[4])) && (StatDif(F[0])<PicSize/C)

test[1]=((StatDif(F[4])+2)<StatDif(F[0])) && ((StatDif(F[4])+2)<StatDif(F[1])) && ((StatDif(F[4])+2)<StatDif(F[2])) && ((StatDif(F[4])+2)<StatDif(F[3])) && (StatDif(F[4])<PicSize/C)

Test (41)

where, PicSize=pic_width×pic_height, and, typically constant C=20736 and such that if all of test[0] and test[1] of Test (41) are true, then a 3:2 blended pull down pattern is considered to have been detected. As discussed herein, if the result of the previous group of frames was also true (e.g., a 3:2 blended pull down pattern was detected) and/or the subsequent group of frames is also true (e.g., a 3:2 blended pull down pattern was detected), the current pattern may be designated or determined to be a 3:2 blended pull down pattern.

For example, the evaluation tests discussed with respect to Test (41) may determine whether a group of frames has a 3:2 blended pattern. Such a 2:3:3:2 telecine pattern may be reversed via telecine reverser 1212 as discussed herein.

Figure 22:
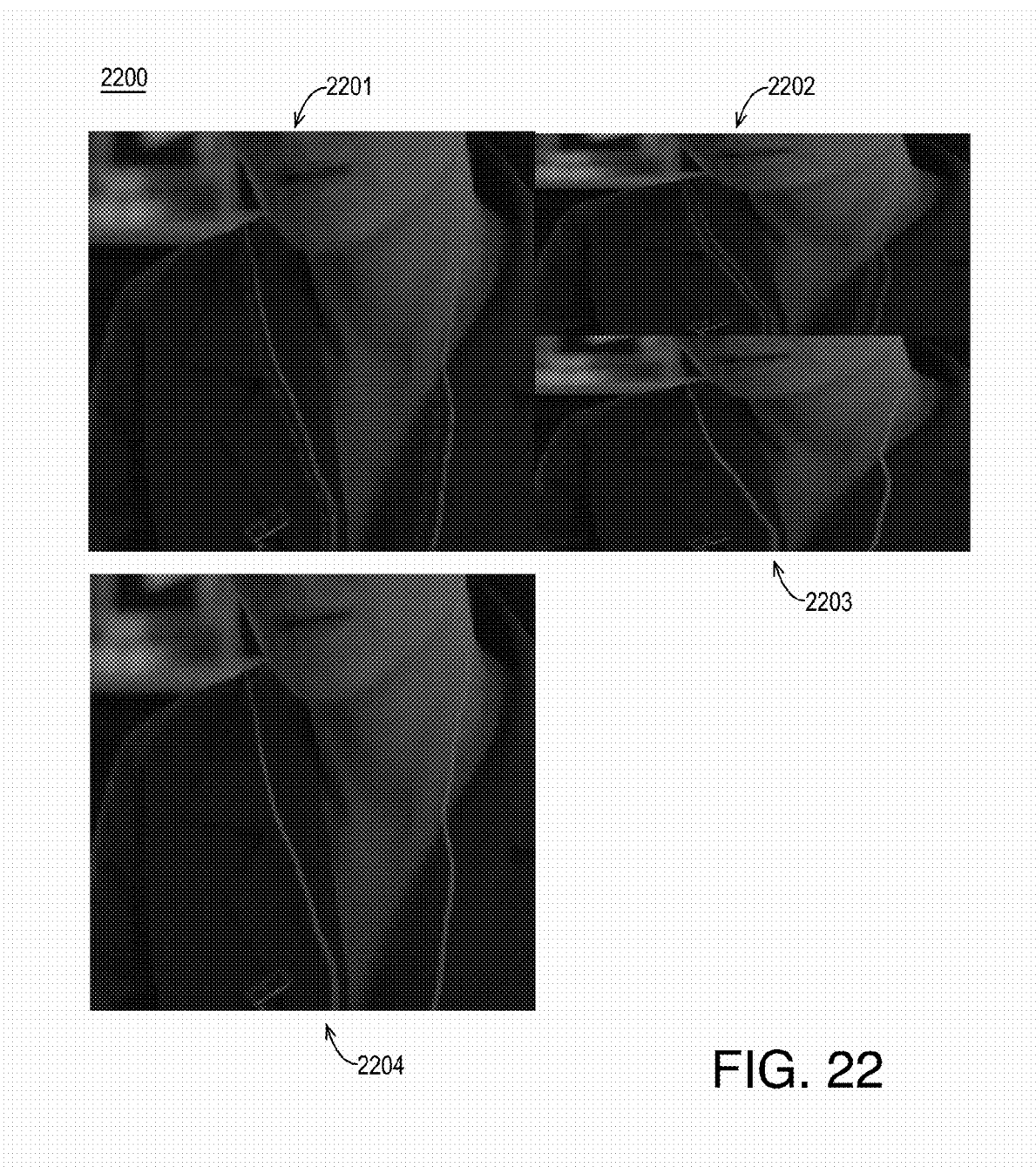
FIG. 22 illustrates example frames before and after a detelecine process.

FIG. 22 illustrates example frames 2200 before and after a detelecine process, arranged in accordance with at least some implementations of the present disclosure. As shown in FIG. 22, frames 2200 may include a blended frame 2201 (e.g., a blended 3:2 pull down frame) having a visual artifact such that doubling of the cords are provided. Furthermore, as shown in FIG. 22, blended frame 2201 may include fields 2202 (e.g., a top field) and 2203 (e.g., a bottom field) with field 2202 also exhibiting the visual artifact of doubling.

Frames 2200 also illustrates deinterlaced progressive frame 2204, which does not include the visual artifact of doubling. For example, in deinterlacing frame 2201, field 2202 may be removed and replaced with a repeated field to generate progressive frame 2204. In some examples, deinterlacing frame 2201 may include an adaptive telecine reversal as discussed herein and, in particular, with respect to FIG. 23.

As discussed, frame groups, via switches 1209, 1210, may be provided to telecine reverser 1212 (e.g., 3:2/2:3:3:2/4:1a/4:1b/blended/adaptive telecine reverser) (please refer to FIG. 12). Furthermore, telecine type indicator (tel_type) 1208 may be provided from frame group telecine pattern/progressive/interlaced classifier 1205 to telecine reverser. Based in part on telecine type indicator 1208, telecine reverser 1212 may reverse a telecine pattern of the frame group and provide progressive video 1215.

FIG. 23 is a flow diagram illustrating an example process 2300 for telecine reversal, arranged in accordance with at least some implementations of the present disclosure. As discussed, in some examples, process 2300 or portions thereof may be performed by telecine reverser 1212 of system 1200 to provide a progressive video 1215. Process 2300 may include one or more operations 2301-2307 as illustrated in FIG. 23. Process 2300 may form at least part of a video preprocess as discussed herein.

As shown, process 2300 may begin from start operation 2301 at operation 2302, "Analyze Buffer and Correct the Decision about Detected Pattern", where the buffer (e.g., frame buffer 1204) may be analyzed and, if needed, the decision about the detected pattern (e.g., indicated via telecine type indicator 1208) may be corrected. For example, the adaptive telecine pattern reverser (e.g., telecine reverser 1212) may determines if current detected pattern is valid or not. Due to difficulties such as lack of gradients in low detail dark scenes (e.g., due to scene transitions), editing errors, edges of the ending of a video scene, changes in format from one video scene to the next, in some examples, the detected pattern may not be accurate. In such examples, the system (e.g., via the telecine reverser) may attempt to provide a suitable transition to the correct pattern or correct the wrongly detected pattern and align it correctly. Such detections and corrections may be made using the techniques discussed with respect to telecine pattern detection (e.g. via Tests (31) through (41) or using similar techniques). In one example, when a TV broadcast goes from commercials to live news presentation, the signal will go from telecined (commercial) content (e.g., 24 frames per second to 30 frames per second conversion) to original 30 frames per second (e.g., fully progressive) and, when the commercial is inverse telecined, a detection error could take place at the border of the two scenes.

Process 2300 may continue at decision operation 2303, "Is there a Pattern?", where a determination may be made as to whether there is a pattern. For example, the pattern may include a known and/or detected telecine pattern such as 3:2, 2:3:3:2, 4:1a, 4:1b, 3:2 blended, or other detected pattern. If there is a pattern, process 2300 may continue at operation 2305, "Check Pattern Parity", where a parity of the pattern may be checked and/or verified. For example, the ordering of the pattern may be verified. Process 2300 may continue at operation 2306, "Undo Pattern", where the pattern may be detelecined as discussed herein. For example, when the telecine pattern is known (e.g., detected as discussed herein), the reversal may be performed by dropping fields, reordering fields, and combining fields to generate frames according to the known pattern. Examples of pattern reversal are provided herein with respect to FIGS. 3B, 4B, 27B, 28B, and elsewhere herein.

If there is no pattern (e.g., at decision operation 2303), process 2300 may continue at operation 2304, "Deinterlace Problem Frames", where unknown pattern or problem frames may be deinterlaced. Such frames may be deinterlaced using any suitable technique or techniques such as those discussed herein. In some examples, such frames may be deinterlaced using techniques discussed with respect to FIG. 24. Process 2300 may continue from operation 2306 or operation 2304 to end at end operation 2307. Process 2300 may provide deinterlaced progressive video suitable for display or re-encoding as discussed herein.

As discussed, video frames, via switches 1209, 1210, may be provided to content adaptive interlace reverser 1211 (please refer to FIG. 12). Furthermore, frame groups having an unknown pattern and/or problem frames may be deinterlaced as discussed with respect to process 2300. Content adaptive interlace reverser 1211 may deinterlace (e.g., interlace reverse) such true interlaced frames (e.g., frames provided via switches 1209, 1210) using any suitable technique or techniques. Furthermore, such unknown pattern frame groups and/or problem frames may be deinterlaced by content adaptive interlace reverser 1211 or a content adaptive interlace reverser implemented via telecine reverse 1212. Such deinterlacing or interlace reversal may be performed using any suitable technique or techniques. For example, such deinterlacing or interlace reversal may be performed using Bob techniques discussed with respect to FIG. 5A, using Weave techniques discussed with respect to FIG. 5B, or using techniques discussed with respect to FIG. 6 (e.g., GreedyH deinterlacing techniques).

For example, such deinterlacing techniques may offer different tradeoffs of price, performance, and quality. For example, some Bob deinterlacing techniques may include vertical doubling by repeating lines and other Bob deinterlacing techniques may include linear interpolation to generate missing lines. Furthermore, Bob deinterlacing techniques may be combined with other techniques. For example, a deinterlacer may combines Bob and Weave techniques into a single adaptive technique that may use Bob in moving areas and Weave in stationary areas. Such techniques may allow for better quality than Bob only techniques while complexity still remains relatively low. In other examples, the deinterlacer techniques may use motion compensation to generate missing block-lines. Such examples may provide increased performance at the cost of greater complexity. For example, in areas where motion compensation works well (e.g., motion vectors are good approximation of actual motion) high quality deinterlacing results may be provided. However, such technique may cause visual discontinuities in some regions due to random matches by the motion compensation process.

In other examples, motion adaptive deinterlacing techniques may use moving/nonmoving (e.g., pixels, blocks or regions) classification and to guide deinterlacing. In such examples, full motion compensation may not be used but motion detection may determine the deinterlacing technique to apply. Such techniques may provide results that, in the best cases for motion compensation/adaptation, are not as good as motion compensation deinterlacing techniques. However, in worst cases for motion compensation/adaptation, such motion adaptive deinterlacing techniques may provide fewer visual artifacts than motion compensation deinterlacing techniques.

As such, the techniques discussed herein may use any deinterlacing technique or technique to deinterlace true interlaced frames and unknown pattern/problem frames as described. In an example, an adaptive deinterlacer may be implemented.

Figure 24:
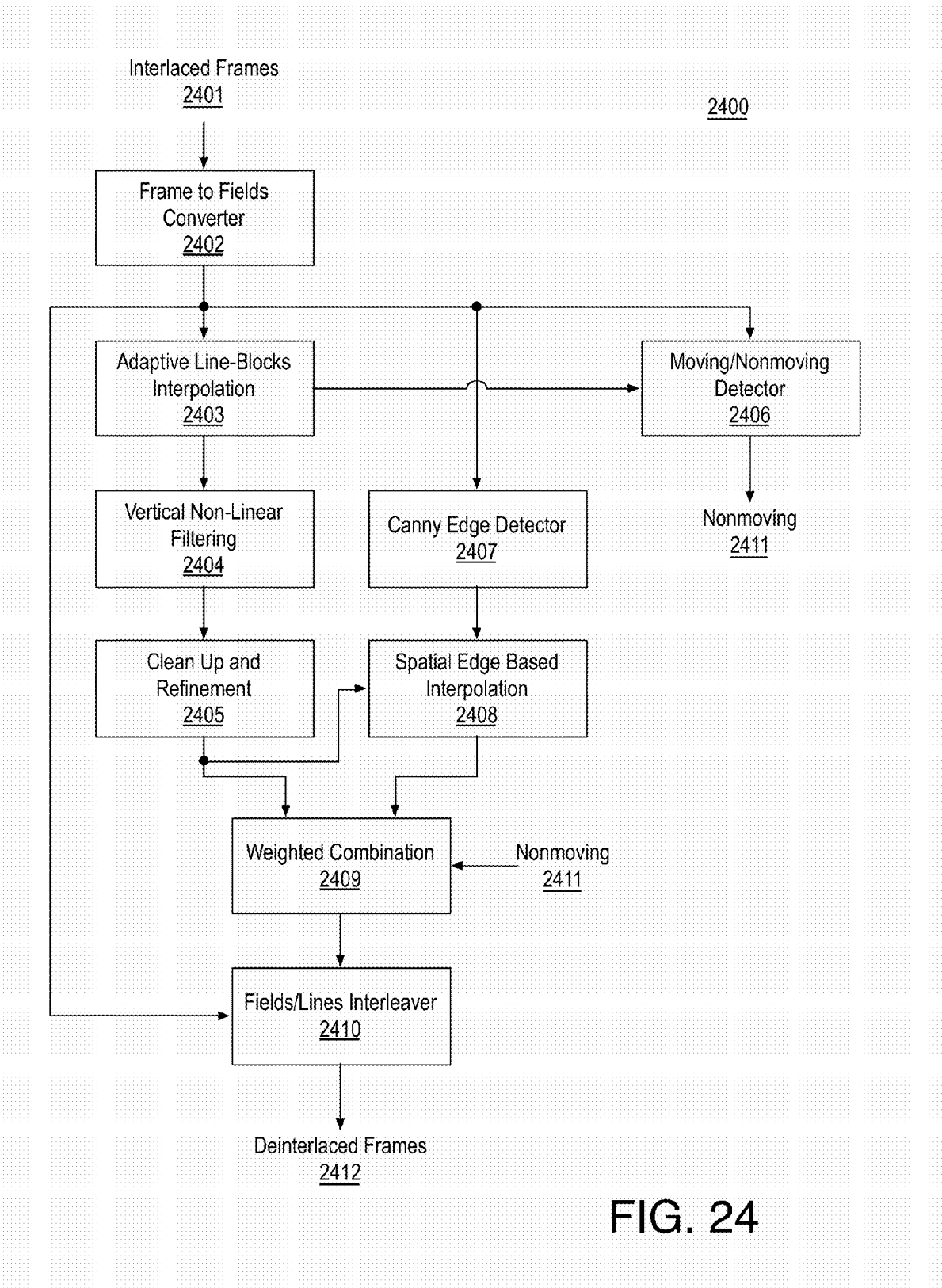
FIG. 24 is a flow diagram illustrating an example adaptive interlace reverser.

FIG. 24 is a flow diagram illustrating an example adaptive interlace reverser 2400, arranged in accordance with at least some implementations of the present disclosure. As discussed, in some examples, adaptive interlace reverser 2400 or portions thereof may be implemented via content adaptive interlace reverser 1211 of system 1200 to perform deinterlacing and to provide a progressive video 1215. Furthermore, as discussed, in other examples, adaptive interlace reverser 2400 may be implemented via telecine reverser 1212 of system 1200 to perform deinterlacing and provide a progressive video 1215. As shown, adaptive interlace reverser 2400 may include a frame to fields converter 2402, an adaptive line-blocks interpolation module 2403, a vertical non-linear filtering module 2404, a clean up and refinement module 2405, a moving/nonmoving detector 2406, a canny edge detector 2407, a spatial edge based interpolation module 2408, a weighted combination module 2409, and a fields/lines interleaver 2410.

As shown, adaptive interlace reverser 2400 may receive interlaced frames 2401 such as true interlaced frames or pseudo or fake interlaced frames from an unknown pattern or troubled frames as discussed herein. For example, interlaced frames 2401 may be received by frame to fields converter 2402. Frame to fields converter 2402 may separate frames of interlaced frames 2401 into fields using any suitable technique or techniques. In an example, frame to fields converter 2402 may separate frames of interlaced frames 2401 into fields by deinterleaving frames such that all even lines of a frame result in an even field and all odd lines of the frame result in an odd field. For example, the resulting sequence of fields may have twice the temporal rate (e.g., field rate) as compared to the frame rate of interlaced frames 2401, with each field having half the vertical lines of each frame. For example, every other line of each picture at twice the temporal rate may be missing. As shown, the fields determined by frame to fields converter 2402 may be provided to adaptive line-blocks interpolation module 2403, canny edge detector 2407, moving/nonmoving detector 2406, and fields/lines interleaver 2410.

Adaptive line-blocks interpolation module 2403 may receive the fields from frame to fields converter 2402 and initially fill missing lines in the received fields (e.g., the initially filled missing lines may be subsequently refined). Adaptive line-blocks interpolation module 2403 may initially fill missing lines in the received fields using any suitable technique or techniques. For example, adaptive line-blocks interpolation module 2403 may initially fill missing lines in the received fields using motion compensation techniques, motion adaptation techniques, line repeating techniques, linear interpolation techniques, or the like. In examples using motion adaptation or motion compensation, for practical reasons of computation and quality, rather than providing motion compensation or motion adaption fill for each full missing line, a group of lines such as 8 missing lines may be processed at one time such that interpolation may be performed using blocks of small width (e.g., 8 pixels) and height (e.g., lines). In the discussed example, the blocks are square and 8×8 pixels in size, however the blocks may be of any shape and size. For example, the blocks for interpolation may be rectangular having a size of 8×4 pixels. Furthermore, blocks may be bigger, such as 16×16 or 16×8 with a trade-off of quality for speed of processing. As shown, the fields with initially filled missing lines may be provided to vertical non-linear filtering module 2404 and moving/nonmoving detector 2406.

Moving/nonmoving detector 2406 may receive the fields with initially filled missing lines and the fields from frame to fields converter 2402. Moving/nonmoving detector 2406 may classify portions or regions of the fields as moving/nonmoving. For example, such classification may be performed on a pixel basis, block basis, and/or region basis. Moving/nonmoving detector 2406 may provide a binary mask (e.g., nonmoving mask (nonmoving) 2411) identifying, on a local basis, moving or static pixels, blocks, or regions. As shown, the moving/nonmoving mask (e.g., moving 2411) may be provided to weighted combination module 2409.

As discussed, vertical non-linear filtering module 2404 may receive the fields with initially filled missing lines from adaptive line-blocks interpolation module 2403. Vertical non-linear filtering module 2404 may provide non-linear filtering in the vertical direction to the vertical non-linear filtering module 2404 to refine the initially filled missing lines and provide filtered missing lines. Such filtering may improve the sharpness of interpolated edges for example. Vertical non-linear filtering module 2404 may perform such non-linear filtering using any suitable technique or techniques. In some examples, vertical non-linear filtering module 2404 may perform such non-linear filtering via a median filtering process. As shown, the fields with filtered missing lines may be provided to clean up and refinement module 2405.

For example, median filtering (or the like) provided via vertical non-linear filtering module 2404 may preserve details of edges and thereby the appearance of blurriness. Although the discussed non-linear filtering may be advantageous for edge details, it may introduce artifacts such as aliasing/staircase patterns on edges, small disconnected edges, and/or slight frame to frame jiggling of edges. Clean up and refinement module 2405 may receive the fields with filtered missing lines and clean up and refinement module 2405 may further filter the received fields to clean up isolated disconnected small edges and to increase frame to frame stability of edges. As shown, the fields with further filtered missing lines may be provided to spatial edge based interpolation module 2408 and weighted combination module 2409.

Furthermore, it may be desirable to decrease aliasing artifacts. For example, canny edge detector 2407 may receive the fields from frame to fields converter 2402 and canny edge detector 2407 may provide an output that identifies edges in the original (e.g., non-interpolated) lines of fields (e.g., as received via interlaced frames 2401). Such edges may be used to interpolate pixels along directional edges in missing (e.g., interpolated) lines. For example, instead of interpolating a pixel using vertically aligned pixels, a pixel may be interpolated using pixels on opposite sides of the provided directional line. For example, canny edge detector 2407 may locate edge points in lines of fields (e.g., noninterpolated lines) and interconnect them to minimize an error function (e.g., SAD) over interpolated lines. Such a process may provide directional filtering and may result in substantially precise interpolation of edges. As shown, the results from canny edge detector 2407 may be provided to spatial edge based interpolation module 2408, which may generate fields including spatial edge based missing lines using the fields with further filtered missing lines received via clean up and refinement module 2405 and the results from canny edge detector 2407. As shown, spatial edge based interpolation module 2408 may provide the fields including spatial edge based missing lines to weighted combination module 2409.

As discussed, weighted combination module 2409 may receive fields including spatial edge based missing lines from spatial edge based interpolation module 2408, fields with further filtered missing lines from clean up and refinement module 2405, and nonmoving mask (nonmoving) 2411 from moving/nonmoving detector 2406. Weighted combination module 2409 may generate final interpolated lines (e.g., final missing lines) as a weighted combination of pixels from clean up and refinement module 2405 (e.g., further filtered missing lines as discussed) and pixels from spatial edge based interpolation module 2408 (e.g., spatial edge based missing lines). The weightings may be applied using any suitable technique or techniques. In an example, based on nonmoving mask 2411, pixels for static areas may include the pixels from spatial edge based interpolation module 2408 and pixels for moving areas may include pixels from clean up and refinement module 2405 (e.g., a binary choice between pixels may be made based on the moving/nonmoving mask). In such examples, the weights applied to spatial edge based interpolation pixels and further filtered interpolated pixels may be $(1,0)$ in static areas and $(0,1)$ in moving areas, respectively. In other examples, the weights may be non-binary fixed weights. In yet other examples, the weights may be non-binary and content adaptive such that, instead of nonmoving mask 2411, moving/nonmoving detector 2406 may provide a mapping of relative motion or the like an the weights may be content adaptive based on the mapping provided by moving/nonmoving detector 2406. As shown, weighted combination module 2409 may provide the missing pixels (e.g., lines generated as discussed) to fields/lines interleaver 2410.

Fields/lines interleaver 2410 may receive the generated missing pixels (e.g., lines) and the fields from frame to fields converter 2402. Fields/lines interleaver 2410 may interleave the generated missing pixels (e.g., lines) and the fields from frame to fields converter 2402 to generate deinterlaced frames 2412. For example, deinterlaced frames 2412 may be provided as progressive video from content adaptive interlace reverser 1211 or telecine reverser 1212.

As discussed, adaptive interlace reverser 2400 or other deinterlacers discussed may deinterlace interlaced video to generate progressive video using various techniques. In some examples, any of the described deinterlacers, including adaptive interlace reverser 2400 may result in some visible artifacts on critical content. For example, if the source content contains stationary or near stationary graphics with thin (e.g., 1 line) horizontal edges or text with highlights that change slightly from frame to frame, after deinterlacing, a shimmering artifact may be visible. Furthermore, if the source content contains stationary text or slow moving text, after deinterlacing to 60 frames per second, the deinterlaced content may show visible artifacts including wobbliness of text or a text box that contains the text. Such artifacts may occur as co-located lines of consecutive deinterlaced frames may have lines that are out of phase. For example, for every original line, the co-located line in a neighboring frame may be synthesized and may appear different enough to create such visible artifacts due to repetition. Such visible artifacts may be resolved by having the deinterlacer output at 30 frames per second and bringing neighboring frames into phase. However, such techniques may noticeably reduce vertical/temporal resolution. For example, such reduction of temporal resolution may not be practical as often video content may have multiple lines of text with some scrolling fast while other text may be stationary or moving slowly (e.g., headlines or stock tickers or the like). In such examples, the reduction of temporal resolution may cause judder artifacts in the fast moving content. In some examples, adaptive interlace reverser 2400 may include modules or techniques to address such shimmer, wobbliness, and judder artifacts such as vertical synchronization techniques or the like.

As discussed, a variety of techniques may be used to provide video preprocessing to convert aggregated video of a variety of formats to progressive video, which may be advantageous for modern displays and/or for compression via state of the art video codecs.

For example, the systems and techniques discussed herein may include a telecine and interlace reverser. In some examples, the discussed systems and techniques may be provided in operating modes. For example, the systems and techniques may be provided in the three operating modes that may be used to preprocess a decoded high bitrate, aggregated, and interlaced video stream. For example, the video stream may have originated as 24 frames per second progressive video that has undergone 3:2 pull down to pseudo interlaced video, or the video stream may truly be real interlaced video at the time of capture. In the case of former, the preprocessing may convert the pseudo-interlaced video to progressive video by un-doing the telecine conversion. In the case of latter, the preprocessing may convert the actual interlaced video to progressive video by the process of deinterlacing. Since in some of the encoded source streams, there may be identifiers that identify a program as originating from an interlaced source, a telecined source, or a truly progressive source, 3 types of processing modes may be provided as follows.

A first processing mode may include an auto detection mode. In an auto detection mode (e.g., an adaptive mode), decoded frames of a high bitrate encoded video stream may be automatically analyzed to determine if they are progressive, pseudo interlaced due to telecine conversion, or originally from an interlaced source. If the frames are determined to be progressive, no further preprocessing action may be necessary and the video is considered available in the right format for encoding (e.g., lower bitrate encoding) or presentment. If the frames are deemed to be pseudo interlaced, the telecine reversal (or inversion) process may be applied to convert the frames to 24 frames per second progressive format for subsequent encoding (e.g., lower bitrate encoding) or presentment. Alternatively, f the frames are determined to be originally interlaced, the deinterlacing (interlace reversal) process may be applied to convert the frames to progressive format at 30 or 60 frames per second depending on the bitrate available for subsequent encoding (e.g., lower bitrate encoding) or presentment.

A second processing mode may include a telecine reverser mode. For example, when it is known that decoded frames of a high bitrate encoded video stream are pseudo interlaced, instead of sending them through auto detection mode (with a chance of misprocessing due to the possibility of false positives or the like), a telecine reverser mode may be implemented. In a telecine reverser mode, the frames may be sent through the telecine reversal (or inversion) process to convert them to 24 frames per second progressive format for subsequent encoding (e.g., lower bitrate encoding) or presentment.

A third processing mode may include a telecine reverser mode. For example, when it is known that decoded frames of a high bitrate encoded video stream are originally interlaced, instead of sending them through auto detection mode (with a chance misprocessing due to the possibility of false positives or the like), an interlace reverser mode may be implemented. In an interlace reverser mode, the frames may be sent through deinterlacing (interlace reversal) to convert them to progressive format at 30 or 60 frames per second depending on the bitrate available for subsequent encoding (e.g., lower bitrate encoding) or presentment.

In all three modes, the output of the process is progressive video, which is the format most suitable for efficient coding using the HEVC coding standard or similar standards. For example, while the HEVC standard also supports signaling of video to be interlaced, HEVC coding tools only support efficient coding of progressive video such that there is no coding efficiency advantage of encoding the interlaced format. Furthermore, some video standards such as H.264 video standards support tools for efficient coding of both interlaced and progressive video. However, even with H.264 digital video services or the like, due to the eventual playback of video (e.g., via a media player) being be intended for a computer display, digital HDTV display or the like, it may be advantageous to provide progressive video. Thus, the progressive format may be advantageous for encoding as the format becomes ubiquitous and does not require additional conversions at display end points. For example, such additional conversions may cause widely varying quality of video delivered to consumer (e.g., depending on the type and/or capability of the consumer display).

Figure 29:
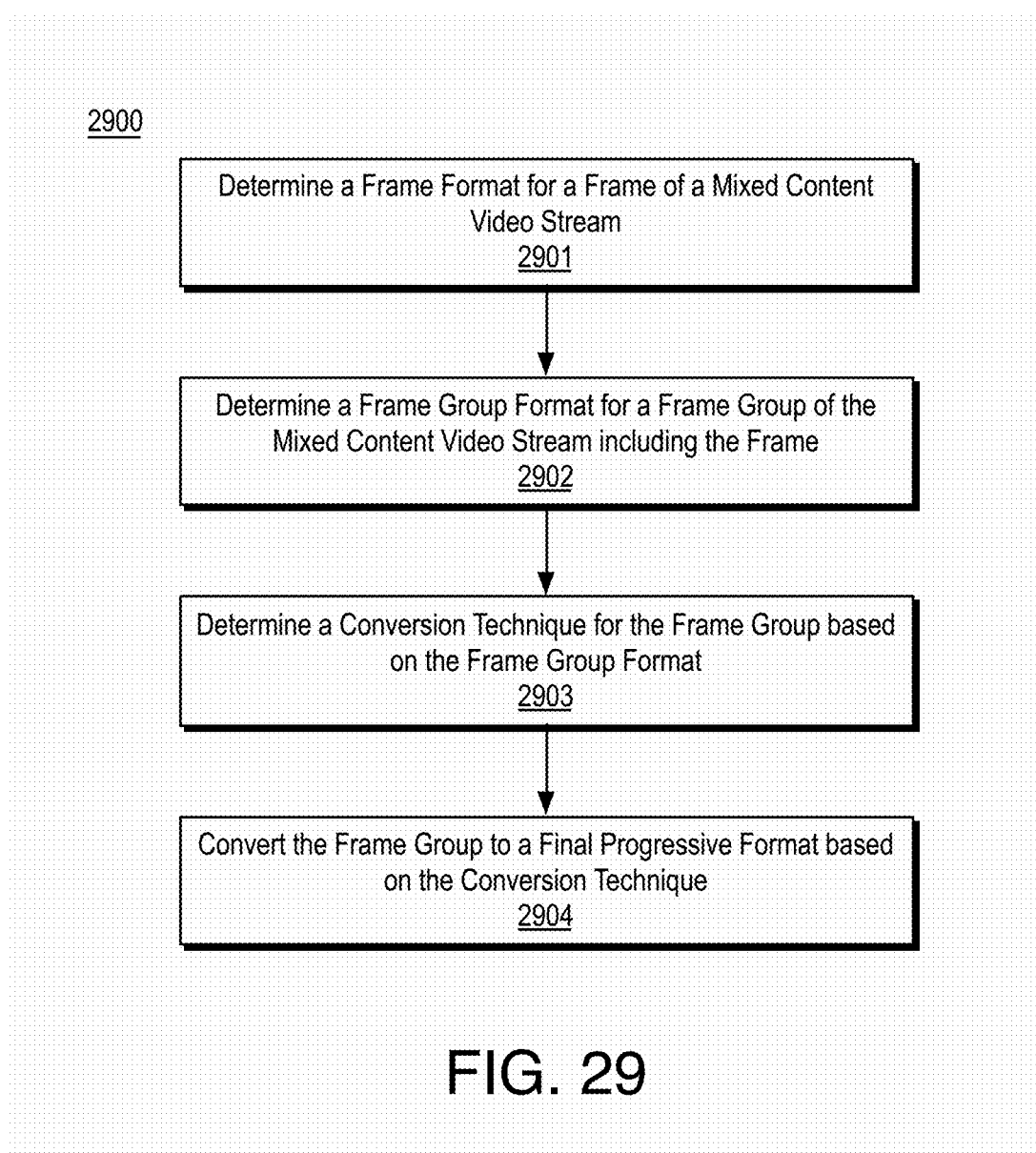
FIG. 29 is a flow diagram illustrating an example process for processing video for encoding and/or display.

FIG. 29 is a flow diagram illustrating an example process 2900 for processing video for encoding and/or display, arranged in accordance with at least some implementations of the present disclosure. Process 2900 may include one or more operations 2901-2904 as illustrated in FIG. 29. Process 2900 may form at least part of a video process. By way of non-limiting example, process 2900 may form at least part of a video encoding process for generating progressive video as undertaken by system 1200 as discussed herein. Further, process 2900 will be described herein in reference to system 3000 of FIG. 30.

Figure 30:
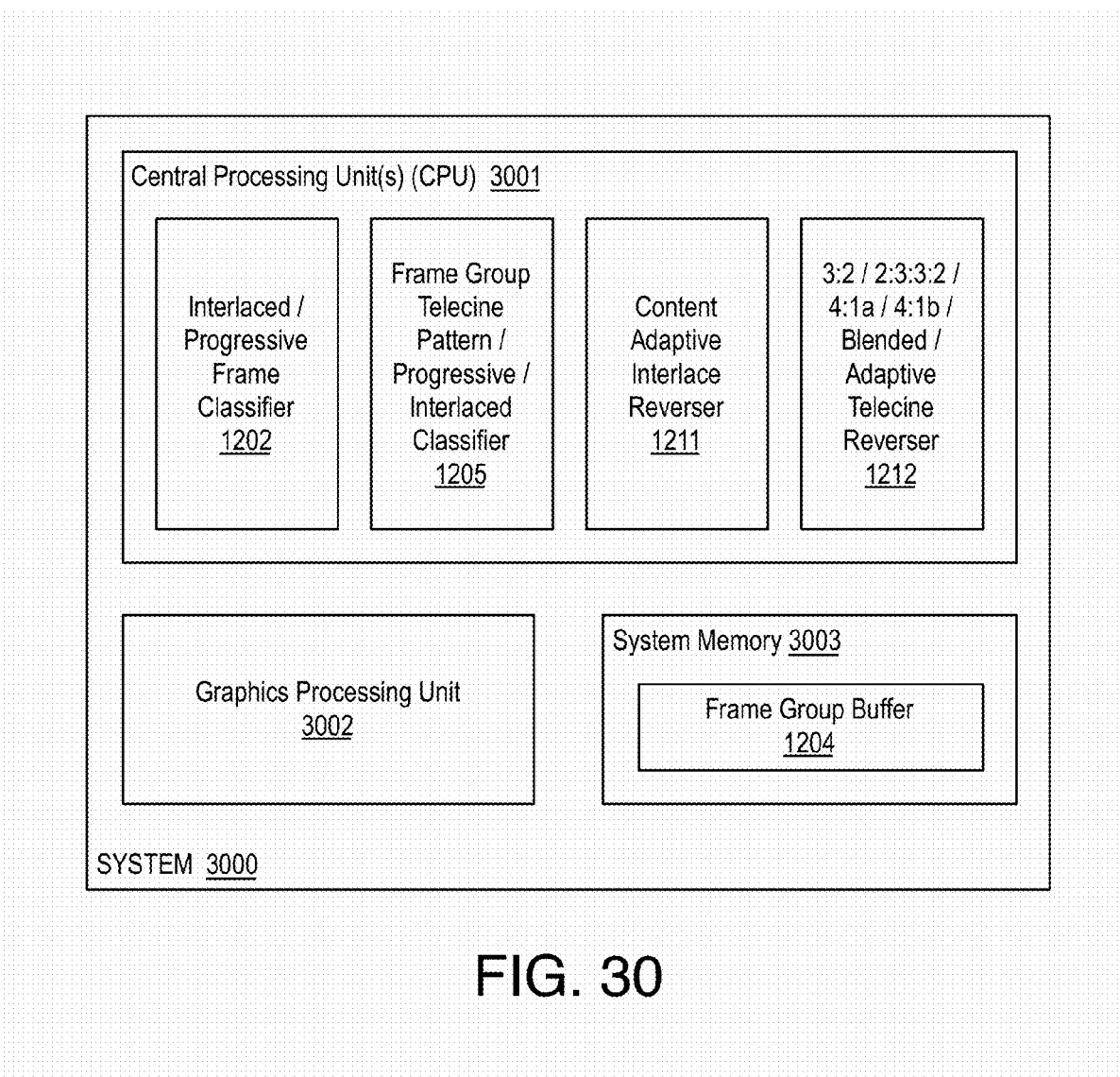
FIG. 30 is an illustrative diagram of an example system for video processing.

FIG. 30 is an illustrative diagram of an example system 3000 for video processing, arranged in accordance with at least some implementations of the present disclosure. As shown in FIG. 30, system 3000 may include one or more central processing units (CPU) 3001, a graphics processing unit (GPU) 3002, and system memory 3003. Also as shown, CPU 3001 may include interlaced/progressive frame classifier 1202, frame group telecine pattern/progressive/interlaced classifier 1205, content adaptive interlace reverser 1211, and telecine reverser (3:2/2:3:3:2/4:1a/4:1b/blended/adaptive telecine reverser) 1212. Furthermore, system memory 3003 may include frame group buffer 1204. In the example of system 3000, system memory 3003 may store frame groups (e.g., groups of five current frames, 5 prior frames, and 5 subsequent frames, and an optional control frame) via frame group buffer 1204. Furthermore, system memory 3003 may store video data such as descriptors, comparison test parameters and/or results, predicted pixels, weights, transport stream or channel data, header data, format codes (e.g., frmt_code 909), aggregated video content, progressive video content, progressive video indicators (e.g., prog_ind 1104), interlaced frame indicators (e.g., intl_frm 1203), true interlaced frame group indicators (e.g., tru_intl 1206), progressive frame group indicators (e.g., prog_ind 1207), telecine pattern indicators (e.g., tel_type 1208), machine learning parameters, thresholds, timestamps, video fields, video frames or other video data discussed herein.

CPU 3001 and graphics processing unit 3002 may include any number and type of processing units that may provide the operations as discussed herein. Such operations may be implemented via software or hardware or a combination thereof. For example, graphics processing unit 3002 may include circuitry dedicated to manipulate data obtained from system memory 3003 or dedicated graphics memory (not shown). Furthermore, central processing units 3001 may include any number and type of processing units or modules that may provide control and other high level functions for system 3000 as well as the operations as discussed herein. System memory 3003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, system memory 3003 may be implemented by cache memory. As shown, in an embodiment, interlaced/progressive frame classifier 1202, frame group telecine pattern/progressive/interlaced classifier 1205, content adaptive interlace reverser 1211, and telecine reverser (3:2/2:3:3:2/4:1a/4:1b/blended/adaptive telecine reverser) 1212 may be implemented via CPU 3001. In some examples, interlaced/progressive frame classifier 1202, frame group telecine pattern/progressive/interlaced classifier 1205, content adaptive interlace reverser 1211, and telecine reverser (3:2/2:3:3:2/4:1a/4:1b/blended/adaptive telecine reverser) 1212 may be provided by software as implemented via CPU 3001. In other examples interlaced/progressive frame classifier 1202, frame group telecine pattern/progressive/interlaced classifier 1205, content adaptive interlace reverser 1211, and telecine reverser (3:2/2:3:3:2/4:1a/4:1b/blended/adaptive telecine reverser) 1212 may be implemented via a digital signal processor or the like. In another embodiment, interlaced/progressive frame classifier 1202, frame group telecine pattern/progressive/interlaced classifier 1205, content adaptive interlace reverser 1211, and telecine reverser (3:2/2:3:3:2/4:1a/4:1b/blended/adaptive telecine reverser) 1212 may be implemented via an execution unit (EU) of graphics processing unit 3002. The EU may include, for example, programmable logic or circuitry such as a logic core or cores that may provide a wide array of programmable logic functions.

Returning to discussion of FIG. 29, process 2900 may begin at operation 2901, "Determine a Frame Format for a Frame of a Mixed Content Video Stream", where, for a frame format may be determined for a frame of a mixed content video stream including one or more video formats. For example, the video formats of the mixed content video stream may include one or more of a progressive format, a true interlaced format, a pseudo-interlaced telecine converted format, a 60 frames per second progressive format, a 30 frames per second progressive format, a 30 frames per second true interlaced format, or a 30 frames per second pseudo-interlaced telecine converted format. Determining the frame format may include a content analysis of the first frame. For example, the frame format may include one of progressive or interlaced. For example, the frame format may be determined via interlaced/progressive frame classifier 1202 as implemented via CPU 3001.

In some examples, the frame format may be determined by determining a plurality of descriptors associated with content of the frame, evaluating a plurality of comparison tests based on the plurality of descriptors, and determining the frame format based on the comparison tests, wherein the frame format comprises at least one of progressive or interlaced. Such techniques are discussed with respect to FIGS. 13, 14, 15, 16, 25, and elsewhere herein. For example, the descriptors may include one or more of a sum of absolute differences between pairs of fields of the first frame, a sum of variable threshold differences between blocks of the first frame and blocks of a top field of the first frame, a thresholded count of blocks of the first frame having a high texture value, a measure of a vertical texture of the first frame, a measure of a difference between a dynamic texture and a static texture of the first frame, a measure of a difference between a texture level of the first frame and an average of texture levels of fields of the first frame, or a sum of a static thresholded differences between blocks of the first frame and blocks of the top field of the first frame. Other descriptors may be available. The comparison tests may include any comparison tests such as Equations (1)-(9) as discussed herein.

In other examples, the frame format may be determined by determining a plurality of descriptors associated with content of the frame, evaluating, at a first stage, a plurality of comparison tests based on the plurality of descriptors, determining, at the first stage, whether the frame format is progressive, interlaced, or uncertain based on the comparison tests, evaluating, when the frame format is uncertain at the first stage, a second stage comprising machine learning based comparison tests, and determining, at the second stage, whether the frame format is progressive or interlaced based on the machine learning based comparison tests. Such techniques are discussed with respect to FIGS. 13, 14, 15, 16, 17A, 17B, 26, 18, and elsewhere herein.

Process 2900 may continue at operation 2902, "Determine a Frame Group Format for a Frame Group of the Mixed Content Video Stream including the Frame", where a frame group format for a frame group of the mixed content video stream including the frame may be determined. For example, the frame format may be determined via frame group telecine pattern/progressive/interlaced classifier 1205 as implemented via CPU 3001. In some examples, determining the frame group format may include content analysis of frames of the frame group. For example, the frame group format may include one of all progressive, all interlaced, or telecined. In telecined examples, the frame group format may include a detected telecine pattern. In other examples, the frame group format may include an unknown pattern.

Process 2900 may continue at operation 2903, "Determine a Conversion Technique for the Frame Group based on the Frame Group Format", where a conversion technique for the frame group based at least in part on the frame group format. For example, the conversion technique may be determined via telecine pattern/progressive/interlaced classifier 1205 as implemented via CPU 3001, via a controller and/or switches implemented via CPU 2911, or the like. In some examples, determining the conversion technique may include comparing the frame group format to a prior frame group format of a frame group prior to the frame group and a look-ahead frame group format for a frame group subsequent to the first frame group. In an example, the frame group the prior frame group and the subsequent frame group may each include five frames.

For example, determining the frame group format (e.g., at operation 2902) may include one of determining all frames of the frame group are progressive, determining all frames of the frame group are interlaced, determining a telecine pattern of the frame group, or determining an undetected (e.g. unknown) pattern of the frame group. Furthermore, determining the conversion technique may include comparing the frame group format to a prior frame group format of a frame group prior to the first frame group and a look-ahead frame group format for a frame group subsequent to the first frame group. If the frame group formats match, the frame group format may be determined to be the matching format.

In some examples, the frame group format is all progressive frames, determining the conversion technique includes determining a prior frame group format and a look-ahead frame group format are all progressive frames, and the conversion technique includes no conversion to generate final frames having the final progressive format (e.g., no conversion may be required for progressive frames). In other examples, the frame group format is all interlaced frames, determining the conversion technique includes determining a prior frame group format and a look-ahead frame group format are all interlaced frames, and the conversion technique includes an adaptive deinterlacing technique. However, any deinterlacing technique discussed herein may be implemented. In yet other examples, the frame group format is an individual telecine pattern, determining the conversion technique includes determining a prior frame group format and a look-ahead frame group format have the individual telecine pattern, and the conversion technique includes an adaptive telecine pattern reversal technique. However, any telecine pattern reversal technique discussed herein may be implemented. For example, the individual telecine pattern may be one of a 3:2 pull down pattern, a 2:3:3:2 pull down pattern, a 4:1 pull down pattern (e.g., 4:1a or 4:1b as described herein, or a blended pattern (e.g. 3:2 blended pull down).

Any techniques discussed herein may be used to determine an individual telecine pattern such as those discussed with respect to FIGS. 19A, 19B, and elsewhere herein. In some examples the testing may include evaluating a plurality of comparison tests such that a first comparison test is based on comparing measures of local texture of the frames of the frame group and a second comparison test is based on comparing a sum of absolute differences between fields of an individual frame of the first frame group to a sum of absolute differences between a field of the individual frame and another frame of the frame group. Such examples are discussed herein with respect to 3:2 pull down detection. In other examples, the testing may include evaluating at least one comparison test, wherein the comparison test is based on comparing a sum of static thresholded differences between blocks of an individual frame of the frame group to sum of static thresholded differences between blocks of another frame of the frame group. Such examples are discussed herein with respect to 2:3:3:2 pull down detection. In yet other examples, detection techniques discussed with respect to 4:1a and/or 4:1b pull down detection may be implemented.

Process 2900 may continue at operation 2904, "Convert the Frame Group to a Final Progressive Format based on the Conversion Technique", where the frame group may be converted to a final progressive format based on the determined conversion technique. For example, the frame group may be converted via one of content adaptive interlace reverser 1211 or telecine reverser (3:2/2:3:3:2/4:1a/4:1b/blended/adaptive telecine reverser) 1212 as implemented via CPU 3001.

For example, when the conversion technique is deinterlacing (e.g., for true interlaced frames), adaptive deinterlacing may be implemented as discussed with respect to FIG. 24 and elsewhere herein. Such adaptive deinterlacing may be implemented via content adaptive interlace reverser 1211 as implemented via CPU 3001. Such adaptive deinterlacing may be considered motion adaptive deinterlacing for example. In some examples, adaptive deinterlacing may include generating missing pixels based on at least one of adaptive line blocks interpolation, vertical non-linear filtering, spatial edge detection based interpolation, and/or a weighted averaging of interpolated and filtered line blocks and spatial edge detection based interpolation weighted based on motion detection.

When the conversion technique is telecine reversal (e.g., for pseudo-interlaced telecine converted format frame groups), adaptive telecine pattern reversal may be implemented as discussed with respect to FIG. 23 and elsewhere herein. Such adaptive telecine pattern reversal may be implemented via telecine reverser (3:2/2:3:3:2/4:1a/4:1b/blended/ adaptive telecine reverser) 1212 as implemented via CPU 3001. For example, wherein the frame group format comprises an individual telecine pattern, determining the conversion technique may include determining a prior frame group format and a look-ahead frame group format include the individual (e.g. the same) telecine pattern, and the conversion technique may be an adaptive telecine pattern reversal technique. In such examples, the adaptive telecine pattern reversal technique may include verifying the individual telecine pattern, checking pattern parity, and reversing the individual telecine pattern to generate final frames having, for example, the final progressive format at 24 frames per second.

In examples, where the frame group format is undetected (e.g., the frame group format is not one of the tested telecine formats), the conversion technique may similarly include an adaptive telecine pattern reversal technique. In such examples, the adaptive telecine pattern reversal technique may include generating missing pixels based on at least one of adaptive line blocks interpolation, vertical non-linear filtering, spatial edge detection based interpolation, and/or a weighted averaging of interpolated and filtered line blocks and spatial edge detection based interpolation weighted based on motion detection. For example, such techniques may be similar to those discussed with respect to adaptive telecine pattern reversal. For example, the adaptive telecine pattern reversal technique may generate a final progressive format at 24 frames per second.

Process 2900 may be repeated for any number of frames, frame groups, segments, or sequences or the like of a video stream such as a mixed content video stream. For example, a second frame format for a second frame of the mixed content video stream may be determined, a second frame group format for a second frame group of the mixed content video stream may be determined such that the frame group format and the second frame group format are different, a second conversion technique for the second frame group may be determined based at least in part on the first frame group format such that the first conversion technique and the second conversion technique are different, and the second frame group may be converted to a second final progressive format based on the second determined conversion technique, which may be any technique as discussed herein.

Furthermore, in some examples, a portion or entirety of the mixed content video stream may have headers or other indicators that may indicate the format of some portions or all portions of the mixed content video stream. In such examples, determining the frame format and the frame group format may include decoding headers associated with the mixed content video stream. For example, the mixed content video stream may include an aggregated transport stream and wherein decoding the headers may include demultiplexing individual channels of the aggregated transport stream, decoding a first individual channel to generate the mixed content video stream and the headers, the headers including the frame format and the frame group format. In such examples, the indicated formats may be used to identify conversion techniques.

Furthermore, as discussed, the mixed content video stream, prior to processing, may be received by the system implementing process 2900 such as system 3000. The mixed content video stream may be received using any suitable techniques. In some examples, the mixed content video stream may be purchased from a content provider.

Process 2900 may be repeated any number of times either in series or in parallel for any number of video frames, group of frames, portions of a video stream, or mixed content video streams. Process 2900 may provide for high quality progressive video frames as discussed herein. Such video frames may be advantageous for presentment via current displays and/or encoding via current codecs.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of system 1200, system 3000, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As discussed, a variety of techniques may be used to provide video preprocessing to convert aggregated video of a variety of formats to progressive video, which may be advantageous for modern displays and/or for compression via state of the art video codecs. The results of such techniques are now described with respect to H.264 video encoding. The results with respect to HEVC video encoding are similar.

For these tests, 5 diverse 1080p video test sequences: two of them advertisements ('Faucet', and 'Zyrtec', both that have undergone 3:2 pull down), one episodic content (Tones' that has undergone multiple pull down patterns), one animation/cartoon movie ('Johny Test' that has undergone 3:2 pull down), and one movie ('The Natural' that has undergone 3:2 pull down) were used. In each case, both the telecined input video (e.g., 30 frames per second or 60 fields per second) as well as reverse telecined (24 frames per second) video generated using the techniques discussed herein were coded with the H.264 standard using constant Qp encoding with 4 standard Qp values (e.g., 22, 27, 32, and 37). The resulting generated peak signal to noise ration (PSNR) and Bitrates for each Qp were attained as shown in Tables 1A and 1B.

TABLE 1A

Encoded Rate/Distortion measurement of each sequence with and without telecine reversal (1 of 2)

| Telecine (fps) | Qp | 'Faucet' (ad) Bitrate, kbps | PSNR Y, dB | 'Bones' (episodic) Bitrate, kbps | PSNR Y, dB | 'Johnny Test' (anim) Bitrate, kbps | PSNR Y, dB |
|---|---|---|---|---|---|---|---|
| Yes (30) | 22 | 5114.94 | 47.06 | 5005.18 | 46.34 | 5040.74 | 44.83 |
|  | 27 | 3139.03 | 44.93 | 3006.11 | 44.97 | 2998.36 | 41.80 |
|  | 32 | 2115.83 | 43.22 | 2004.07 | 43.78 | 1997.65 | 39.13 |
|  | 37 | 1605.21 | 41.97 | 1503.17 | 42.84 | 1505.76 | 37.10 |
| Reversed (24) | 22 | 5141.48 | 48.76 | 4981.98 | 47.29 | 5136.87 | 48.11 |
|  | 27 | 3086.50 | 47.06 | 2984.89 | 46.17 | 3069.05 | 46.11 |
|  | 32 | 2071.68 | 45.67 | 1994.69 | 45.21 | 2052.24 | 44.43 |
|  | 37 | 1568.50 | 44.65 | 1508.79 | 44.44 | 1534.53 | 43.11 |

TABLE 1B

Encoded Rate/Distortion measurement of each sequence with and without telecine reversal (2 of 2)

| Telecine (fps) | Qp | 'Zyrtec' (ad) Bitrate, kbps | PSNR Y, dB | 'The Natural' (movie) Bitrate, kbps | PSNR Y, dB |
|---|---|---|---|---|---|
| Yes (30) | 22 | 4810.25 | 49.33 | 4810.25 | 49.33 |
|  | 27 | 2898.68 | 46.96 | 2898.68 | 46.96 |
|  | 32 | 1924.37 | 44.95 | 1924.37 | 44.95 |
|  | 37 | 1452.12 | 43.49 | 1452.12 | 43.49 |
| Reversed (24) | 22 | 4858.27 | 50.98 | 4858.27 | 50.98 |
|  | 27 | 2910.71 | 49.08 | 2910.71 | 49.08 |
|  | 32 | 1950.63 | 47.48 | 1950.63 | 47.48 |
|  | 37 | 1472.83 | 46.34 | 1472.83 | 46.34 |

Using four point rate/distortion data from Table 1A and 1B, a RD curve was computed by cubic curve fitting for each sequence for each of the two test cases (e.g., telecined and telecine reversed). Next, following MPEG's BD rate computation procedure that computes a single distance between a pair of fitted curves, a BD rate was computed for telecine reversed and H.264 encoded video as compared to telecined and H.264 encoded video. The BD rate indicates the additional bitrate a telecine reversed sequence (e.g., large negative number is better as it indicates savings) might take to achieve the same PSNR quality as telecined video.

Table 2 shows a computed BD rate for each sequence. As can be seen, all 5 sequences register impressive BD rates of around 40% or higher, showing significant benefits of the telecine reversal techniques discussed herein.

TABLE 2

Percentage BD rate measurement for each sequence (negative numbers show gains) BD rate

| 'Faucet' (ad) | 'Bones' (episodic) | 'Johnny Test' (anim) | 'Zyrtec' (ad) | 'The Natural' (movie) |
|---|---|---|---|---|
| −43.71% age | −38.41% age | −57.14% age | −38.87% age | −52.21% age |

Furthermore, practical considerations such as implementation complexity of the described techniques are discussed. First, the adaptive telecine and interlace reverser as discussed herein may be implemented in 'C' programming language with critical portions optimized in assembly (e.g., SSE). Video sequences of a number of three different resolutions (e.g., SD, HD1080p, and UHD 2160p) were telecine/interlace reversed on personal computer having a 3.4 GHz central processing unit (CPU). Under such conditions, the average time for a single threaded operation for this process was found to be 11.5 msec. Next, critical components of the discussed techniques were optimized with a graphics processing unit (GPU) assisting the CPU such that a speed up of around a factor of 4 was attained, bringing processing time down to 2.73 msec per frame on average. Results of all three resolutions are summarized in Table 3.

TABLE 3

Telecine/interlace reversal time for different resolutions video

| Resolution | Telecine/Interlace Reversal time on average per frame | |
|---|---|---|
| | on CPU | GPU assist of CPU |
| SD | 2.54 ms | 0.756 ms |
| HD 1080 p | 11.5 ms | 2.73 ms |
| UHD 2160 p | 57.7 ms | 14.2 ms |

A system implementation using the techniques discussed herein may provide good tradeoffs between gains achievable and complexity of implementation.

Figure 31:
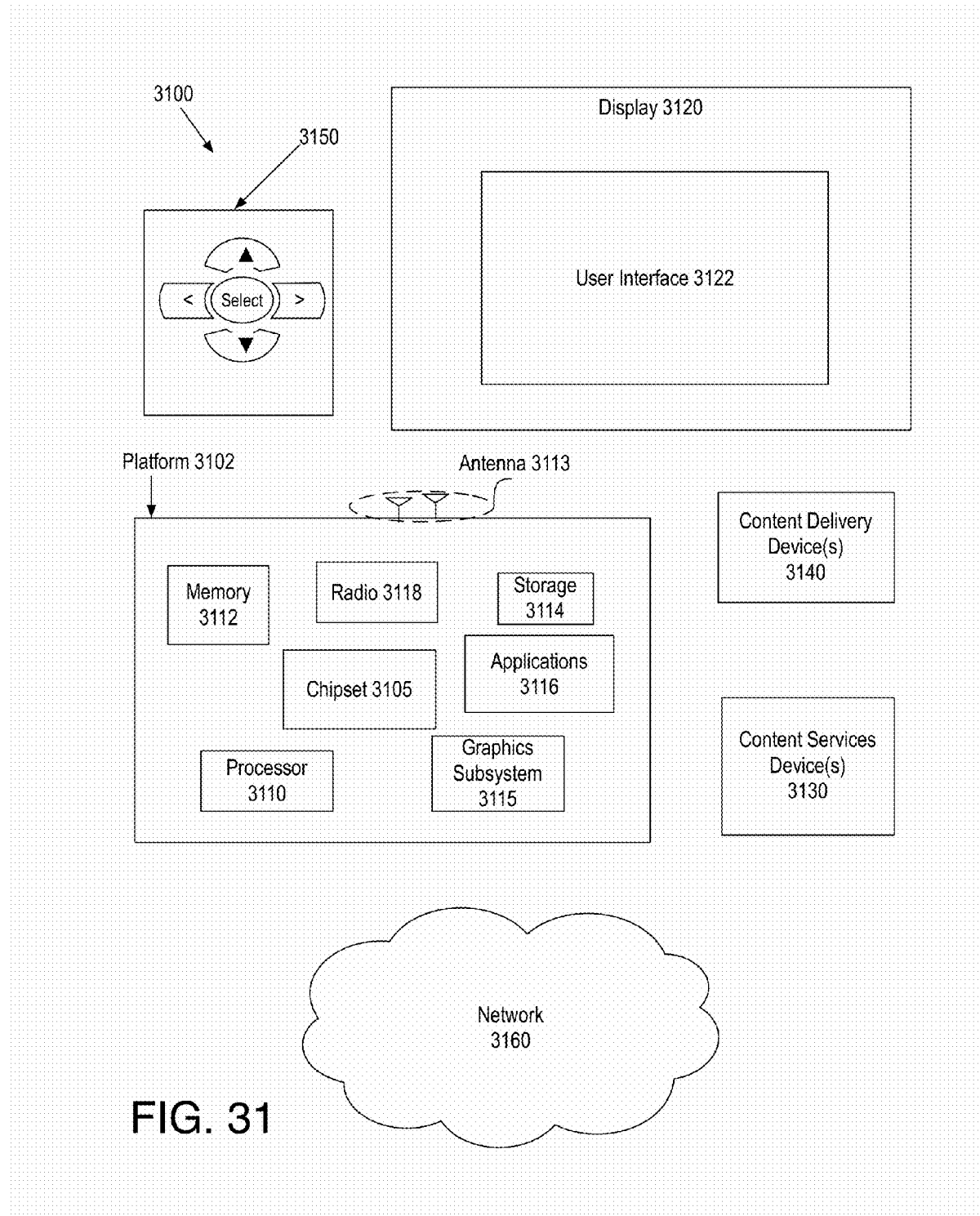
FIG. 31 is an illustrative diagram of an example system.

FIG. 31 is an illustrative diagram of an example system 3100, arranged in accordance with at least some implementations of the present disclosure. In various implementations, system 3100 may be a mobile system although system 3100 is not limited to this context. For example, system 3100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, smart watch, smart glasses or smart television), mobile internet device (MID), messaging device, data communication device, cameras (e.g. point-and-shoot cameras, super-zoom cameras, digital single-lens reflex (DSLR) cameras, video cameras, camcorder), and so forth.

In various implementations, system 3100 includes a platform 3102 coupled to a display 3310. Platform 3102 may receive content from a content device such as content services device(s) 3130 or content delivery device(s) 3140 or other similar content sources. A navigation controller 3150 including one or more navigation features may be used to interact with, for example, platform 3102 and/or display 3120. Each of these components is described in greater detail below.

In various implementations, platform 3102 may include any combination of a chipset 3105, processor 3110, memory 3112, antenna 3113, storage 3114, graphics subsystem 3115, applications 3116 and/or radio 3118. Chipset 3105 may provide intercommunication among processor 3110, memory 3112, storage 3114, graphics subsystem 3115, applications 3116 and/or radio 3118. For example, chipset 3105 may include a storage adapter (not depicted) capable of providing intercommunication with storage 3114.

Processor 3110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 3110 may be dual-core processor(s), dual-core mobile processor(s), and so forth.

Memory 3112 may be implemented as a volatile memory device such as, but not limited to, a Random Access Memory (RAM), Dynamic Random Access Memory (DRAM), or Static RAM (SRAM).

Storage 3114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 3114 may include technology to increase the storage performance enhanced protection for valuable digital media when multiple hard drives are included, for example.

Graphics subsystem 3115 may perform processing of images such as still or video for display. Graphics subsystem 3115 may be a graphics processing unit (GPU) or a visual processing unit (VPU), for example. An analog or digital interface may be used to communicatively couple graphics subsystem 3115 and display 3120. For example, the interface may be any of a High-Definition Multimedia Interface, DisplayPort, wireless HDMI, and/or wireless HD compliant techniques. Graphics subsystem 3115 may be integrated into processor 3110 or chipset 3105. In some implementations, graphics subsystem 3115 may be a stand-alone device communicatively coupled to chipset 3105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 3118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 3118 may operate in accordance with one or more applicable standards in any version.

In various implementations, display 3120 may include any television type monitor or display. Display 3120 may include, for example, a computer display screen, touch screen display, video monitor, television-like device, and/or a television. Display 3120 may be digital and/or analog. In various implementations, display 3120 may be a holographic display. Also, display 3120 may be a transparent surface that may receive a visual projection. Such projections may convey various forms of information, images, and/or objects. For example, such projections may be a visual overlay for a mobile augmented reality (MAR) application. Under the control of one or more software applications 3116, platform 3102 may display user interface 3122 on display 3120.

In various implementations, content services device(s) 3130 may be hosted by any national, international and/or independent service and thus accessible to platform 3102 via the Internet, for example. Content services device(s) 3130 may be coupled to platform 3102 and/or to display 3120. Platform 3102 and/or content services device(s) 3130 may be coupled to a network 3160 to communicate (e.g., send and/or receive) media information to and from network 3160. Content delivery device(s) 3140 also may be coupled to platform 3102 and/or to display 3120.

In various implementations, content services device(s) 3130 may include a cable television box, personal computer, network, telephone, Internet enabled devices or appliance capable of delivering digital information and/or content, and any other similar device capable of uni-directionally or bi-directionally communicating content between content providers and platform 3102 and/display 3120, via network 3160 or directly. It will be appreciated that the content may be communicated uni-directionally and/or bi-directionally to and from any one of the components in system 3100 and a content provider via network 3160. Examples of content may include any media information including, for example, video, music, medical and gaming information, and so forth.

Content services device(s) 3130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 3102 may receive control signals from navigation controller 3150 having one or more navigation features. The navigation features of controller 3150 may be used to interact with user interface 3122, for example. In various embodiments, navigation controller 3150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 3150 may be replicated on a display (e.g., display 3120) by movements of a pointer, cursor, focus ring, or other visual indicators displayed on the display. For example, under the control of software applications 3116, the navigation features located on navigation controller 3150 may be mapped to virtual navigation features displayed on user interface 3122, for example. In various embodiments, controller 3150 may not be a separate component but may be integrated into platform 3102 and/or display 3120. The present disclosure, however, is not limited to the elements or in the context shown or described herein.

In various implementations, drivers (not shown) may include technology to enable users to instantly turn on and off platform 3102 like a television with the touch of a button after initial boot-up, when enabled, for example. Program logic may allow platform 3102 to stream content to media adaptors or other content services device(s) 3130 or content delivery device(s) 3140 even when the platform is turned "off." In addition, chipset 3105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 3100 may be integrated. For example, platform 3102 and content services device(s) 3130 may be integrated, or platform 3102 and content delivery device(s) 3140 may be integrated, or platform 3102, content services device(s) 3130, and content delivery device(s) 3140 may be integrated, for example. In various embodiments, platform 3102 and display 3120 may be an integrated unit. Display 3120 and content service device(s) 3130 may be integrated, or display 3120 and content delivery device(s) 3140 may be integrated, for example. These examples are not meant to limit the present disclosure.

In various embodiments, system 3100 may be implemented as a wireless system, a wired system, or a combination of both. When implemented as a wireless system, system 3100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 3100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 3102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 31.

Figure 32:
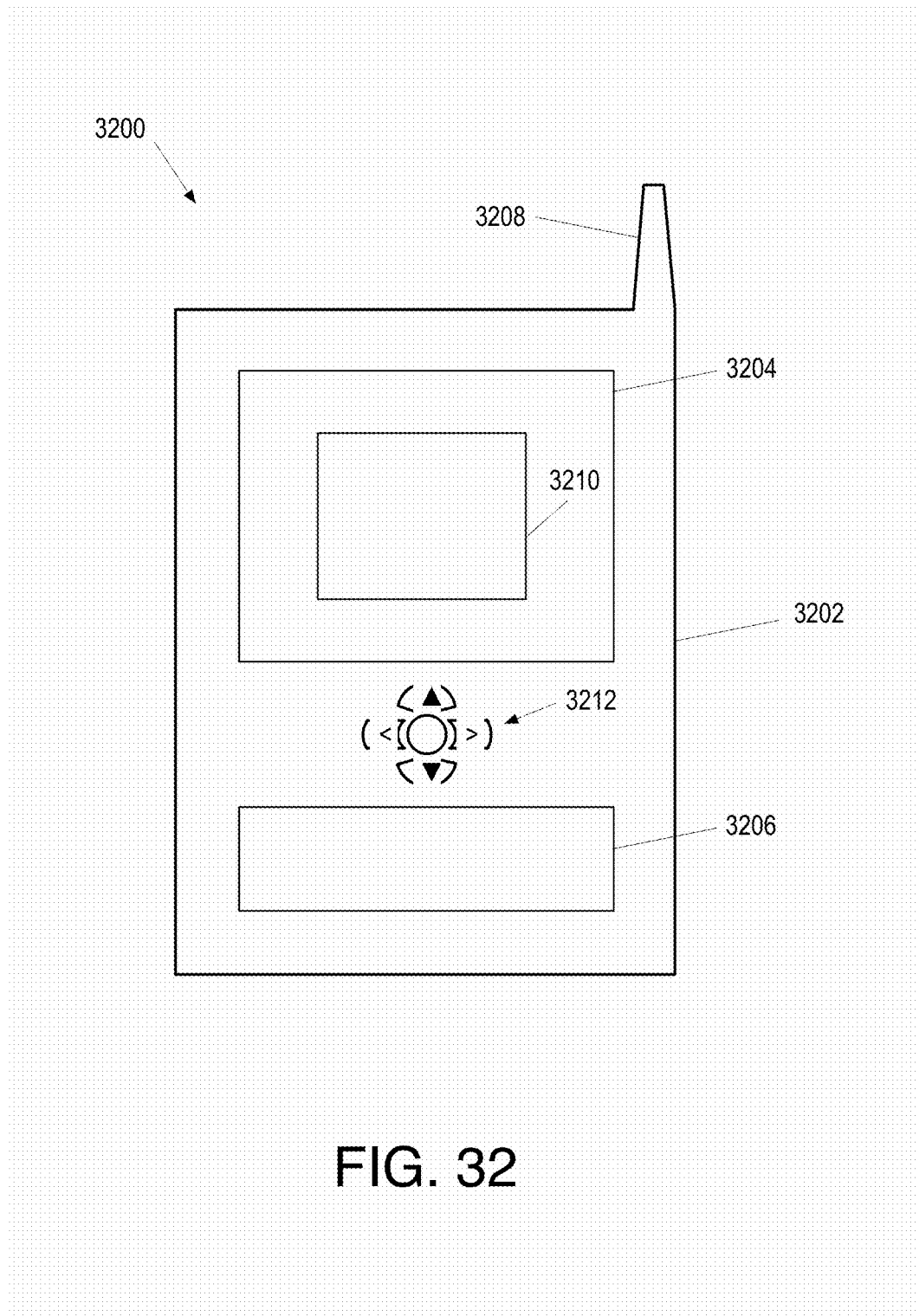
FIG. 32 illustrates an example device, all arranged in accordance with at least some implementations of the present disclosure.

As described above, system 3100 may be embodied in varying physical styles or form factors. FIG. 32 illustrates an example device, arranged in accordance with at least some implementations of the present disclosure. For example, FIG. 32 illustrates implementations of a small form factor device 3200 in which system 3100 may be embodied. In various embodiments, for example, device 3200 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 32, device 3200 may include a housing 3202, a display 3204, an input/output (I/O) device 3206, and an antenna 3208. Device 3200 also may include navigation features 3212. Display 3204 may include any suitable display unit for displaying information appropriate for a mobile computing device. Display 3204 may include a touchscreen region 3210 for receiving I/O commands. In some examples, touchscreen region 3210 may be substantially the same size as display 3204. I/O device 3206 may include any suitable I/O device for entering information into a mobile computing device. Examples for I/O device 3206 may include an alphanumeric keyboard, a numeric keypad, a touch pad, input keys, buttons, switches, rocker switches, microphones, speakers, voice recognition device and software, and so forth. Information also may be entered into device 3200 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a computer-implemented method for processing video for encoding and/or display comprises determining a frame format for a frame of a mixed content video stream comprising one or more video formats, determining a frame group format for a frame group of the mixed content video stream, wherein the frame group comprises the frame, determining a conversion technique for the frame group based at least in part on the frame group format, and converting the frame group to a final progressive format based on the determined conversion technique.

Further to the first embodiments, the video formats of the mixed content video stream comprise at least one of a progressive format, a true interlaced format, or a pseudo-interlaced telecine converted format.

Further to the first embodiments, the video formats of the mixed content video stream comprise at least one of a 60 frames per second progressive format, a 30 frames per second progressive format, a 30 frames per second true interlaced format, or a 30 frames per second pseudo-interlaced telecine converted format.

Further to the first embodiments, determining the frame format comprises content analysis of the frame, and wherein the frame format comprises at least one of progressive or interlaced.

Further to the first embodiments, determining the frame format comprises determining a plurality of descriptors associated with content of the frame, evaluating a plurality of comparison tests based on the plurality of descriptors, and determining the frame format based on the comparison tests, wherein the frame format comprises at least one of progressive or interlaced.

Further to the first embodiments, determining the frame format comprises determining a plurality of descriptors associated with content of the frame, evaluating a plurality of comparison tests based on the plurality of descriptors, and determining the frame format based on the comparison tests, wherein the frame format comprises at least one of progressive or interlaced, wherein the descriptors comprise at least one of a sum of absolute differences between pairs of fields of the frame, a sum of variable threshold differences between blocks of the frame and blocks of a top field of the frame, a thresholded count of blocks of the frame having a high texture value, a measure of a vertical texture of the frame, a measure of a difference between a dynamic texture and a static texture of the frame, a measure of a difference between a texture level of the frame and an average of texture levels of fields of the frame, or a sum of a static thresholded differences between blocks of the frame and blocks of the top field of the frame.

Further to the first embodiments, determining the frame format comprises determining a plurality of descriptors associated with content of the frame, evaluating, at a first stage, a plurality of comparison tests based on the plurality of descriptors, determining, at the first stage, whether the frame format is progressive, interlaced, or uncertain based on the comparison tests, evaluating, when the frame format is uncertain at the first stage, a second stage comprising machine learning based comparison tests, and determining, at the second stage, whether the frame format is progressive or interlaced based on the machine learning based comparison tests.

Further to the first embodiments, determining the frame format comprises content analysis of the frame, wherein the frame format comprises at least one of progressive or interlaced and/or determining a plurality of descriptors associated with content of the frame, evaluating a plurality of comparison tests based on the plurality of descriptors, and determining the frame format based on the comparison tests, wherein the frame format comprises at least one of progressive or interlaced and/or determining a plurality of second descriptors associated with content of the frame, evaluating, at a first stage, a plurality of second comparison tests based on the plurality of second descriptors, determining, at the first stage, whether the frame format is progressive, interlaced, or uncertain based on the second comparison tests, evaluating, when the frame format is uncertain at the first stage, a second stage comprising machine learning based comparison tests, and determining, at the second stage, whether the frame format is progressive or interlaced based on the machine learning based comparison tests.

Further to the first embodiments, determining the frame group format comprises content analysis of frames of the frame group, and wherein the frame group format comprises at least one of all progressive, all interlaced, or telecined.

Further to the first embodiments, determining the frame group format comprises at least one of determining all frames of the frame group are progressive, determining all frames of the frame group are interlaced, determining a telecine pattern of the frame group, or determining an undetected pattern of the frame group.

Further to the first embodiments, determining the frame group format comprises content analysis of frames of the frame group, wherein the frame group format comprises at least one of all progressive, all interlaced, or telecined and/or at least one of determining all frames of the frame group are progressive, determining all frames of the frame group are interlaced, determining a telecine pattern of the frame group, or determining an undetected pattern of the frame group.

Further to the first embodiments, determining the conversion technique comprises comparing the frame group format to a prior frame group format of a frame group prior to the frame group and a look-ahead frame group format for a frame group subsequent to the frame group.

Further to the first embodiments, determining the conversion technique comprises comparing the frame group format to a prior frame group format of a frame group prior to the frame group and a look-ahead frame group format for a frame group subsequent to the frame group, wherein the frame group, the frame group prior to the frame group, and the frame group subsequent to the frame group each comprise five frames.

Further to the first embodiments, determining the frame group format comprises at least one of determining all frames of the frame group are progressive, determining all frames of the frame group are interlaced, determining a telecine pattern of the frame group, or determining an undetected pattern of the frame group and wherein determining the conversion technique comprises comparing the frame group format to a prior frame group format of a frame group prior to the frame group and a look-ahead frame group format for a frame group subsequent to the frame group.

Further to the first embodiments, the frame group format comprises all progressive frames, wherein determining the conversion technique comprises determining a prior frame group format and a look-ahead frame group format comprise all progressive frames, and wherein the conversion technique comprises no conversion to generate final frames having the final progressive format.

Further to the first embodiments, the frame group format comprises all interlaced frames, wherein determining the conversion technique comprises determining a prior frame group format and a look-ahead frame group format comprise all interlaced frames, and wherein the conversion technique comprises an adaptive deinterlacing technique.

Further to the first embodiments, the frame group format comprises all interlaced frames, wherein determining the conversion technique comprises determining a prior frame group format and a look-ahead frame group format comprise all interlaced frames, and wherein the conversion technique comprises an adaptive deinterlacing technique, wherein the adaptive deinterlacing technique comprises generating missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

Further to the first embodiments, the frame group format comprises all interlaced frames, wherein determining the conversion technique comprises determining a prior frame group format and a look-ahead frame group format comprise all interlaced frames, and wherein the conversion technique comprises an adaptive deinterlacing technique, the adaptive deinterlacing technique comprising generating missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

Further to the first embodiments, the frame group format comprises an individual telecine pattern, wherein determining the conversion technique comprises determining a prior frame group format and a look-ahead frame group format comprise the individual telecine pattern, and wherein the conversion technique comprises an adaptive telecine pattern reversal technique.

Further to the first embodiments, the frame group format comprises an individual telecine pattern, wherein determining the conversion technique comprises determining a prior frame group format and a look-ahead frame group format comprise the individual telecine pattern, and wherein the conversion technique comprises an adaptive telecine pattern reversal technique, wherein the individual telecine pattern comprises at least one of a 3:2 pull down pattern, a 2:3:3:2 pull down pattern, a 4:1 pull down pattern, or a blended pattern.

Further to the first embodiments, the frame group format comprises an individual telecine pattern, wherein determining the conversion technique comprises determining a prior frame group format and a look-ahead frame group format comprise the individual telecine pattern, and wherein the conversion technique comprises an adaptive telecine pattern reversal technique, wherein the adaptive telecine pattern reversal technique comprises verifying the individual telecine pattern, checking pattern parity, and reversing the individual telecine pattern to generate final frames having the final progressive format at 24 frames per second.

Further to the first embodiments, the frame group format comprises an individual telecine pattern, wherein determining the conversion technique comprises determining a prior frame group format and a look-ahead frame group format comprise the individual telecine pattern, wherein the conversion technique comprises an adaptive telecine pattern reversal technique, and wherein the individual telecine pattern comprises at least one of a 3:2 pull down pattern, a 2:3:3:2 pull down pattern, a 4:1 pull down pattern, or a blended pattern.

Further to the first embodiments, the frame group format comprises an undetected pattern, and wherein the conversion technique comprises an adaptive telecine pattern reversal technique.

Further to the first embodiments, the frame group format comprises an undetected pattern, and wherein the conversion technique comprises an adaptive telecine pattern reversal technique, wherein the adaptive telecine pattern reversal technique comprises generating missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

Further to the first embodiments, the frame group format comprises an undetected pattern, and wherein the conversion technique comprises an adaptive telecine pattern reversal technique, wherein the adaptive telecine pattern reversal technique generates final frames having the final progressive format at 24 frames per second.

Further to the first embodiments, the frame group format comprises an undetected pattern, and wherein the conversion technique comprises an adaptive telecine pattern reversal technique comprising generating missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

Further to the first embodiments, the frame group comprises an interlaced frame and a telecined frame, and wherein determining the frame group format comprises evaluating a plurality of comparison tests, wherein at least a first comparison test is based on comparing measures of local texture of the frames of the frame groups and at least a second comparison test is based on comparing a sum of absolute differences between fields of an individual frame of the frame group to a sum of absolute differences between a field of the individual frame and another frame of the frame group.

Further to the first embodiments, the frame group comprises an interlaced frame and a telecined frame, and wherein determining the frame group format comprises evaluating at least one comparison test, wherein the comparison test is based on comparing a sum of static thresholded differences between blocks of an individual frame of the frame group to sum of static thresholded differences between blocks of another frame of the frame group.

Further to the first embodiments, the frame group comprises an interlaced frame and a telecined frame, and wherein determining the frame group format comprises evaluating a plurality of comparison tests, wherein at least a comparison test is based on comparing measures of local texture of the frames of the frame groups and at least a second comparison test is based on comparing a sum of absolute differences between fields of an individual frame of the frame group to a sum of absolute differences between a field of the individual frame and another frame of the frame group and/or evaluating at least one comparison test, wherein the comparison test is based on comparing a sum of static thresholded differences between blocks of an individual frame of the frame group to sum of static thresholded differences between blocks of another frame of the frame group.

Further to the first embodiments, the method further comprises determining a second frame format for a second frame of the mixed content video stream, determining a second frame group format for the second frame group of the mixed content video stream, wherein the second frame group comprises the second frame, and wherein the frame group format and the second frame group format are different, determining a second conversion technique for the second frame group based at least in part on the frame group format, wherein first conversion technique and the second conversion technique are different, and converting the second frame group to a second final progressive format based on the second determined conversion technique.

Further to the first embodiments, determining the frame format and the frame group format comprises decoding headers associated with the mixed content video stream, wherein the mixed content video stream comprises an aggregated transport stream, and wherein decoding the headers comprises demultiplexing individual channels of the aggregated transport stream, decoding a first individual channel to generate the mixed content video stream and the headers, the headers comprising the frame format and the frame group format.

In one or more second embodiments, a computer-implemented method for processing video for encoding and/or display comprises receiving a mixed content video stream comprising a plurality of video formats comprising at least a true interlaced format and a pseudo-interlaced telecine converted format, determining a first conversion technique for a first segment of the mixed content video stream having the true interlaced format and a second conversion technique for a second segment of the mixed content video stream having the telecined format, wherein the first and second conversion techniques are different, and converting the mixed content video stream to a progressive video stream based at least in part on the first conversion technique and the second conversion technique.

Further to the second embodiments, the first conversion technique comprises a content adaptive deinterlacer.

Further to the second embodiments, the second conversion technique comprises an adaptive telecine pattern reverser technique.

Further to the second embodiments, the first conversion technique comprises a content adaptive deinterlacer and the second conversion technique comprises an adaptive telecine pattern reverser technique.

Further to the second embodiments, determining the first conversion technique comprises determining a first frame format of a first frame of the first segment and a first frame group format of the first segment.

Further to the second embodiments, determining the first conversion technique comprises determining a first frame format of a first frame of the first segment and a first frame group format of the first segment, wherein determining the first frame format comprises determining a plurality of descriptors associated with content of the first frame, evaluating a plurality of comparison tests based on the plurality of descriptors, and determining the first frame format based on the comparison tests, wherein the first frame format comprises an interlaced frame.

Further to the second embodiments, determining the first conversion technique comprises determining a first frame format of a first frame of the first segment and a first frame group format of the first segment, wherein determining the first frame format comprises determining a plurality of descriptors associated with content of the first frame, evaluating, at a first stage, a plurality of comparison tests based on the plurality of descriptors, determining, at the first stage, whether the first frame format is progressive, interlaced, or uncertain based on the comparison tests, evaluating, when the first frame format is uncertain at the first stage, a second stage comprising machine learning based comparison tests, and determining, at the second stage, the first frame is interlaced based on the machine learning based comparison tests.

Further to the second embodiments, determining the first conversion technique comprises determining a first frame format of a first frame of the first segment and a first frame group format of the first segment, wherein the first frame format comprises all interlaced frames, and wherein determining the first conversion technique further comprises comparing the first segment to a prior frame group format of a frame group prior to the first frame group and a look-ahead frame group format for a frame group subsequent to the first frame group.

Further to the second embodiments, determining the second conversion technique comprises determining an individual telecine pattern of the second segment and wherein converting the mixed content video stream comprises reversing the individual telecine pattern.

Further to the second embodiments, determining the second conversion technique comprises determining an individual telecine pattern of the second segment and wherein converting the mixed content video stream comprises reversing the individual telecine pattern, wherein the individual telecine pattern comprises at least one of a 3:2 pull down pattern, a 2:3:3:2 pull down pattern, a 4:1 pull down pattern or a blended pattern.

Further to the second embodiments, determining the second conversion technique comprises determining an individual telecine pattern of the second segment, wherein converting the mixed content video stream comprises reversing the individual telecine pattern, and wherein the individual telecine pattern comprises at least one of a 3:2 pull down pattern, a 2:3:3:2 pull down pattern, a 4:1 pull down pattern or a blended pattern.

Further to the second embodiments, determining the second conversion technique comprises determining the second segment has an undetected pattern and wherein converting the mixed content video stream comprises applying an adaptive interlace reverser to the second segment.

Further to the second embodiments, the method further comprises determining a third segment of the mixed content video stream comprises a progressive format and providing the progressive format video segment as output with no conversion.

In one or more third embodiments, a system for processing video for encoding and/or display comprises a memory buffer configured to store video frames and a central processing unit coupled to the memory buffer, wherein the central processing unit comprises a frame classifier module configured to determine a frame format for a frame of a mixed content video stream comprising one or more video formats, a frame group classifier module determine a frame group format for a frame group of the mixed content video stream, wherein the frame group comprises the frame, an adaptive interlace reverser module configured to, when the frame group format comprises an interlaced format, convert the frame group to a first final progressive format, and an adaptive telecine reverser module configured to, when the frame group comprises a pseudo-interlaced telecine converted format, convert the frame group to a second final progressive format.

Further to the third embodiments, the frame classifier module and the frame group classifier module are configured to determine the frame format prior to the frame group format, and wherein the memory buffer is configured to buffer the frame group, a frame group prior to the frame group, and a frame group subsequent to the frame, the frame group, the frame group prior to the frame group, and the frame group subsequent to the frame group each comprising five frames.

Further to the third embodiments, the video formats of the mixed content video stream comprise at least one of a progressive format, a true interlaced format, or a pseudo-interlaced telecine converted format.

Further to the third embodiments, the video formats of the mixed content video stream comprise at least one of a 60 frames per second progressive format, a 30 frames per second progressive format, a 30 frames per second true interlaced format, or a 30 frames per second pseudo-interlaced telecine converted format.

Further to the third embodiments, the frame classifier module is configured determine the frame format via content analysis of the frame, and wherein the frame format comprises at least one of progressive or interlaced.

Further to the third embodiments, the frame classifier module is configured determine the frame format by the frame classifier module being configured to determine a plurality of descriptors associated with content of the frame, evaluate a plurality of comparison tests based on the plurality of descriptors, and determine the frame format based on the comparison tests, wherein the frame format comprises at least one of progressive or interlaced.

Further to the third embodiments, the frame classifier module is configured determine the frame format by the frame classifier module being configured to determine a plurality of descriptors associated with content of the frame, evaluate a plurality of comparison tests based on the plurality of descriptors, and determine the frame format based on the comparison tests, wherein the frame format comprises at least one of progressive or interlaced, wherein the descriptors comprise at least one of a sum of absolute differences between pairs of fields of the frame, a sum of variable threshold differences between blocks of the frame and blocks of a top field of the frame, a thresholded count of blocks of the frame having a high texture value, a measure of a vertical texture of the frame, a measure of a difference between a dynamic texture and a static texture of the frame, a measure of a difference between a texture level of the frame and an average of texture levels of fields of the frame, or a sum of a static thresholded differences between blocks of the frame and blocks of the top field of the frame.

Further to the third embodiments, the frame classifier module is configured determine the frame format by the frame classifier module being configured to determine a plurality of descriptors associated with content of the frame, evaluate, at a first stage, a plurality of comparison tests based on the plurality of descriptors, determine, at the first stage, whether the frame format is progressive, interlaced, or uncertain based on the comparison tests, evaluate, when the frame format is uncertain at the first stage, a second stage comprising machine learning based comparison tests, and determine, at the second stage, whether the frame format is progressive or interlaced based on the machine learning based comparison tests.

Further to the third embodiments, the frame classifier module is configured determine the frame format by the frame classifier module being configured to determine a plurality of descriptors associated with content of the frame, evaluate a plurality of comparison tests based on the plurality of descriptors, and determine the frame format based on the comparison tests, wherein the frame format comprises at least one of progressive or interlaced and/or determine a plurality of second descriptors associated with content of the frame, evaluate, at a first stage, a plurality of second comparison tests based on the plurality of descriptors, determine, at the first stage, whether the frame format is progressive, interlaced, or uncertain based on the second comparison tests, evaluate, when the frame format is uncertain at the first stage, a second stage comprising machine learning based comparison tests, and determine, at the second stage, whether the frame format is progressive or interlaced based on the machine learning based comparison tests.

Further to the third embodiments, the frame group classifier module is configured to determine the frame group format via content analysis of frames of the frame group, and wherein the frame group format comprises at least one of all progressive, all interlaced, or telecined.

Further to the third embodiments, the frame group classifier module is configured to determine the frame group format comprises at least one of all frames of the frame group are progressive, all frames of the frame group are interlaced, the frame group has a telecine pattern, or the frame group has an undetected pattern.

Further to the third embodiments, the frame group classifier module is configured to determine the frame group format by the frame group classifier module being configured to compare the frame group format to a prior frame group format of a frame group prior to the frame group and a look-ahead frame group format for a frame group subsequent to the frame group.

Further to the third embodiments, the frame group classifier module is configured to determine the frame group format by the frame group classifier module being configured to compare the frame group format to a prior frame group format of a frame group prior to the frame group and a look-ahead frame group format for a frame group subsequent to the frame group, wherein the frame group, the frame group prior to the frame group, and the frame group subsequent to the frame group each comprise five frames.

Further to the third embodiments, the frame group format comprises all progressive frames, wherein the frame group classifier module is configured determine a prior frame group format and a look-ahead frame group format both comprising all progressive frames, and wherein the system is configured to output the frame group with no conversion to generate final frames.

Further to the third embodiments, the frame group format comprises all interlaced frames, wherein the frame group classifier module is configured determine a prior frame group format and a look-ahead frame group format both comprising all interlaced frames, and wherein the frame group format comprises the interlaced format.

Further to the third embodiments, the adaptive interlace reverser module is configured to generate missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

Further to the third embodiments, the frame group format comprises an individual telecine pattern, wherein the frame group classifier module is configured determine a prior frame group format and a look-ahead frame group format both comprising the individual telecine pattern, and wherein the frame group format comprises the pseudo-interlaced telecine converted format.

Further to the third embodiments, the frame group format comprises an individual telecine pattern, wherein the frame group classifier module is configured determine a prior frame group format and a look-ahead frame group format both comprising the individual telecine pattern, and wherein the frame group format comprises the pseudo-interlaced telecine converted format, wherein the individual telecine pattern comprises at least one of a 3:2 pull down pattern, a 2:3:3:2 pull down pattern, a 4:1 pull down pattern, or a blended pattern.

Further to the third embodiments, the frame group format comprises an individual telecine pattern, wherein the frame group classifier module is configured determine a prior frame group format and a look-ahead frame group format both comprising the individual telecine pattern, and wherein the frame group format comprises the pseudo-interlaced telecine converted format, wherein the adaptive interlace reverser module is configured to verify the individual telecine pattern, check pattern parity, and reverse the individual telecine pattern to generate final frames having the final progressive format at 24 frames per second.

Further to the third embodiments, the frame group format comprises an individual telecine pattern, wherein the frame group classifier module is configured determine a prior frame group format and a look-ahead frame group format both comprising the individual telecine pattern, wherein the frame group format comprises the pseudo-interlaced telecine converted format, wherein the individual telecine pattern comprises at least one of a 3:2 pull down pattern, a 2:3:3:2 pull down pattern, a 4:1 pull down pattern, or a blended pattern, and wherein the adaptive interlace reverser module is configured to verify the individual telecine pattern, check pattern parity, and reverse the individual telecine pattern to generate final frames having the final progressive format at 24 frames per second.

Further to the third embodiments, the frame group format comprises an undetected pattern, and wherein the adaptive interlace reverser module is configured to convert the frame group to a third final progressive format.

Further to the third embodiments, the frame group format comprises an undetected pattern, and wherein the adaptive interlace reverser module is configured to convert the frame group to a third final progressive format, wherein the adaptive telecine pattern reversal module is configured to generate missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

Further to the third embodiments, the frame group format comprises an undetected pattern, and wherein the adaptive interlace reverser module is configured to convert the frame group to a third final progressive format by the adaptive telecine pattern reversal module being configured to generate missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

Further to the third embodiments, the frame group comprises an interlaced frame and a telecined frame, and wherein the frame group classifier module being configured to determine the frame group format comprises the frame group classifier module being configured to evaluate a plurality of comparison tests, wherein at least a first comparison test is based on comparing measures of local texture of the frames of the frame groups and at least a second comparison test is based on comparing a sum of absolute differences between fields of an individual frame of the frame group to a sum of absolute differences between a field of the individual frame and another frame of the frame group.

In one or more fourth embodiments, a system for processing video for encoding and/or display comprises means for determining a frame format for a frame of a mixed content video stream comprising one or more video formats, means for determining a frame group format for a frame group of the mixed content video stream, wherein the frame group comprises the frame, means for determining a conversion technique for the frame group based at least in part on the frame group format, and means for converting the frame group to a final progressive format based on the determined conversion technique.

Further to the fourth embodiments, the video formats of the mixed content video stream comprise at least one of a 60 frames per second progressive format, a 30 frames per second progressive format, a 30 frames per second true interlaced format, or a 30 frames per second pseudo-interlaced telecine converted format.

Further to the fourth embodiments, determining the frame format comprises content analysis of the frame, and wherein the frame format comprises at least one of progressive or interlaced.

Further to the fourth embodiments, the means for determining the frame format comprise means for determining a plurality of descriptors associated with content of the frame, means for evaluating a plurality of comparison tests based on the plurality of descriptors, and means for determining the frame format based on the comparison tests, wherein the frame format comprises at least one of progressive or interlaced.

Further to the fourth embodiments, wherein the means for determining the frame format comprise means for determining a plurality of descriptors associated with content of the frame, means for evaluating, at a first stage, a plurality of comparison tests based on the plurality of descriptors, means for determining, at the first stage, whether the frame format is progressive, interlaced, or uncertain based on the comparison tests, means for evaluating, when the frame format is uncertain at the first stage, a second stage comprising machine learning based comparison tests, and means for determining, at the second stage, whether the frame format is progressive or interlaced based on the machine learning based comparison tests.

Further to the fourth embodiments, determining the frame group format comprises content analysis of frames of the frame group, and wherein the frame group format comprises at least one of all progressive, all interlaced, or telecined.

Further to the fourth embodiments, determining the frame group format comprises at least one of determining all frames of the frame group are progressive, determining all frames of the frame group are interlaced, determining a telecine pattern of the frame group, or determining an undetected pattern of the frame group.

Further to the fourth embodiments, determining the frame group format comprises at least one of determining all frames of the frame group are progressive, determining all frames of the frame group are interlaced, determining a telecine pattern of the frame group, or determining an undetected pattern of the frame group and wherein determining the conversion technique comprises comparing the frame group format to a prior frame group format of a frame group prior to the frame group and a look-ahead frame group format for a frame group subsequent to the frame group.

Further to the fourth embodiments, determining the frame group format comprises at least one of determining all frames of the frame group are progressive, determining all frames of the frame group are interlaced, determining a telecine pattern of the frame group, or determining an undetected pattern of the frame group and wherein determining the conversion technique comprises comparing the frame group format to a prior frame group format of a frame group prior to the frame group and a look-ahead frame group format for a frame group subsequent to the frame group, the frame group format comprises all progressive frames, wherein determining the conversion technique comprises determining a prior frame group format and a look-ahead frame group format comprise all progressive frames, and wherein the conversion technique comprises no conversion to generate final frames having the final progressive format.

Further to the fourth embodiments, the frame group format comprises all interlaced frames, wherein determining the conversion technique comprises determining a prior frame group format and a look-ahead frame group format comprise all interlaced frames, and wherein the conversion technique comprises an adaptive deinterlacing technique.

Further to the fourth embodiments, the frame group format comprises all interlaced frames, wherein determining the conversion technique comprises determining a prior frame group format and a look-ahead frame group format comprise all interlaced frames, and wherein the conversion technique comprises an adaptive deinterlacing technique, wherein the adaptive deinterlacing technique comprises generating missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

Further to the fourth embodiments, the frame group format comprises an individual telecine pattern, wherein determining the conversion technique comprises determining a prior frame group format and a look-ahead frame group format comprise the individual telecine pattern, wherein the conversion technique comprises an adaptive telecine pattern reversal technique, and wherein the individual telecine pattern comprises at least one of a 3:2 pull down pattern, a 2:3:3:2 pull down pattern, a 4:1 pull down pattern, or a blended pattern.

Further to the fourth embodiments, the frame group format comprises an undetected pattern, and wherein the conversion technique comprises an adaptive telecine pattern reversal technique comprising generating missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

Further to the fourth embodiments, the frame group comprises an interlaced frame and a telecined frame, and wherein the means for determining the frame group format comprise means for evaluating a plurality of comparison tests, wherein at least a comparison test is based on comparing measures of local texture of the frames of the frame groups and at least a second comparison test is based on comparing a sum of absolute differences between fields of an individual frame of the frame group to a sum of absolute differences between a field of the individual frame and another frame of the frame group.

Further to the fourth embodiments, the frame group comprises an interlaced frame and a telecined frame, and wherein the means for determining the frame group format comprise means for evaluating at least one comparison test, wherein the comparison test is based on comparing a sum of static thresholded differences between blocks of an individual frame of the frame group to sum of static thresholded differences between blocks of another frame of the frame group.

In one or more fifth embodiments, a system for processing video for encoding and/or display comprises means for receiving a mixed content video stream comprising a plurality of video formats comprising at least a true interlaced format and a pseudo-interlaced telecine converted format, means for determining a first conversion technique for a first segment of the mixed content video stream having the true interlaced format and a second conversion technique for a second segment of the mixed content video stream having the telecined format, wherein the first and second conversion techniques are different, and means for converting the mixed content video stream to a progressive video stream based at least in part on the first conversion technique and the second conversion technique.

Further to the fifth embodiments, the first conversion technique comprises a content adaptive deinterlacer and the second conversion technique comprises an adaptive telecine pattern reverser technique.

Further to the fifth embodiments, determining the first conversion technique comprises determining a first frame format of a first frame of the first segment and a first frame group format of the first segment.

Further to the fifth embodiments, determining the first conversion technique comprises determining a first frame format of a first frame of the first segment and a first frame group format of the first segment, wherein the means for determining the first frame format comprise means for determining a plurality of descriptors associated with content of the first frame, means for evaluating a plurality of comparison tests based on the plurality of descriptors, and means for determining the first frame format based on the comparison tests, wherein the first frame format comprises an interlaced frame.

Further to the fifth embodiments, determining the first conversion technique comprises determining a first frame format of a first frame of the first segment and a first frame group format of the first segment, wherein the means for determining the first frame format comprise means for determining a plurality of descriptors associated with content of the first frame, means for evaluating, at a first stage, a plurality of comparison tests based on the plurality of descriptors, means for determining, at the first stage, whether the first frame format is progressive, interlaced, or uncertain based on the comparison tests, means for evaluating, when the first frame format is uncertain at the first stage, a second stage comprising machine learning based comparison tests, and means for determining, at the second stage, the first frame is interlaced based on the machine learning based comparison tests.

Further to the fifth embodiments, determining the second conversion technique comprises determining an individual telecine pattern of the second segment, wherein converting the mixed content video stream comprises reversing the individual telecine pattern, and wherein the individual telecine pattern comprises at least one of a 3:2 pull down pattern, a 2:3:3:2 pull down pattern, a 4:1 pull down pattern or a blended pattern.

Further to the fifth embodiments, determining the second conversion technique comprises determining the second segment has an undetected pattern and wherein converting the mixed content video stream comprises applying an adaptive interlace reverser to the second segment.

Further to the fifth embodiments, the system further comprises means for determining a third segment of the mixed content video stream comprises a progressive format and means for providing the progressive format video segment as output with no conversion.

In one or more sixth embodiments, at least one machine readable medium comprises a plurality of instructions that, in response to being executed on a computing device, cause the computing device to process video for encoding and/or display by determining a frame format for a frame of a mixed content video stream comprising one or more video formats, determining a frame group format for a frame group of the mixed content video stream, wherein the frame group comprises the frame, determining a conversion technique for the frame group based at least in part on the frame group format, and converting the frame group to a final progressive format based on the determined conversion technique.

Further to the sixth embodiments, the video formats of the mixed content video stream comprise at least one of a progressive format, a true interlaced format, or a pseudo-interlaced telecine converted format.

Further to the sixth embodiments, the video formats of the mixed content video stream comprise at least one of a 60 frames per second progressive format, a 30 frames per second progressive format, a 30 frames per second true interlaced format, or a 30 frames per second pseudo-interlaced telecine converted format.

Further to the sixth embodiments, determining the frame format comprises content analysis of the frame, and wherein the frame format comprises at least one of progressive or interlaced.

Further to the sixth embodiments, determining the frame format comprises determining a plurality of descriptors associated with content of the frame, evaluating a plurality of comparison tests based on the plurality of descriptors, and determining the frame format based on the comparison tests, wherein the frame format comprises at least one of progressive or interlaced.

Further to the sixth embodiments, determining the frame format comprises determining a plurality of descriptors associated with content of the frame, evaluating a plurality of comparison tests based on the plurality of descriptors, and determining the frame format based on the comparison tests, wherein the frame format comprises at least one of progressive or interlaced, wherein the descriptors comprise at least one of a sum of absolute differences between pairs of fields of the frame, a sum of variable threshold differences between blocks of the frame and blocks of a top field of the frame, a thresholded count of blocks of the frame having a high texture value, a measure of a vertical texture of the frame, a measure of a difference between a dynamic texture and a static texture of the frame, a measure of a difference between a texture level of the frame and an average of texture levels of fields of the frame, or a sum of a static thresholded differences between blocks of the frame and blocks of the top field of the frame.

Further to the sixth embodiments, determining the frame format comprises determining a plurality of descriptors associated with content of the frame, evaluating, at a first stage, a plurality of comparison tests based on the plurality of descriptors, determining, at the first stage, whether the frame format is progressive, interlaced, or uncertain based on the comparison tests, evaluating, when the frame format is uncertain at the first stage, a second stage comprising machine learning based comparison tests, and determining, at the second stage, whether the frame format is progressive or interlaced based on the machine learning based comparison tests.

Further to the sixth embodiments, determining the frame group format comprises content analysis of frames of the frame group, and wherein the frame group format comprises at least one of all progressive, all interlaced, or telecined.

Further to the sixth embodiments, determining the frame group format comprises at least one of determining all frames of the frame group are progressive, determining all frames of the frame group are interlaced, determining a telecine pattern of the frame group, or determining an undetected pattern of the frame group.

Further to the sixth embodiments, determining the conversion technique comprises comparing the frame group format to a prior frame group format of a frame group prior to the frame group and a look-ahead frame group format for a frame group subsequent to the frame group.

Further to the sixth embodiments, determining the conversion technique comprises comparing the frame group format to a prior frame group format of a frame group prior to the frame group and a look-ahead frame group format for a frame group subsequent to the frame group, wherein the frame group, the frame group prior to the frame group, and the frame group subsequent to the frame group each comprise five frames.

Further to the sixth embodiments, determining the frame group format comprises at least one of determining all frames of the frame group are progressive, determining all frames of the frame group are interlaced, determining a telecine pattern of the frame group, or determining an undetected pattern of the frame group and wherein determining the conversion technique comprises comparing the frame group format to a prior frame group format of a frame group prior to the frame group and a look-ahead frame group format for a frame group subsequent to the frame group.

Further to the sixth embodiments, the frame group format comprises all progressive frames, wherein determining the conversion technique comprises determining a prior frame group format and a look-ahead frame group format comprise all progressive frames, and wherein the conversion technique comprises no conversion to generate final frames having the final progressive format.

Further to the sixth embodiments, the frame group format comprises all interlaced frames, wherein determining the conversion technique comprises determining a prior frame group format and a look-ahead frame group format comprise all interlaced frames, and wherein the conversion technique comprises an adaptive deinterlacing technique.

Further to the sixth embodiments, the frame group format comprises all interlaced frames, wherein determining the conversion technique comprises determining a prior frame group format and a look-ahead frame group format comprise all interlaced frames, and wherein the conversion technique comprises an adaptive deinterlacing technique, wherein the adaptive deinterlacing technique comprises generating missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

Further to the sixth embodiments, the frame group format comprises an individual telecine pattern, wherein determining the conversion technique comprises determining a prior frame group format and a look-ahead frame group format comprise the individual telecine pattern, and wherein the conversion technique comprises an adaptive telecine pattern reversal technique.

Further to the sixth embodiments, the frame group format comprises an individual telecine pattern, wherein determining the conversion technique comprises determining a prior frame group format and a look-ahead frame group format comprise the individual telecine pattern, and wherein the conversion technique comprises an adaptive telecine pattern reversal technique, wherein the individual telecine pattern comprises at least one of a 3:2 pull down pattern, a 2:3:3:2 pull down pattern, a 4:1 pull down pattern, or a blended pattern.

Further to the sixth embodiments, the frame group format comprises an individual telecine pattern, wherein determining the conversion technique comprises determining a prior frame group format and a look-ahead frame group format comprise the individual telecine pattern, and wherein the conversion technique comprises an adaptive telecine pattern reversal technique, wherein the adaptive telecine pattern reversal technique comprises verifying the individual telecine pattern, checking pattern parity, and reversing the individual telecine pattern to generate final frames having the final progressive format at 24 frames per second.

Further to the sixth embodiments, the frame group format comprises an individual telecine pattern, wherein determining the conversion technique comprises determining a prior frame group format and a look-ahead frame group format comprise the individual telecine pattern, wherein the conversion technique comprises an adaptive telecine pattern reversal technique, and wherein the individual telecine pattern comprises at least one of a 3:2 pull down pattern, a 2:3:3:2 pull down pattern, a 4:1 pull down pattern, or a blended pattern.

Further to the sixth embodiments, the frame group format comprises an undetected pattern, and wherein the conversion technique comprises an adaptive telecine pattern reversal technique.

Further to the sixth embodiments, the frame group format comprises an undetected pattern, and wherein the conversion technique comprises an adaptive telecine pattern reversal technique, wherein the adaptive telecine pattern reversal technique comprises generating missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

Further to the sixth embodiments, wherein the frame group format comprises an undetected pattern, and wherein the conversion technique comprises an adaptive telecine pattern reversal technique, wherein the adaptive telecine pattern reversal technique generates final frames having the final progressive format at 24 frames per second.

Further to the sixth embodiments, the frame group format comprises an undetected pattern, and wherein the conversion technique comprises an adaptive telecine pattern reversal technique comprising generating missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

Further to the sixth embodiments, the frame group comprises an interlaced frame and a telecined frame, and wherein determining the frame group format comprises evaluating a plurality of comparison tests, wherein at least a first comparison test is based on comparing measures of local texture of the frames of the frame groups and at least a second comparison test is based on comparing a sum of absolute differences between fields of an individual frame of the frame group to a sum of absolute differences between a field of the individual frame and another frame of the frame group.

Further to the sixth embodiments, the frame group comprises an interlaced frame and a telecined frame, and wherein determining the frame group format comprises evaluating at least one comparison test, wherein the comparison test is based on comparing a sum of static thresholded differences between blocks of an individual frame of the frame group to sum of static thresholded differences between blocks of another frame of the frame group.

Further to the sixth embodiments, the machine readable medium further comprises instructions that, in response to being executed on a computing device, cause the computing device to process video for encoding and/or display by determining a second frame format for a second frame of the mixed content video stream, determining a second frame group format for the second frame group of the mixed content video stream, wherein the second frame group comprises the second frame, and wherein the frame group format and the second frame group format are different, determining a second conversion technique for the second frame group based at least in part on the frame group format, wherein first conversion technique and the second conversion technique are different, and converting the second frame group to a second final progressive format based on the second determined conversion technique.

Further to the sixth embodiments, determining the frame format and the frame group format comprises decoding headers associated with the mixed content video stream, wherein the mixed content video stream comprises an aggregated transport stream, and wherein decoding the headers comprises demultiplexing individual channels of the aggregated transport stream, decoding a first individual channel to generate the mixed content video stream and the headers, the headers comprising the frame format and the frame group format.

In one or more seventh embodiments, at least one machine readable medium comprises a plurality of instructions that, in response to being executed on a computing device, cause the computing device to process video for encoding and/or display by receiving a mixed content video stream comprising a plurality of video formats comprising at least a true interlaced format and a pseudo-interlaced telecine converted format, determining a first conversion technique for a first segment of the mixed content video stream having the true interlaced format and a second conversion technique for a second segment of the mixed content video stream having the telecined format, wherein the first and second conversion techniques are different, converting the mixed content video stream to a progressive video stream based at least in part on the first conversion technique and the second conversion technique.

Further to the seventh embodiments, the first conversion technique comprises a content adaptive deinterlacer.

Further to the seventh embodiments, wherein the second conversion technique comprises an adaptive telecine pattern reverser technique.

Further to the seventh embodiments, the first conversion technique comprises a content adaptive deinterlacer and the second conversion technique comprises an adaptive telecine pattern reverser technique.

Further to the seventh embodiments, determining the first conversion technique comprises determining a first frame format of a first frame of the first segment and a first frame group format of the first segment.

Further to the seventh embodiments, determining the first conversion technique comprises determining a first frame format of a first frame of the first segment and a first frame group format of the first segment, wherein determining the first frame format comprises determining a plurality of descriptors associated with content of the first frame, evaluating a plurality of comparison tests based on the plurality of descriptors, and determining the first frame format based on the comparison tests, wherein the first frame format comprises an interlaced frame.

Further to the seventh embodiments, determining the first conversion technique comprises determining a first frame format of a first frame of the first segment and a first frame group format of the first segment, wherein determining the first frame format comprises determining a plurality of descriptors associated with content of the first frame, evaluating, at a first stage, a plurality of comparison tests based on the plurality of descriptors, determining, at the first stage, whether the first frame format is progressive, interlaced, or uncertain based on the comparison tests, evaluating, when the first frame format is uncertain at the first stage, a second stage comprising machine learning based comparison tests, and determining, at the second stage, the first frame is interlaced based on the machine learning based comparison tests.

Further to the seventh embodiments, determining the first conversion technique comprises determining a first frame format of a first frame of the first segment and a first frame group format of the first segment, wherein the first frame format comprises all interlaced frames, and wherein determining the first conversion technique further comprises comparing the first segment to a prior frame group format of a frame group prior to the first frame group and a look-ahead frame group format for a frame group subsequent to the first frame group.

Further to the seventh embodiments, determining the second conversion technique comprises determining an individual telecine pattern of the second segment and wherein converting the mixed content video stream comprises reversing the individual telecine pattern, Further to the seventh embodiments, determining the second conversion technique comprises determining an individual telecine pattern of the second segment and wherein converting the mixed content video stream comprises reversing the individual telecine pattern, wherein the individual telecine pattern comprises at least one of a 3:2 pull down pattern, a 2:3:3:2 pull down pattern, a 4:1 pull down pattern or a blended pattern.

Further to the seventh embodiments, determining the second conversion technique comprises determining an individual telecine pattern of the second segment, wherein converting the mixed content video stream comprises reversing the individual telecine pattern, and wherein the individual telecine pattern comprises at least one of a 3:2 pull down pattern, a 2:3:3:2 pull down pattern, a 4:1 pull down pattern or a blended pattern.

Further to the seventh embodiments, determining the second conversion technique comprises determining the second segment has an undetected pattern and wherein converting the mixed content video stream comprises applying an adaptive interlace reverser to the second segment.

Further to the seventh embodiments, the machine readable medium further comprises instructions that, in response to being executed on a computing device, cause the computing device to process video for encoding and/or display by determining a third segment of the mixed content video stream comprises a progressive format and providing the progressive format video segment as output with no conversion.

In one or more eighth embodiments, at least one machine readable medium may include a plurality of instructions that in response to being executed on a computing device, causes the computing device to perform a method according to any one of the above embodiments.

In one or more ninth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for processing video for encoding and/or display comprising:
   determining a frame format for a frame of a mixed content video stream comprising one or more video formats;
   determining a frame group format for a frame group of the mixed content video stream, wherein the frame group comprises the frame;
   determining a conversion technique for the frame group based at least in part on the frame group format; and
   converting the frame group to a final progressive format based on the determined conversion technique.

2. The method of claim 1, wherein the video formats of the mixed content video stream comprise at least one of a 60 frames per second progressive format, a 30 frames per second progressive format, a 30 frames per second true interlaced format, or a 30 frames per second pseudo-interlaced telecine converted format.

3. The method of claim 1, wherein determining the frame format comprises content analysis of the frame, and wherein the frame format comprises at least one of progressive or interlaced.

4. The method of claim 1, wherein determining the frame format comprises:
   determining a plurality of descriptors associated with content of the frame;
   evaluating a plurality of comparison tests based on the plurality of descriptors; and
   determining the frame format based on the comparison tests, wherein the frame format comprises at least one of progressive or interlaced.

5. The method of claim 1, wherein determining the frame format comprises:
   determining a plurality of descriptors associated with content of the frame;
   evaluating, at a first stage, a plurality of comparison tests based on the plurality of descriptors;
   determining, at the first stage, whether the frame format is progressive, interlaced, or uncertain based on the comparison tests;
   evaluating, when the frame format is uncertain at the first stage, a second stage comprising machine learning based comparison tests; and
   determining, at the second stage, whether the frame format is progressive or interlaced based on the machine learning based comparison tests.

6. The method of claim 1, wherein determining the frame group format comprises content analysis of frames of the frame group, and wherein the frame group format comprises at least one of all progressive, all interlaced, or telecined.

7. The method of claim 1, wherein determining the frame group format comprises at least one of determining all frames of the frame group are progressive, determining all frames of the frame group are interlaced, determining a telecine pattern of the frame group, or determining an undetected pattern of the frame group.

8. The method of claim 1, wherein determining the frame group format comprises at least one of determining all frames of the frame group are progressive, determining all frames of the frame group are interlaced, determining a telecine pattern of the frame group, or determining an undetected pattern of the frame group and wherein determining the conversion technique comprises comparing the frame group format to a prior frame group format of a frame group prior to the frame group and a look-ahead frame group format for a frame group subsequent to the frame group.

9. The method of claim 1, wherein the frame group format comprises all progressive frames, wherein determining the conversion technique comprises determining a prior frame group format and a look-ahead frame group format comprise all progressive frames, and wherein the conversion technique comprises no conversion to generate final frames having the final progressive format.

10. The method of claim 1, wherein the frame group format comprises all interlaced frames, wherein determining the conversion technique comprises determining a prior frame group format and a look-ahead frame group format comprise all interlaced frames, and wherein the conversion technique comprises an adaptive deinterlacing technique.

11. The method of claim 10, wherein the adaptive deinterlacing technique comprises generating missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

12. The method of claim 1, wherein the frame group format comprises an individual telecine pattern, wherein determining the conversion technique comprises determining a prior frame group format and a look-ahead frame group format comprise the individual telecine pattern, wherein the conversion technique comprises an adaptive telecine pattern reversal technique, and wherein the individual telecine pattern comprises at least one of a 3:2 pull down pattern, a 2:3:3:2 pull down pattern, a 4:1 pull down pattern, or a blended pattern.

13. The method of claim 1, wherein the frame group format comprises an undetected pattern, and wherein the conversion technique comprises an adaptive telecine pattern reversal technique comprising generating missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

14. The method of claim 1, wherein the frame group comprises an interlaced frame and a telecined frame, and wherein determining the frame group format comprises:
   evaluating a plurality of comparison tests, wherein at least a comparison test is based on comparing measures of local texture of the frames of the frame groups and at least a second comparison test is based on comparing a sum of absolute differences between fields of an individual frame of the frame group to a sum of absolute differences between a field of the individual frame and another frame of the frame group.

15. The method of claim 1, wherein the frame group comprises an interlaced frame and a telecined frame, and wherein determining the frame group format comprises:
   evaluating at least one comparison test, wherein the comparison test is based on comparing a sum of static thresholded differences between blocks of an individual frame of the frame group to sum of static thresholded differences between blocks of another frame of the frame group.

16. The method of claim 1, wherein determining the frame format and the frame group format comprises:
   decoding headers associated with the mixed content video stream, wherein the mixed content video stream comprises an aggregated transport stream, and wherein decoding the headers comprises demultiplexing individual channels of the aggregated transport stream, decoding a first individual channel to generate the mixed content video stream and the headers, the headers comprising the frame format and the frame group format.

17. A system for processing video for encoding and/or display comprising:
a memory buffer configured to store video frames; and
a central processing unit coupled to the memory buffer, wherein the central processing unit comprises:
  a frame classifier module configured to determine a frame format for a frame of a mixed content video stream comprising one or more video formats;
  a frame group classifier module determine a frame group format for a frame group of the mixed content video stream, wherein the frame group comprises the frame;
  an adaptive interlace reverser module configured to, when the frame group format comprises an interlaced format, convert the frame group to a first final progressive format; and
  an adaptive telecine reverser module configured to, when the frame group comprises a pseudo-interlaced telecine converted format, convert the frame group to a second final progressive format.

18. The system of claim 17, wherein the frame classifier module and the frame group classifier module are configured to determine the frame format prior to the frame group format, and wherein the memory buffer is configured to buffer the frame group, a frame group prior to the frame group, and a frame group subsequent to the frame, the frame group, the frame group prior to the frame group, and the frame group subsequent to the frame group each comprising five frames.

19. The system of claim 17, wherein the frame classifier module is configured determine the frame format by the frame classifier module being configured to:
  determine a plurality of descriptors associated with content of the frame;
  evaluate a plurality of comparison tests based on the plurality of descriptors; and
  determine the frame format based on the comparison tests, wherein the frame format comprises at least one of progressive or interlaced.

20. The system of claim 19, wherein the descriptors comprise at least one of a sum of absolute differences between pairs of fields of the frame, a sum of variable threshold differences between blocks of the frame and blocks of a top field of the frame, a thresholded count of blocks of the frame having a high texture value, a measure of a vertical texture of the frame, a measure of a difference between a dynamic texture and a static texture of the frame, a measure of a difference between a texture level of the frame and an average of texture levels of fields of the frame, or a sum of a static thresholded differences between blocks of the frame and blocks of the top field of the frame.

21. The system of claim 17, wherein the frame classifier module is configured determine the frame format by the frame classifier module being configured to:
  determine a plurality of descriptors associated with content of the frame;
  evaluate, at a first stage, a plurality of comparison tests based on the plurality of descriptors;
  determine, at the first stage, whether the frame format is progressive, interlaced, or uncertain based on the comparison tests;
  evaluate, when the frame format is uncertain at the first stage, a second stage comprising machine learning based comparison tests; and
  determine, at the second stage, whether the frame format is progressive or interlaced based on the machine learning based comparison tests.

22. The system of claim 17, wherein the frame group format comprises all progressive frames, wherein the frame group classifier module is configured determine a prior frame group format and a look-ahead frame group format both comprising all progressive frames, and wherein the system is configured to output the frame group with no conversion to generate final frames.

23. The system of claim 17, wherein the adaptive interlace reverser module is configured to generate missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

24. The system of claim 17, wherein the frame group format comprises an individual telecine pattern, wherein the frame group classifier module is configured determine a prior frame group format and a look-ahead frame group format both comprising the individual telecine pattern, wherein the frame group format comprises the pseudo-interlaced telecine converted format, wherein the individual telecine pattern comprises at least one of a 3:2 pull down pattern, a 2:3:3:2 pull down pattern, a 4:1 pull down pattern, or a blended pattern, and wherein the adaptive interlace reverser module is configured to verify the individual telecine pattern, check pattern parity, and reverse the individual telecine pattern to generate final frames having the final progressive format at 24 frames per second.

25. The system of claim 17, wherein the frame group format comprises an undetected pattern, and wherein the adaptive interlace reverser module is configured to convert the frame group to a third final progressive format by the adaptive telecine pattern reversal module being configured to generate missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

26. At least one non-transitory machine readable medium comprising a plurality of instructions that, in response to being executed on a computing device, cause the computing device to process video for encoding and/or display by:
  determining a frame format for a frame of a mixed content video stream comprising one or more video formats;
  determining a frame group format for a frame group of the mixed content video stream, wherein the frame group comprises the frame;
  determining a conversion technique for the frame group based at least in part on the frame group format; and
  converting the frame group to a final progressive format based on the determined conversion technique.

27. The non-transitory machine readable medium of 26, wherein determining the frame format comprises:
  determining a plurality of descriptors associated with content of the frame;
  evaluating a plurality of comparison tests based on the plurality of descriptors; and
  determining the frame format based on the comparison tests, wherein the frame format comprises at least one of progressive or interlaced.

28. The non-transitory machine readable medium of claim 26, wherein determining the frame format comprises:
  determining a plurality of descriptors associated with content of the frame;

evaluating, at a first stage, a plurality of comparison tests based on the plurality of descriptors;

determining, at the first stage, whether the frame format is progressive, interlaced, or uncertain based on the comparison tests;

evaluating, when the frame format is uncertain at the first stage, a second stage comprising machine learning based comparison tests; and determining, at the second stage, whether the frame format is progressive or interlaced based on the machine learning based comparison tests.

29. The non-transitory machine readable medium of claim 26, wherein the frame group format comprises all progressive frames, wherein determining the conversion technique comprises determining a prior frame group format and a look-ahead frame group format comprise all progressive frames, and wherein the conversion technique comprises no conversion to generate final frames having the final progressive format.

30. The non-transitory machine readable medium of claim 26, wherein the frame group format comprises all interlaced frames, wherein determining the conversion technique comprises determining a prior frame group format and a look-ahead frame group format comprise all interlaced frames, and wherein the conversion technique comprises an adaptive deinterlacing technique.

31. The non-transitory machine readable medium of claim 30, wherein the adaptive deinterlacing technique comprises generating missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

32. The non-transitory machine readable medium of claim 26, wherein the frame group format comprises an individual telecine pattern, wherein determining the conversion technique comprises determining a prior frame group format and a look-ahead frame group format comprise the individual telecine pattern, and wherein the conversion technique comprises an adaptive telecine pattern reversal technique.

33. The non-transitory machine readable medium of claim 26, wherein the frame group format comprises an individual telecine pattern, wherein determining the conversion technique comprises determining a prior frame group format and a look-ahead frame group format comprise the individual telecine pattern, wherein the conversion technique comprises an adaptive telecine pattern reversal technique, and wherein the individual telecine pattern comprises at least one of a 3:2 pull down pattern, a 2:3:3:2 pull down pattern, a 4:1 pull down pattern, or a blended pattern.

34. The non-transitory machine readable medium of claim 26, wherein the frame group format comprises an undetected pattern, and wherein the conversion technique comprises an adaptive telecine pattern reversal technique comprising generating missing pixels based on at least one of adaptive line blocks interpolation, vertical non-linear filtering, spatial edge detection based interpolation, or a weighted averaging of interpolated and filtered line blocks and spatial edge detection based interpolation weighted based on motion detection.

35. The non-transitory machine readable medium of claim 26, wherein the frame group comprises an interlaced frame and a telecined frame, and wherein determining the frame group format comprises:

evaluating a plurality of comparison tests, wherein at least a first comparison test is based on comparing measures of local texture of the frames of the frame groups and at least a second comparison test is based on comparing a sum of absolute differences between fields of an individual frame of the frame group to a sum of absolute differences between a field of the individual frame and another frame of the frame group.

36. The non-transitory machine readable medium of claim 26, wherein the frame group comprises an interlaced frame and a telecined frame, and wherein determining the frame group format comprises:

evaluating at least one comparison test, wherein the comparison test is based on comparing a sum of static thresholded differences between blocks of an individual frame of the frame group to sum of static thresholded differences between blocks of another frame of the frame group.

\* \* \* \* \*